US009919398B2

(12) United States Patent
Mizuta et al.

(10) Patent No.: US 9,919,398 B2
(45) Date of Patent: Mar. 20, 2018

(54) MACHINING SYSTEM

(71) Applicant: FUJI MACHINE MFG. CO., LTD., Chiryu (JP)

(72) Inventors: Kenji Mizuta, Kasugai (JP); Toshifumi Suzuki, Toyota (JP)

(73) Assignee: FUJI MACHINE MFG. CO., LTD., Chiryu (JP)

(*) Notice: Subject to any disclaimer, the term of this patent is extended or adjusted under 35 U.S.C. 154(b) by 67 days.

(21) Appl. No.: 14/917,483

(22) PCT Filed: Sep. 13, 2013

(86) PCT No.: PCT/JP2013/074919
§ 371 (c)(1),
(2) Date: Mar. 8, 2016

(87) PCT Pub. No.: WO2015/037149
PCT Pub. Date: Mar. 19, 2015

(65) Prior Publication Data
US 2016/0214225 A1 Jul. 28, 2016

(51) Int. Cl.
*B23Q 11/00* (2006.01)
*B23Q 37/00* (2006.01)
(Continued)

(52) U.S. Cl.
CPC ........ *B23Q 37/007* (2013.01); *B23Q 11/0057* (2013.01); *B23Q 11/0067* (2013.01);
(Continued)

(58) Field of Classification Search
CPC ............ B23Q 11/0067; B23Q 11/0042; B23Q 11/0053; B23Q 11/0057; B23Q 37/00;
(Continued)

(56) References Cited

U.S. PATENT DOCUMENTS 5,361,486 A * 11/1994 Harmsen ................ B21D 43/05
29/563
5,657,529 A * 8/1997 Bohn ...................... B41F 17/02
226/101
(Continued)

FOREIGN PATENT DOCUMENTS

AT         512775 A4 * 11/2013 ........... B23Q 37/007
DE    102006002082 A1 *  7/2007 ............. B23P 21/00
(Continued)

OTHER PUBLICATIONS

International Search Report dated Dec. 24, 2013 in PCT/JP13/074919 Filed Sep. 13, 2013.

*Primary Examiner* — Daniel Howell
*Assistant Examiner* — Nicole N Ramos
(74) *Attorney, Agent, or Firm* — Oblon, McClelland, Maier & Neustadt, L.L.P.

(57) ABSTRACT

A machining system with a configuration in which working machines, including a machine tool such as a lathe, are configured to be disposed in a line and multiple working machines perform operations on one work in order such that practical utility of the machining system is enhanced. The machining system includes a base; and multiple working machine modules which are mounted on the base and are arranged in an arrangement direction, and has a configuration in which each of the multiple working machine modules is capable of being drawn out from the base along a track extending in an intersecting direction intersecting with the arrangement direction.

4 Claims, 31 Drawing Sheets

(51) Int. Cl.
*B23Q 39/04* (2006.01)
*B23P 23/00* (2006.01)
*B23Q 41/00* (2006.01)

(52) U.S. Cl.
CPC ............. *B23Q 39/04* (2013.01); *B23P 23/00* (2013.01); *B23Q 11/0042* (2013.01); *B23Q 41/00* (2013.01); *Y10T 409/304088* (2015.01)

(58) Field of Classification Search
CPC .. B23Q 37/002; B23Q 37/005; B23Q 37/007; B23Q 1/01; B23Q 1/012; B23Q 1/015; B23Q 1/017; B23Q 1/00; Y10T 409/304088; Y10T 409/307168; Y10T 409/307784; Y10T 409/308344; Y10T 409/308568; Y10T 408/36; Y10T 408/38; Y10T 408/3806; Y10T 408/3809; Y10T 408/385; Y10T 408/3784; Y10T 408/3788; Y10T 82/2524; Y10T 82/2566
See application file for complete search history.

(56) References Cited

U.S. PATENT DOCUMENTS

| | | | |
|---|---|---|---|
| 7,044,693 B2 * | 5/2006 | Fujiwara | B23C 1/002 269/13 |
| 7,165,919 B2 * | 1/2007 | Schweizer | B23Q 1/015 29/DIG. 101 |
| 7,241,090 B2 * | 7/2007 | Reynders | B23Q 11/0053 108/24 |
| 7,555,823 B2 | 7/2009 | Arai | |
| 8,210,782 B2 * | 7/2012 | Kai | B23C 1/06 29/27 R |
| 8,562,497 B2 * | 10/2013 | Tanizaki | B23Q 1/015 29/560 |
| 8,800,124 B1 * | 8/2014 | Hanks | B23C 1/08 29/26 A |
| 2003/0050160 A1 * | 3/2003 | Popp | B23Q 1/015 483/14 |
| 2006/0104751 A1 | 5/2006 | Arai | |
| 2008/0187406 A1 | 8/2008 | Kai | |

FOREIGN PATENT DOCUMENTS

| | | | | |
|---|---|---|---|---|
| JP | 63062636 A | * | 3/1988 | ............ B23Q 11/08 |
| JP | 01281840 A | * | 11/1989 | ......... B23Q 11/0053 |
| JP | 2006-68894 A | | 3/2006 | |
| JP | 2006-255859 A | | 9/2006 | |
| JP | 2007-245314 A | | 9/2007 | |
| JP | 4789103 B2 | | 7/2011 | |
| WO | 2007/063595 A1 | | 6/2007 | |

* cited by examiner

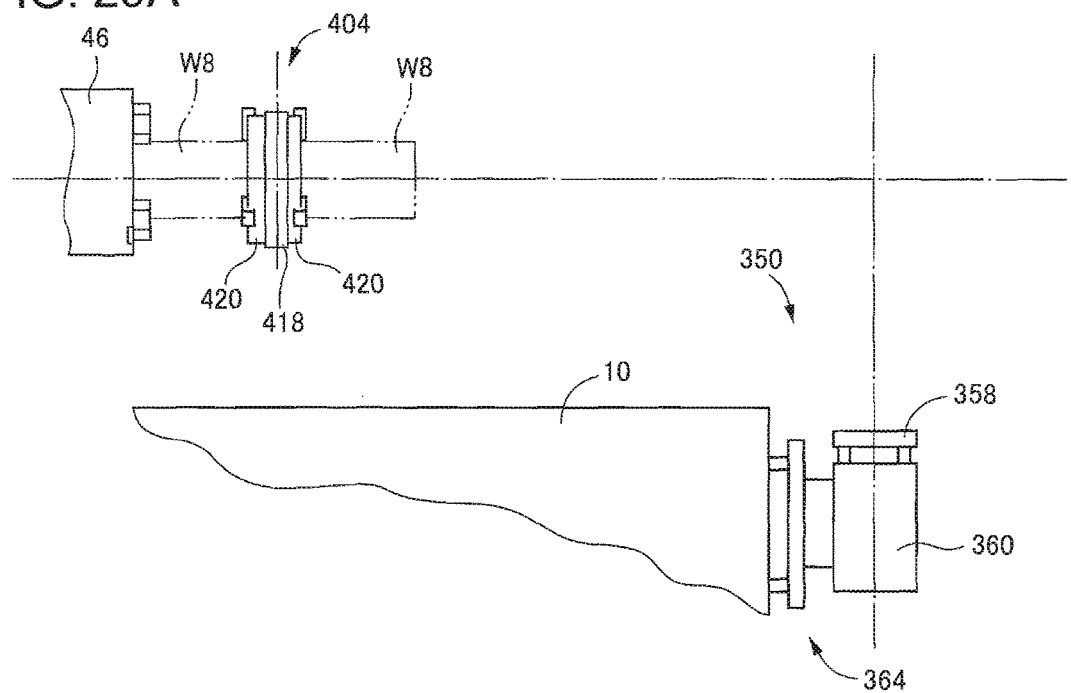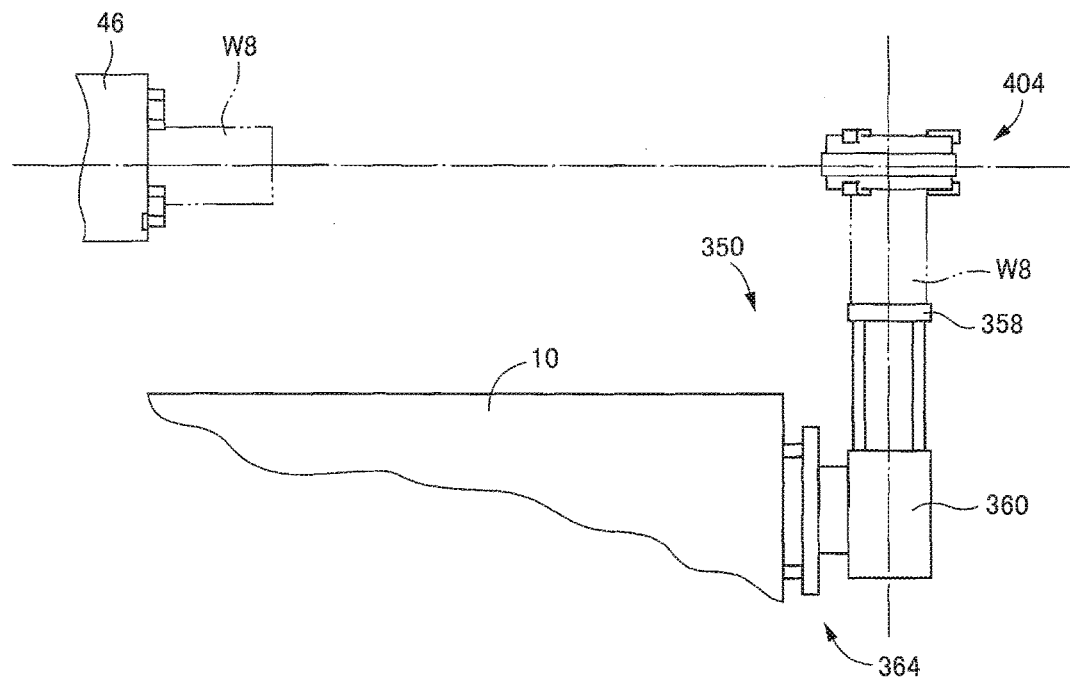

MACHINING SYSTEM

TECHNICAL FIELD

The present disclosure relates to a machining system in which multiple working machines including a machine tool are disposed.

BACKGROUND ART

As a machining system having a configuration in which working machines including a machine tool, such as a lathe, are disposed in a line and multiple working machines perform operations on one work in order, a system disclosed in the following PTL has been considered. In the system, multiple machine tools housed in one machine body are each mounted on one base in a line, and each machine body can be drawn out from each base. Therefore, the system is highly convenient in terms of maintenance, replacement, and so on, of the machine body.

CITATION LIST

Patent Literature

PTL 1: Japanese Patent No. 4789103

SUMMARY

Problem to be Solved

It is possible to enhance practicality of the system by modifying a machining system described above in which multiple working machines including a machine tool are disposed. From such a viewpoint, an object of the present disclosure is to provide a machining system with high practicality.

Means for Solving the Problem

In order to solve the above problem, a machining system of the present invention includes: a base; and multiple working machine modules which are mounted on the base and are arranged in an arrangement direction, wherein the multiple working machine modules include one or more machine tool modules in which a machine tool is modularized, and each of the multiple working machine modules is capable of being drawn out from the base along a track extending in an intersecting direction that intersects with the arrangement direction.

Effects

According to a machining system of the present disclosure, since the plurality of modules are arranged to be drawn out, it is possible to easily perform maintenance of the modules. In addition, according to a machining system of the present disclosure, since the multiple modules are arranged on one base, it is possible to decrease the number of bases provided in the system.

Aspects

Hereinafter, some aspects of the disclosure will be described. These aspects are non-limiting examples of the present disclosure.

Further, in the following articles, article (1) corresponds to claim 1, article (101) corresponds to claim 2, article (102) corresponds to claim 3, article (103) corresponds to claim 4, article (104) corresponds to claim 5, and article (105) corresponds to claim 6.

<<Basic Aspects>>

(1) A machining system that includes: a base; and multiple working machine modules which are mounted on the base and are arranged in an arrangement direction. The multiple working machine modules include one or more machine tool modules in which a machine tool is modularized and each of the multiple working machine modules is capable of being drawn out from the base along a track extending in an intersecting direction that intersects with the arrangement direction.

According to the system of the present aspect, since the multiple modules are arranged to be drawn out, it is possible to easily perform maintenance of the modules. To be more specific, by drawing out a module on which maintenance is to be performed, the maintenance can be performed without adjacent modules interfering. In addition, according to the system of the present aspect, since the multiple modules are arranged on one base, it is possible to reduce the number of the bases which are provided in the system.

According to the system of the present aspect, the "working machine module" is one in which various types of working machine modules are modularized and the machine tool module is a type of the working machine module. For example, examples of the "working machine" include a range from a machine tool to a machine which performs various types of operations associated with the machining process. Examples of the working machine include an inspection machine which measures a result of the machining process, or the like, and a pre-processing machine which performs pre-processing before the machining process, or the like, and broadly include a supply machine which supplies the work (workpiece) to the module, an unloader or a storage machine which receives the work, on which an operation is completed, and unloads or stores the work from the module. Note that, examples of the "machine tool" include a lathe, a drilling machine, a milling machine, a machining center, a grinder, a polishing machine, or the like.

According to the system of the present aspect, since the multiple modules are arranged on one base, it is possible to reduce the number of the bases provided in the system. The base may be, as described below, a single body which is not capable of being divided or separated, or may be formed of several base units which are connected and fastened.

Further, the "arrangement direction" described above and the "intersecting direction" described above of the multiple modules are a direction parallel to the top surface of the base, to be more exact, desirably, a horizontal direction. In addition, when considering that the length (hereinafter, referred to as a "system length" in some cases) of the entire system in the arrangement direction can be short, that is, that the line length can be short in a case where the multiple modules are arranged in a line, it is desirable that the arrangement direction described above and the intersecting direction described above are orthogonal to each other. Further, in the following description, the direction of drawing-out of the module is referred to as a "drawing-out direction" in some cases. Note that, the drawing-out direction is a direction parallel to the intersecting direction.

(2) For the machining system according to article (1), the multiple working machine modules are arranged on the base closely adjacent to each other in the arrangement direction.

According to the present aspect, the length of the multiple arranged modules, that is, the length of the line in a case where the multiple modules are arranged in a line, can be short. In other words, it is possible to shorten the length of the system in the arrangement direction. Thus, according to the present aspect, it is possible to build a machining system having a relatively short length. Further, in the present section, "closely adjacent", for example, means an extent that an interval between adjacent modules does not exceed 10 cm. In terms of shortening the length of the system in the arrangement direction to the greatest extent possible, it is desirable that the interval between two modules is equal to or less than 5 cm, and further it is more desirable that, substantially, there is no interval between two modules. According to the present aspect, it is possible to sufficiently benefit from an advantage described above of "simplification of the maintenance of the module".

Further, in terms of shortening the length of the system in the arrangement direction, it is desirable to reduce the width (dimension in the arrangement direction) of the module to the greatest extent possible. Specifically, it is desirable that the modules are arranged such that the width of the module is ⅓ or less, and further, ⅕ or less of the length (dimension in the intersecting direction) of the module.

(3) For the machining system according to article (1) or article (2), in a case where one of the both directions opposite to each other in the intersecting direction is defined to be frontward and the other direction is defined to be rearward, each of the multiple working machine modules has, on the frontward side, an operating space in which an operation is performed on the work.

According to the system of the present aspect, the operating spaces of the respective modules are arranged in parallel on the frontward side. In other words, the operating spaces of the plurality of modules are aligned on the frontward side. Accordingly, the system of the present aspect has an advantage in that it is possible to easily perform delivery of the work (workpiece, to mean an operation target) between the modules, and the system has various advantages such as an advantage in an operation management in that an operator performs check of the operation by the respective modules on the frontward side. Further, in the following description, for easy understanding of the description, unless there is a particular reason not to, the "intersecting direction" is sometimes referred to as the "front-rear direction", and correspondingly, the "arrangement direction" is sometimes referred to as the "right-left direction".

(4) For the machining system according to any one of article (1) to article (3), each of the multiple working machine modules is capable of being drawn out in both directions opposite to each other in the intersecting direction.

According to the system of the present aspect, it is possible to draw out both frontward and rearward. Accordingly, since it is possible to select a drawing-out direction depending on a position at which maintenance is performed, it is possible to more easily perform the maintenance.

<<Base Variations>>(11) For the machining system according to any one of article (1) to article (4), the base is formed as a single object.

In terms of the number of components which configure the system being small and the system being easily to install, it is desirable that the base is a single object. Note that, "single object" means an integral object of which division or separation is substantially not possible.

(12) For the machining system according to any one of article (1) to article (4), the base is configured to include multiple base units on which one or more modules of the multiple working machine modules are mounted, respectively.

The present aspect is advantageous in a case where the base is considerably large. In the present aspect, it is possible to consider an aspect in which the base is configured to have several modules. To be more particular, it is possible to consider the present aspect as an aspect in which a set of one base unit and one or more working machine modules is included. In other words, it is possible to consider the present aspect an aspect in which one base unit and one or more working machine modules configure a system module and the corresponding system is configured of multiple system modules which are arranged. Further, in terms of the number of the base units being relatively small, it is desirable that two or more modules are mounted on one base unit. Note that, it is desirable that the base unit is a single object, and the plurality of base units may be connected and fastened to each other to configure the base.

(13) For the machining system according to article (12), at least one of the multiple base units has a configuration in which two or more modules of the multiple working machine modules are mounted thereon.

(14) For the machining system according to article (13), each of the multiple base units has a configuration in which two or more modules of the multiple working machine modules are mounted thereon.

The aspects according to the two articles above are advantageous in terms of reducing the number of base units. Particularly, in the latter aspect, it is possible to significantly reduce the number of base units.

Note that, the system module in which two or more working machine modules are mounted on one base unit can be considered by itself or as the machining system with the basic aspects listed above and, for the latter, it is possible to consider one machining system configured of multiple machining systems.

(15) For the machining system according to any one of article (12) to article (14), the multiple base units have substantially the same structure.

It is possible to consider the present aspect as an aspect in which the base unit is standardized. For example, the multiple base units having the same shape and dimensions are included in the present aspect. According to the present aspect, it is possible to easily correspond to changes to the number and so on of the working machine modules to be arranged through changing the number of the base units, thus a flexible system is realized.

<<Machine Tool Module Variations>>

(21) For the machining system according to any one of article (1) to article (15), the one or more machine tool modules include one or more horizontal spindle type modules which perform a process on the work using a tool, wherein the horizontal spindle type module includes (a) a spindle that is arranged such that the shaft line thereof extends in the intersecting direction, and that rotates the work by rotation of the spindle itself, (b) a tool holding head that holds a tool, and (c) a head moving device provided above the spindle that moves the tool holding head in the intersecting direction and in a vertical direction.

The "work" of the present article can be referred to as a so-called workpiece, or an operation target and, in terms of the machine tool module, means a target of a process performed by the module. In addition, the "tool" is different depending on the type of machine tool module and, examples of the tool include a bite, a drill, a mill, a grinding wheel, and a polisher. The "spindle" causes the work to rotate and can be referred to as a so-called main shaft. In machine tools having such a spindle, in general, a work holding tool such as a chuck is provided at the end of the spindle and a process is performed by the tool with work in a state of being held on the work holding tool.

Since the above machine tool module is disposed such that the spindle extends in the front-rear direction, the module is referred to as a "horizontal spindle type module" for convenience. The horizontal spindle type module can have a small dimension (hereinafter, referred to as a "width" or a "module width" in some cases) in the arrangement direction described above, that is, in the right-left direction. The head moving device that causes the tool holding head to move is positioned above the spindle, which also contributes to reduction of the width of the module. Note that, to make the module width small to the greatest extent possible and to maintain a good balance of the module in the arrangement direction, it is desirable that the head moving device is provided directly above the shaft line (hereinafter referred to as a "spindle shaft line" in some cases) of the spindle.

(22) For the machining system according to article (21), the one or more horizontal spindle type processing machine module includes a lathe module that performs a cutting process on the work using a bite as a tool while the work is rotated by the spindle.

The present aspect is an aspect related to a system which is configured to include a lathe as a machine tool in the system. Since the lathe module in the present aspect is a horizontal spindle type module, the module width is narrow and the system of the present aspect configured to include the lathe module has a relatively short system length.

(23) For the machining system according to any one of article (21) or article (22), the one or more horizontal spindle type processing machine module includes a tool holding head that has a tool rotating device which rotates a tool around a shaft line of itself, and a drilling machine/milling machine module that performs fixing of a work in a state in which the work is positioned at any given rotating position through the rotation of the spindle and performs at least one of drilling and milling on the work by at least one of a drill and a mill as a tool.

The present aspect is an aspect related to a system configured to include a machine tool which functions as at least one of the lathe and the drilling machine. For example, the drilling machine/milling machine module in the present aspect can be considered as a module in which the drilling machine or the milling machine, which includes an index table that causes the work to rotate around the spindle shaft line, is modularized. Since the drilling machine/milling machine module in the present aspect is the horizontal spindle type module described above, the module width is narrow and the system of the present aspect, which is configured to include the drilling machine/milling machine, has a relatively short system length.

(24) For the machining system according to any one of article (21) to article (23), at least one of the one or more horizontal spindle type modules has a configuration in which the tool holding head selects and holds one of multiple tools and one of the selected tools of the multiple tools performs processing.

In the horizontal spindle type module provided in the system of the present aspect, processes can be performed by multiple tools, and according to the system of the present aspect, it is possible to perform relatively complicated machining on one work using a relatively small module. In a case where the horizontal spindle type module is a lathe module, the module can be considered to be realized through modularizing a turret lathe or a comb-teeth lathe. In a case where the horizontal spindle type module is a drilling machine/milling machine module, the module can be considered to have so-called machining center functionality, that is, the same functionality as in a case where a tool changer is provided.

<<Structure Related to Drawing-Out of Modules>>

(31) For the machining system according to any one of article (1) to article (24), each of the multiple working machine modules has a pair of wheels provided at an interval in the arrangement direction; the base has multiple rail pairs configured of one pair of rails laid at an interval in the arrangement direction and extending in the intersecting direction; and each of the pair of wheels provided in each of the multiple working machine modules circles around on one of the pair of rails of any one of the multiple rail pairs, such that each of the plurality of working machine modules is capable of being drawn out from the base along the track.

In the present aspect, the "rail" is a type of member (hereinafter, referred to as a "track defining member" in some cases) which defines the track described above. According to the present aspect, the wheels provided on the module circle around on the rail, and thereby it is possible to easily draw out the module using relatively small power. Further, in consideration of the stable drawing out of the module, it is desirable that a pair of wheels are provided at a plurality of positions of the module at an interval in the intersecting direction, that is, in the drawing-out direction.

In the present aspect, since multiple modules can be mounted on the base, multiple rail pairs are provided in the base. For example, the system of the present aspect may have a configuration in which, in a case where the module has a relatively narrow width, the pair of wheels provided in the module circles around on one of the multiple rail pairs, and, in contrast, in a case where the module has a relatively wide width, one of the pair of wheels provided in the module circles around on a rail which configures one of the multiple rail pairs, and the other of the pair of wheels circles around on a rail which configures another one of the multiple rail pairs.

(32) For the machining system according to any one of article (1) to article (31), a module driving mechanism that drives each working machine module in the intersecting direction is provided for each of the multiple working machine modules.

According to the present aspect, it is possible to easily draw out the module in the drawing-out direction using power of any drive source such as an electric motor, without depending on human power. The system of the present aspect is suitable for a system in which relatively heavy modules are arranged on the base. Further, the drive source having a module driving mechanism may be provided on the base or may be provided in the module. Note that, an aspect in which a module driving mechanism is provided for only at least one portion of the multiple working machine modules is not included in the present aspect but can be an aspect of the present disclosure.

(33) For the machining system according to article (32), the module driving mechanism is configured to include a rack provided on one out of one of the multiple working machine modules and the base so as to extend in the intersecting direction, a pinion which is provided on the other one out of one of the multiple working machine modules and the base and which meshes with the rack, and a drive source which rotates the pinion.

According to the present aspect, in the module driving mechanism, a rack and pinion mechanism is employed. Since the rack and pinion mechanism can reliably transmit a force and a rotation position of the pinion and a movement position of the rack have a linear relationship, according to the present aspect, control of the rotation position of the pinion enables the module to be accurately drawn out to a position (hereinafter, referred to as a "drawn-out position" in some cases) to which the module is drawn out.

<<Structure Related to Fixing of Modules>>

(41) For the machining system according to any one of article (1) to article (33), a module fixing mechanism that fixes each working machine module at a fixing position set in the intersecting direction is provided for each of the multiple working machine modules.

The "fixing position" corresponds to a "normal position (also referred to as a standard position)" which is a position at which the module should be positioned during an operation of the corresponding system, or a "drawn-out position" which is set at any given position and at which the modules should be fixed in a case where the module is drawn out, or the like. In the system of the present aspect, since the module is fixed at the set fixing position by the module fixing mechanism, it is convenient to use. Further, since the module driving mechanism is provided for each of the multiple modules, in the present aspect, it may be considered that the multiple module fixing mechanisms are provided in the system.

(42) For the machining system according to article (41), the module fixing mechanism is configured to include a locked performing portion that is provided on one out of one of the multiple working machine modules and the base, a locking portion that is provided on the other one out of one of the multiple working machine modules and the base and is capable of locking the locked portion, and a locking-portion operating device that operates the locking portion in order to switch between a state in which the locked portion is locked by the locking portion and a state in which the locked portion is not locked by the locking portion.

The present aspect is an aspect which focuses only on a specific structure of the module fixing mechanism. According to the system of the present aspect, it is possible to simply perform fixing of the module and releasing of the fixing. Further, in a case where the locked portion is provided in the module and the locking portion and the locking portion operating device are provided on the base, it is possible to consider as an aspect in which the fixing of the module and releasing of the fixing are performed at the base side, and conversely, in a case where the locked portion is provided in the base and the locking portion and the locking-portion operating device are provided on the module, it is possible to consider as an aspect in which the fixing and releasing of the fixing are performed at the module side.

(43) For the machining system according to article (41) or article (42), the module fixing mechanism has a configuration in which one of the multiple working machine modules is fixed respectively to multiple fixing positions set as the fixing positions in the intersecting direction.

According to the present aspect, for example, it is possible to fix the module by the module fixing mechanism at both the normal position and the drawn-out position described above. Note that, the present aspect includes not only an aspect in which a module fixing mechanism which can fix all the multiple modules to the multiple fixing positions is provided, but also an aspect in which a module fixing mechanism which can fix only a portion of the multiple modules to the multiple fixing positions is provided, and a module fixing mechanism which can fix the modules other than the portion of the multiple modules above to only one fixing position (for example, only the normal position) is provided.

(44) For the machining system according to article (43), the module fixing mechanism is configured to include a locked portion that is provided on one out of one of the multiple working machine modules and the base, a locking portion that is provided on the other out of one of the multiple working machine modules and the base and is capable of locking the locked portion, and a locking portion operating device that operates the locking portion in order to switch between a state in which the locked portion is locked by the locking portion and a state in which the locked portion is not locked by the locking portion, and multiple of the locked portions or multiple of the locking portions which function as the locked performing portion or the locking portion, respectively, are provided at intervals in the intersecting direction, and thereby one of the multiple working machine modules is fixed to the multiple fixing positions.

The present aspect is an aspect which focuses only on a specific structure of the module fixing mechanism which can fix the module to the multiple fixing positions. The present aspect includes an aspect in which multiple locked portions are provided, any one of the multiple locked portions is locked by one locking portion, and thereby the module is fixed to the fixing position corresponding to the locked portion, and an aspect in which multiple locking portions are provided, any one of the multiple locking portions locks one locked portion, and thereby the module is fixed to the fixing position corresponding to the locking portion which performs locking. In order to realize an aspect belonging to one of the two aspects, for example, the module fixing mechanism can have a configuration in which two locking portions and two locked portions are provided at the same intervals, the module is fixed to the normal position in a state in which one of the two locking portions locks one of the two locked portions and the other locking portion locks the other locked portion, the module is fixed to a first drawn-out position in a state in which one of the two locking portions locks the other one of the two locked portions, and the module is fixed to a second drawn-out position in a state in which the other one of the two locking portions locks one of the two locked portions. The module fixing mechanism configured as above can be appropriately employed for a system in which the module can be drawn out in both frontward and rearward directions.

(45) For the machining system according to any one of article (41) to article (44), the module fixing mechanism is a pressing type fixing mechanism which fixes one of the multiple working machine modules in a state of pressing the module against the base.

According to an aspect of the present article, the module is reliably fixed to the base, and thereby it is possible to prevent or suppress adverse effects such as vibration of the module produced during an operation. Specifically, in a case where the module is the lathe module, good cutting accuracy (processing accuracy) is ensured. Further, in the present aspect, the module fixing mechanisms do not all need to be the pressing type fixing mechanisms which are provided in the system. In other words, an aspect in which only a portion of the module fixing mechanisms are the pressing type fixing mechanism is also included in the present aspect.

(46) For the machining system according to article (45), the module fixing mechanism is configured to include a locked portion that is provided in one out of one of the multiple working machine modules and the base, a locking portion that is provided on the other out of one of the multiple working machine modules and the base and is capable of locking the locked portion, and a locking portion operating device that operates the locking portion in order to switch between a state in which the locked portion is locked by the locking portion and a state in which the locked portion is not locked by the locking portion, and the locking portion operating device causes the locking portion to bias the locked portion in a state in which the locked portion is locked by the locking portion, and thereby the locking portion operating device fixes one of the multiple working machine modules in a state in which the module is pressed against the base.

The present aspect is an aspect which focuses only on a specific structure of the pressing type fixing mechanism. For example, according to the present aspect, it is possible to realize the pressing type fixing mechanism with a simple configuration in which the locking portion is attracted to or pressed against the locked portion.

<<Detachment from Base>>

(51) For the machining system according to any one of article (1) to article (46), each of the multiple working machine modules is capable of being drawn out so as to be detachable from the base.

According to the system of the present aspect, it is possible to easily perform the replacement of modules. Since it is possible to flexibly cope with a change of an operation or the like by the system, the system of the present aspect is sufficiently flexible. Further, in the system of the present aspect, during the maintenance of the module, since it is possible for the module to be detachable from the base, the system of the present aspect is exceptionally convenient for complex maintenance, large-scale maintenance, or the like.

(52) For the machining system according to article (51), each of the multiple working machine modules is capable of being drawn out in both directions opposite to each other in the intersecting direction and is capable of being drawn out so as to be detachable from the base in at least one direction of both directions.

In the present aspect, all the modules may be capable of being drawn out so as to be detachable only in one direction of both directions or all the modules may be capable of being drawn out so as to be detachable in both directions. In addition, a portion of the multiple modules may be capable of being drawn out so as to be detachable only in one direction of both directions, with the rest of the multiple modules being capable of being drawn out so as to be detachable in both directions.

(53) For the machining system according to article (52), each of the multiple working machine modules is capable of being drawn out so as to be detachable in at least the same direction.

According to the present aspect, all the modules can be drawn out so as to be detachable on at least one of the frontward side or the rearward side. Accordingly, in the system of the present aspect, it is possible to easily replace the modules only through a space for the replacement of the module, which is provided at only one of the frontward side and the rearward side of the system. In other words, in the system of the present aspect, it is possible for the space required around the corresponding system to be relatively small. In other words, according to the present aspect, a system for which the installation ability is excellent is realized.

(54) For the machining system according to article (53), in a case where one of both directions opposite to each other in the intersecting direction is defined to be frontward and the other direction is defined to be rearward, each of the multiple working machine modules has an operating space on the frontward side, in which an operation is performed on a work, and can be drawn out so as to be detachable from the base at least rearward.

According to the system of the present aspect, all the modules can be drawn out so as to be detachable on the rearward side. As will be described below, in a case of a configuration in which shavings are discharged on the rearward side, in general, because a receptacle of the shavings is disposed rearward beside the system, so-called dead space is formed beside the rearward side. According to the present aspect, it is possible to replace the module using the dead space only by removing of the receptacle of the shavings.

(55) For the machining system according to any one of article (51) to article (54), the machining system includes a transfer cart that, when any one of the multiple working machine modules is detached from the base, is fixed beside the base such that the track extends so as to be used to transfer the working machine module.

According to the present aspect, since it is possible to transport the detached module in a state of being mounted on the transfer cart, it is possible to easily perform the replacement of the module. Note that, the transfer cart is not only used for detaching the module, but can be also used for fixing the module in a state in which a part of the module is mounted on the transfer cart when the module is drawn out. The module is drawn out in such a state, and thereby, according to the present aspect, the drawing-out of the module is performed in a stable state when the module is drawn out a relatively long way, that is, when a relatively large part of the module overhangs the base.

(56) For the machining system according to article (55), the transfer cart includes a module moving device that performs movement to the transfer cart from the base along the track in order to transfer any one of the multiple working machine modules.

The module moving device in the present aspect may be configured to include an electric motor or the like as a drive source or may be configured to use human power as the driving force. According to the present aspect, for the transfer of the module to the transfer cart, it is possible to transfer the module using a relatively small force when not using human power or even in a case when using human power.

(57) For the machining system according to article (56), the module moving device includes a threaded rod which is disposed extending in a direction of movement of anyone of the multiple working machine modules by the module moving device, which has male threads formed on the outer circumference, and which rotates due to the rotating force applied thereto, and a movable engagement body which engages with any one of the multiple working machine modules, which is screwed with the male threads of the threaded rod, and which moves in the intersecting direction based on the rotation of the threaded rod.

The present aspect is an aspect which focuses only on a specific structure of the module moving device. In a case where the module moving device includes a drive source, the threaded rod may be caused to rotate by the driving force of the drive source; in contrast, in a case where a drive source is not included, for example, the configuration may be such that a wheel is attached at an end portion of the threaded rod, the wheel is rotated by an operator, and thereby the module is caused to move in a state of being engaged with the movable engagement body. Note that, in the present aspect, it is possible to consider that the screw mechanism is configured of the threaded rod and the movable engagement body described above and, for example, the screw mechanism may employ a trapezoidal screw, a ball screw, or the like. In the present aspect, as a technique of engagement between the movable engagement body and the module, for example, various techniques such as a technique (so-called "latching") of latching of the movable engagement body to the module or a technique of fastening of the movable engagement body with the module using a fastening member such as a bolt can be employed.

<<Module Arrangement Regions on Base>>

(61) For the machining system according to any one of article (1) to article (57), multiple arrangement regions having the same widths in the arrangement direction are set on the base, and each of the multiple working machine modules is arranged to occupy one or more of the multiple arrangement regions but not to protrude into another region adjacent to the occupied one or more of the multiple arrangement regions.

In the present aspect, the "arrangement region" is a virtual space set to be demarcated on the base and it is possible to be considered as a unit space which defines a space in which the module is disposed. The multiple arrangement regions are arranged in parallel in the arrangement direction without an interval, that is, the arrangement regions are in contact with each other. The number of modules differs from the number of arrangement regions occupied due to the different widths of the modules; there are modules which occupy only one arrangement region, and there are modules which occupy multiple arrangement regions. When the width of the module (dimension in the arrangement region) is defined as a "module width" and the width of one arrangement region (dimension in the arrangement region) is defined as a "region width", the system may have a configuration in which only modules having a width equal to or less than the region width are arranged in parallel, a configuration in which only the modules having a module width exceeding the region width are arranged in parallel, or a configuration in which modules having a width equal to or less than the region width and modules having a width exceeding the region width are mixed and arranged in parallel.

In the present aspect, the modules exceeding the region width occupy two or more arrangement regions; however, the modules are arranged not to protrude into an adjacent arrangement region. In other words, a situation in which an arrangement region occupied by one module is protruded into by a portion of another module is prevented. That is, two modules are prevented from coexisting in one arrangement region. However, since no arrangement region is set on the outer side of the ends of the multiple arrangement regions, the module positioned at the end in the arrangement direction is allowed to protrude outside from the arrangement region positioned at the end. Further, in the present aspect, for example, in a case where the multiple modules are arranged to be closely adjacent to each other, of the multiple modules, except for the two modules on both ends, each of the other modules, has a module width approximately of an integer multiple of the region width.

In view of the above description, the present aspect can be considered as an aspect in which the module width and a rule according to the arrangement of the modules in association with the arrangement region described above are defined. In accordance with the rule, it is possible to avoid complexity when a module mounted on the base is changed to another module or another type of module, and thus in the present aspect, a flexible system is achieved.

(62) For the machining system according to article (61), one of the multiple working machine modules occupies one of the multiple arrangement regions and another one of the multiple working machine modules occupies two or more regions of the multiple arrangement regions.

To put it simply, the present aspect is an aspect in which a configuration in which modules having different module widths are included is employed. In a case where a module occupying only one arrangement region is defined as a "single region occupying module", and a module occupying multiple continuous arrangement regions is defined as a "multi-region occupying module", the present aspect can be expressed as an aspect in which one or more single region occupying modules and one or more multi-region occupying modules are arranged.

(63) In the machining system according to article (61) or article (62), at least one of the two modules arranged at both ends of the multiple working machine modules is arranged to protrude from one end of one of the multiple arrangement regions at which the modules are arranged.

As described above, the present aspect is an aspect in which the module at the end of the arrangement protrudes outside from the arrangement region at the end. According to the present aspect, a module having a module width exceeding the multiple of the region width can also be arranged at the end portion in the arrangement direction without any restrictions of an adjacent module. Thus, according to the present aspect, a system including a module having a relatively large module width also becomes a system having a high degree of freedom related to the arrangement of the modules.

(64) In the machining system according to article (63), at least one of two modules arranged at both ends of the multiple working machine modules is arranged to protrude from the base.

According to the present aspect, it is possible to have a base with a relatively small width (length in the arrangement direction) even when the system includes a module with a relatively large module width.

(65) For the machining system according to any one of article (61) to article (64), each of the multiple working machine modules has one pair of wheels; the base has multiple rail pairs which are disposed at equal intervals in the arrangement direction corresponding to the multiple arrangement regions, and configured of one pair of rails laid so as to extend in the intersecting direction; and each of the pair of wheels provided in each of the multiple working machine modules circles around on one of the pair of rails which configure one rail pair disposed corresponding to any one of the multiple arrangement regions which are occupied by each of the multiple working machine modules, such that each of the multiple working machine modules is capable of being drawn out from the base along the track.

The present aspect is an aspect in which the rail pairs described above are arranged on the base corresponding to the arrangement regions. In the present aspect, each of the pair of wheels provided in one module circles around on any one rail laid corresponding to one or more arrangement regions which are occupied by the module. To be more particular, for example, in a case where the module is the single region occupying module described above, one of the pair of wheels provided in the module circles around on one of the pair of rails laid corresponding to the arrangement region which is occupied by the module and the other wheel circles around on the other rail.

(66) For the machining system according to article (65), the multiple working machine modules include a multi-region occupying module which occupies two or more of the multiple arrangement regions, one of the pair of wheels provided in the multi-region occupying module circles around on one of the pair of rails which configure one rail pair disposed corresponding to one of two or more of the multiple arrangement regions, and the other one of the pair of wheels circles around on one of the pair of rails which configure one rail pair disposed corresponding to another one of two or more of the multiple arrangement regions, thus the multi-region occupying module is capable of being drawn out from the base along the track.

To put it simply, the present aspect is an aspect which focuses only on which rail on which one of the pair of wheels circles around in a case where the module is the multi-region occupying module described above. Specifically, for example, in a case where the module is a two-region occupying module which occupies two arrangement regions, one of the pair of wheels provided in the module may circle around on one (for example, one positioned on the outer side in the arrangement direction) of the pair of rails laid corresponding to one of two arrangement regions which are occupied by the module, the other wheel may circle around on one (for example, one positioned on the outer side in the arrangement direction) of the pair of rails laid corresponding to the other one of two arrangement regions which are occupied by the module.

(67) For the machining system according to any one of article (61) to article (66), a module driving mechanism that drives each working machine module in the intersecting direction is provided for each of the multiple working machine modules, and multiple base side components which can configure the module driving mechanisms, respectively, are arranged on the base corresponding to the multiple arrangement regions.

To put it simply, the present aspect is an aspect in which a portion of the module driving mechanism described above, which should be disposed on the base, is disposed on the base for each arrangement region. According to the present aspect, since the portion is provided for each arrangement region, for a module occupying any arrangement region, it is possible to easily draw out the module by the module driving mechanism.

(68) For the machining system according to any one of article (61) to article (67), a module fixing mechanism that fixes each working machine module at a fixing position set in the intersecting direction is provided for each of the multiple working machine modules, and multiple base side components which can configure the module fixing mechanism, respectively, are arranged on the base corresponding to the multiple arrangement regions.

To put it simply, the present aspect is an aspect in which a portion of the module fixing mechanism described above, which should be disposed on the base, is disposed on the base for each arrangement region. According to the present aspect, since the portion is provided for each arrangement region, for a module occupying any arrangement region, it is possible to fix the module at the set fixing position by the module fixing mechanism.

(69) For the machining system according to any one of article (61) to article (68), the base is configured of multiple base units on which two or more of the multiple arrangement regions are set.

The present aspect is an aspect which focuses only on a relationship between the multiple arrangement regions and the base units in the system in which the base is configured of several base units. In the present aspect, one arrangement region is not divided for two base units, but one arrangement region corresponds to any one of the multiple base units. In other words, it is possible to consider that one base unit exists for each arrangement region of the several arrangement regions. Thus, according to the present aspect, it is possible to simply modularize the base unit.

<<Variations in Modularization>>

(71) For the machining system according to any one of article (1) to article (69), one or more of the multiple working machine modules have a movable bed which moves along the track and a working machine body fixed to the movable bed.

According to the present aspect, it is possible to unitize the movable bed. For example, various working machine bodies are fixed to the unitized movable bed, and thereby it is possible to build various working machine modules. In other words, according to the present aspect, it is possible to make the movable bed common (shared) and it is possible to simply build a general-purpose system. Further, the present aspect may include a module without a movable bed, that is, a module which is not divided into the movable bed and the working machine body. Note that, in consideration of several types of modules which have different module widths, several movable beds corresponding to the module widths may be prepared.

(72) For the machining system according to article (71), the module driving mechanism that drives each working machine module in the intersecting direction is provided for each of the multiple working machine modules, and module side components which configure the module driving mechanism are arranged on the movable bed.

(73) For the machining system according to article (71) or article (72), the module fixing mechanism that fixes each working machine module at a fixing position set in the intersecting direction is provided for each of the multiple working machine modules, and module side components which configure the module fixing mechanism are arranged on the movable bed.

In a case where a mechanism is built including components provided on the base side and components provided on the module side, each of the aspects in the two articles described above can be considered as an aspect in which components on the module side are incorporated in the movable bed. According to the two aspects described above, the movable bed can be unitized in a more advanced manner.

(74) For the machining system according to any one of article (71) to article (73), each of the two or more of the multiple working machine modules has the movable bed and the movable bed of each of the two or more thereof is shared.

To put it simply, the present aspect can be considered as an aspect in which, for example, several modules are configured by one type of movable bed, which shares the same configuration. Note that, the system of the present aspect may be configured to include a module including a movable bed which is not shared.

(75) For the machining system according to any one of article (1) to article (74), one or more of the multiple working machine modules are modularized including a control panel which controls the module itself.

(76) For the machining system according to any one of article (1) to article (75), one or more of the multiple working machine modules are modularized including an operating space housing surrounding the operating space in which an operation on the work is performed.

The aspects of two articles described above can be considered as aspects in which a certain module is modularized in a more advanced manner. According to the aspects of the two articles described above, in a case where the module is replaced, it is possible to simply replace the module because this does not mean that only the working machine body is replaced.

(77) For the machining system according to any one of article (1) to article (76), the multiple working machine modules include the multiple machine tool modules, each of two or more of the multiple machine tool modules includes a spindle which rotates the work, and a spindle casing which holds the spindle, two or more of the multiple machine tool modules include two types of machine tool modules having different spindle diameters, and the external dimensions and shapes of the spindle casings provided in the two types of machine tool modules, respectively, are unified.

The present aspect can be considered as an aspect in which the spindle casing is standardized in a case where the working machine module is the machine tool module. According to the present aspect, by sharing an attachment method of the spindle casing and so on, machine tool modules with different spindle diameters can have unified module specifications, to be more particular, specifications of the machine tool itself can be unified.

<<Work Transporting Device>>

(81) For the machining system according to any one of article (1) to article (77), the machining system includes a work transporting device which transports the work on a side surface of the base in the arrangement direction.

In a case where operations are performed on work through multiple modules, there is a need to transport the work between the multiple modules, therefore, a transport device which performs transport is disposed in the system. In the present aspect, since the work transporting device is disposed on a side surface of the base, to be more particular, on a side surface of the base in the intersecting direction, it is possible to avoid interference of the module with the work transporting device when the module is drawn out. Further, in a case where operating spaces for the plurality of respective modules are positioned on the frontward side, it is desirable that the work transporting device is positioned on the side surface of the base on the frontward side. Note that, according to the present aspect, it is possible to modularize the base including the work transporting device.

(82) For the machining system according to article (81), the multiple arrangement regions having the same width in the arrangement direction are set on the base, the base is configured of the multiple base units to which two or more of the multiple arrangement regions are set, and the work transporting device is configured to include the multiple transport device units corresponding to the multiple base units.

According to the present aspect, in a case where the base is configured of the multiple base units, each base unit can be modularized (unitized) by incorporating a portion of the work transporting device.

(83) For the machining system according to any one of article (81) or article (82), the work transporting device includes multiple work beds which are provided corresponding to multiple working machine modules and on which the work is mounted, and a work bed moving device which moves the multiple work beds in the arrangement direction.

The present aspect is an aspect which focuses only on a specific structure of the work transporting device. The work transporting device according to the present aspect may have a configuration as described below. Basically, when one work bed is provided corresponding to one module, and both are referred to as a "corresponding work bed" and a "corresponding module", respectively, the corresponding work bed is configured to perform delivery of the work between the corresponding work bed and the corresponding module, in a state in which the corresponding work bed is positioned at a set position set with respect to the corresponding module. Also, the work bed moving device is configured to move the corresponding work bed to at least one of a set position set with respect to the module (hereinafter, referred to as an "upstream-side module" in some cases) on a side on which a former operation is performed and a set position set with respect to the module (hereinafter, referred to as a "downstream-side module" in some cases) on the side on which a latter operation is performed, and the work bed moving device has a configuration in which the delivery of the work is performed also between the corresponding work bed and at least one of the upstream side module and the downstream side module. Under such a configuration, the work transporting device can perform at least one of an operation of transport of the work received from the upstream side module by the corresponding work bed to the corresponding module and the operation of transport of the work received from the corresponding module by the corresponding work bed to the downstream side module. Further, the set position set for the delivery of the work described above is referred to as a "delivery position" in some cases and the delivery position at which delivery of the work is performed between the corresponding modules is referred to as a "home position" in some cases. Note that, in the multi-region occupying module described above, two or more work beds may become the work bed corresponding to the module in some cases.

Further, as described above, in a case where the base is configured of multiple base units, one base unit can be modularized incorporating two or more of the number of work beds corresponding to the number of modules mounted on the base unit, and a portion of the work bed moving device which moves the two or more work beds.

(84) For the machining system according to article (83), the work bed moving device is configured to move the multiple work beds all together.

In a case where the work bed corresponding to a certain module is moved to the delivery position with respect to the upstream side module or the downstream side module, a circumstance under which the work bed corresponding to the upstream side module or the downstream side module must be retracted can be supposed. According to present aspect, since the multiple work beds are moved all together, that is, moved synchronously by the work bed moving device, such a circumstance does not occur and smooth transport of the work is realized.

(85) For the machining system according to article (83) or article (84), multiple arrangement regions having the same widths in the arrangement direction are set on the base, and each of the multiple working machine modules is arranged to occupy one or more of the multiple arrangement regions but not to protrude into another region adjacent to one or more of the multiple arrangement regions; and the multiple work beds are arranged in parallel in the arrangement direction at a pitch equal to the width of the multiple arrangement regions, corresponding to the multiple arrangement regions, for the number of the multiple arrangement regions.

(86) For the machining system according to article (85), the work bed moving device is configured to cause the multiple work beds to move together by a distance equal to the pitch.

The aspects according to the two articles described above are aspects in which the work transporting device is configured to be associated with the multiple arrangement regions in the system described above to which the multiple arrangement regions are set. The former aspect, to put it simply, is an aspect in which the work bed is provided for each arrangement region, and the latter aspect is an aspect in which the work bed is moved in association with the arrangement region.

(87) For the machining system according to any one of article (83) to article (86), each of the multiple working machine modules is configured to perform operation with respect to a work positioned at the set operation position, and has a work transferring device which transfers the work mounted on one of the multiple work beds to the operation position and transfers the work, on which the operation is performed, to one of the multiple work beds from the operation position.

The work transferring device in the present aspect can be considered as a device which performs attachment and detachment of the work at the operation position. Further, in a case where a certain module is the "target module", the work bed on which the work (hereinafter, referred to as an "operation uncompleted work" in some cases), on which an operation is to be performed by the target module, is mounted may be separate from the work bed on which a work (hereinafter, referred to as an "operation completed work" in some cases), on which the operation has been completed by the target module, is mounted. Specifically, the operation uncompleted work mounted on the work bed corresponding to the target module may be transferred to the operation position by the work transferring device, or the operation uncompleted work may be mounted on the work bed corresponding to the upstream-side module, as the operation completed work in the upstream-side module, and after the work bed is moved to the delivery position of the target module, the work mounted on the work bed may be transferred to the operation position by the work transferring device. In addition, for example, the operation completed work may be transferred to the work bed corresponding to the target module from the operation position by the work transferring device, and the operation completed work may be transferred to the work bed corresponding to the downstream side module moved to the delivery position of the target module as the operation uncompleted work of the downstream side module by the work transferring device.

(88) For the machining system according to article (87), the machining system includes a work inverting device that inverts the work which is to be transferred or has been transferred by the work transferring device.

The present aspect is appropriate in a case where orientation of the work at the operation position of the target module and the orientation of the work at the operation position of the upstream side module or the downstream side module are reversed. For example, the work inverting device in the present aspect may be provided above the work bed in a non-moving state so as to have a relatively simple structure. In addition, that kind of work inverting device may be configured to grip the work at an intermediate portion in the vertical direction in a posture mounted on the work bed and to invert the work above the work bed. Further, the work inverting device in the present aspect may be configured to invert only the operation uncompleted work or only the operation completed work, or may be configured to invert both the operation uncompleted work and the operation completed work. In addition, the work inverting device may be provided in the working machine module or at the work transporting device. Further, there is no need to provide the an inverting device corresponding to each of the modules such that the number of inverting devices is the same as the number of modules; the work inverting device may be provided only for a portion of the modules.

<<Work Bed Lifting and Lowering Device>>

(91) For the machining system according to any one of article (83) to article (88), the work transporting device has a work bed lifting and lowering device which lifts and lowers each of the work beds for each of the multiple work beds.

As described above, in a case where the work transporting device having multiple work beds is disposed on a side surface of the base, it is desirable that the work transporting device does not interfere when the module is drawn out. In addition, in a case where the module protrudes from the side surface described above of the base, or the like, it can be thought that the work bed or the work mounted on the work bed will interfere with the module when the work bed moves in the arrangement direction. Considering the interference, it is desirable that the multiple work beds are disposed at a considerably low position. According to the present aspect, since the work bed lifting and lowering device is provided, the delivery of the work by the work bed is performed when the work bed is positioned at a relatively high position; in contrast, during a normal state or during drawing-out of the module, or during movement of the work bed in the arrangement direction, since it is possible to position the work bed at a relatively low position, it is possible to prevent the interference described above.

(92) For the machining system according to article (91), the work transporting device has a configuration in which the work bed moving device moves the multiple work beds lowered by the work bed lifting and lowering device.

(93) For the machining system according to any one of article (91) or article (92), each of the multiple working machine modules performs an operation on the work mounted on one of the multiple work beds lifted by the work bed lifting and lowering device and the work, on which the operation is performed, is mounted on one of the multiple work beds lifted by the work bed lifting and lowering device.

(94) For the machining system according to article (93), each of the multiple working machine modules is configured to perform operation with respect to the work positioned at the set operation position, and has the work transferring device which transfers, to the operation position, the work mounted on one of the multiple work beds lifted by the work bed lifting and lowering device and transfers the work, on which the operation is performed, from the operation position to one of the multiple work beds lifted by the work bed lifting and lowering device.

(95) For the machining system according to article (94), the machining system includes a work inverting device that inverts the work which is to be transferred or has been transferred by the work transferring device and is configured to invert, by the work inverting device, the work mounted on one of the multiple work beds lifted by the work bed lifting and lowering device.

The aspects according to the four articles described above are aspects which focus only on a relationship between a "work bed lifting and lowering position" as a position in the vertical direction of the work bed which is positioned by the work bed lifting and lowering device and an operation of the module or the work transporting device. According to the present aspect, as described above, it is possible to avoid interference between the work bed and the work mounted on the work bed. Further, the work bed lifting and lowering position may be set in a leveled manner or may be set in a non-leveled manner. In a case of leveled setting, two positions, the upper end position and the lower end position, may be set, or one or more intermediate positions may be set between the upper end position and the lower end position.

In other words, two or more lifting positions or two or more lowering positions may be set. Note that, the lifting position at which the work bed is positioned when the work transferring device transfers the work may be different from the lifting position at which the work bed is positioned when the work inverting device inverts the work. In this case, specifically, for example, it is possible to make the position of the latter lower than the position of the former.

(96) For the machining system according to any one of article (91) to article (95), the work bed lifting and lowering device is a two-stage lifting and lowering device which lifts and lowers one of the multiple work beds at two stages.

With the work bed lifting and lowering device in the present aspect, it is possible to consider the work bed lifting and lowering device as a so-called telescopic type lifting and lowering device. According to the present aspect, even a relatively small lifting and lowering device can produce a relatively large lifting and lowering stroke (lifting and lowering distance) of the work bed. In addition, the work bed lifting and lowering device in the present aspect is convenient in a case where an intermediate position is set as a work bed lifting and lowering position in addition to the upper end portion and the lower end position.

<<Disposal of Coolant and Shavings>>

(101) For the machining system according to any one of article (1) to article (96), a built-in coolant tank that contains coolant is provided in the base.

The "coolant" in the present aspect means cutting oil, cutting fluid, machining fluid applied to the work during a cutting process and is necessary for many machining modules. According to the present aspect, the coolant tank is provided inside the base, and because the coolant tank does not have to be provided in the module, it is possible to miniaturize the module by the size of the coolant tank.

One coolant tank may be provided on the base or multiple coolant tanks may be provided corresponding to the multiple modules or the multiple arrangement regions. In addition, two or more coolant tanks may be provided so as to be shared by several adjacent modules of the multiple modules or several adjacent arrangement regions of the multiple arrangement regions. As described above, in a case where the base is configured to include multiple base units, one coolant tank may be provided for each unit. Further, in terms of cleaning, it is desirable that the coolant tank can be drawn out.

(102) For the machining system according to article (101), the base includes a reception port which is provided protruding on the base, and receives the coolant which is discharged in the operating space in which operation on the work is performed by one of the multiple working machine modules, to the coolant tank, and a reception port retracting mechanism that retracts the reception port so as to avoid interference with the reception port when one of the multiple working machine modules is drawn out.

In order to efficiently collect the coolant discharged in the operating space into the coolant tank, it is desirable to employ a structure in which the lower section of the operating space housing surrounding the operating space is formed to be narrower toward the lower side, and the coolant discharged from the opening provided on the lower end of the portion flows into the reception port to be described below, which is provided in the base. In a case where such a structure is employed, in order to prevent the coolant from dispersing and leaking, it is desirable to employ a configuration in which the reception port is formed to have a sleeve shape or the like and protrudes upward, and the reception port and the opening, described above, provided on the lower portion of the operating space housing, overlap with each other in the vertical direction. In other words, it is desirable to employ a configuration in which the opening is positioned on the lower side from the top end of the reception port. In a case of such a configuration, the reception port protrudes into the occupying space of the module, and thereby the reception port interferes with the opening when the module is drawn out, thus leading to a situation in which the module is not properly drawn out. In the present aspect, in order not to generate such a situation, the reception port retracting mechanism is provided. Further, in the present aspect, the reception port may be provided for each module or may be provided for each arrangement region described above.

(103) For the machining system according to article (102), a module fixing mechanism that fixes each working machine module at a fixing position set in the intersecting direction is provided for each of the multiple working machine modules, and the reception port retracting mechanism is configured to retract the reception port linked with the release of the fixing of one of the multiple working machine modules by the module fixing mechanism.

The present aspect is an aspect in which the reception port retracting mechanism is linked to the module fixing mechanism. In a case of employing the module fixing mechanism, when the module is drawn out, the release of the fixing of the module by the module fixing mechanism is necessary, therefore, according to the present aspect, the two mechanisms are linked and the two mechanisms do not need to be operated individually. In addition, according to the present aspect, since the two mechanisms can share one drive source, the two mechanisms have a simple structure. Further, in a case where the module fixing mechanism is configured to include a locking portion, a locked portion and a locking portion operating mechanism, the reception port retracting mechanism may be linked to the locking portion operating mechanism.

(104) For the machining system according to any one of article (1) to article (103), the base includes an expandable coolant receiver which expands downward from a portion overhung from the base of the module and receives coolant which drops down from the portion when one of the multiple working machine modules is drawn out from the base.

In a case where the working machine module is a machine tool module, in general, the coolant is discharged to the operating space, therefore, when the module is drawn out, it can be expected that the coolant remaining in the operating space, to be more particular, the coolant remaining on the inner surface of the operating space housing will drop from the opening of the operating space housing. Also, when a portion of the module, to which an opening is provided, is overlapped with the base, the coolant drops down to the floor on which the system is disposed. According to the present aspect, it is possible to avoid such a situation.

In the present aspect, in a case where the built-in coolant tank is provided in the base, it is desirable that the coolant received by the expandable coolant receiver is guided to the coolant tank. In addition, there is no particular limitation on a specific structure of the expandable coolant receiver, for example, it is possible to employ a structure in which a plate, a pan, or the like, approaches a side surface from the base along with the drawing out of the module, a structure in which a wound sheet is unwound and expanded along with the drawing out of the module, or the like.

(105) For the machining system according to any one of article (1) to article (104), the base is configured to receive shavings produced in the operating space in which the operation is performed on the work by one of the multiple working machine modules, into the inside of the base itself, and the machining system includes a shavings discharge device which discharges the shavings received in the base from a side surface of the base.

In a case where the working machine module is the machine tool module, the shavings (so-called "chips") drop down from the operating space, therefore, it is desirable that the base is configured to receive the dropped shavings. The present aspect is an aspect which only focuses on a structure for discharging the received shavings in the system having such a configuration. According to the respective articles, the received shavings are easily discharged to the outside of the system. In a case where the built-in coolant tank is provided in the base, a configuration in which the coolant tank receives the shavings along with the coolant may be employed, and in such a configuration, the shavings discharge device may be provided in the coolant tank. In this manner, as the disposed shavings discharge device, it is possible to employ a chip conveyor having a structure in which a metal net circles around, a screw conveyor having a configuration in which a screw having a feeding plate with a spiral shape rotates, or the like. Note that, discharged shavings may be stored in a shavings collecting box or the like disposed on a side surface of the system. Further, only one shavings discharge device may be provided to the base, or multiple shavings discharge devices may be provided for each module. In a case where multiple shavings discharge devices are provided, it is possible to provide the shavings discharge device for each coolant tank when multiple built-in coolant tanks are provided; when the base is configured of multiple base units, the shavings discharge device may be provided for each base unit.

(106) For the machining system according to article (105), the shavings discharge device is configured to discharge the shavings from one of two side surfaces of the base, which are trailing from each other in the intersecting direction.

(107) For the machining system according to article (106), in a case where one of both directions opposite to each other in the intersecting direction is defined to be frontward and the other direction is defined to be rearward, one of the multiple working machine modules has an operating space on the frontward side, in which an operation is performed on a work, and the shavings discharge device is configured to discharge the shavings from the side surface of the base on the rearward side.

The aspects of the two articles described above are aspects which focus only on which side surface of the base from which the shavings are discharged by the shavings discharge device. According to the aspects of the two articles described above, the shavings collecting box or the like does not have to be disposed beside the system in the arrangement direction, such that it is possible to reduce the length of the entire system including the shavings collecting box or the like. Further, according to the latter aspect, since there is no need to dispose the shavings collecting box or the like on the operating space side, the aspect has an advantage that it is possible to easily monitor the operation state of the system.

BRIEF DESCRIPTION OF DRAWINGS

FIG. 29 is a view schematically depicting an operation of the work loader.

DESCRIPTION OF EMBODIMENTS

Hereinafter, representative embodiments of the present disclosure are described with reference to the drawings. Note that, the present disclosure can be realized, first, in the aspects described in the sections of the (aspects of the disclosure) described above, including various aspects in which various alterations or modifications are performed on the aspects, on the basis of knowledge of those skilled in the art. In addition, it is possible to use technical matter described in each section of the (aspects of the disclosure) to configure an alternative embodiment also described below.

Example

[A] Overall Configuration of Machining System

Figure 1:
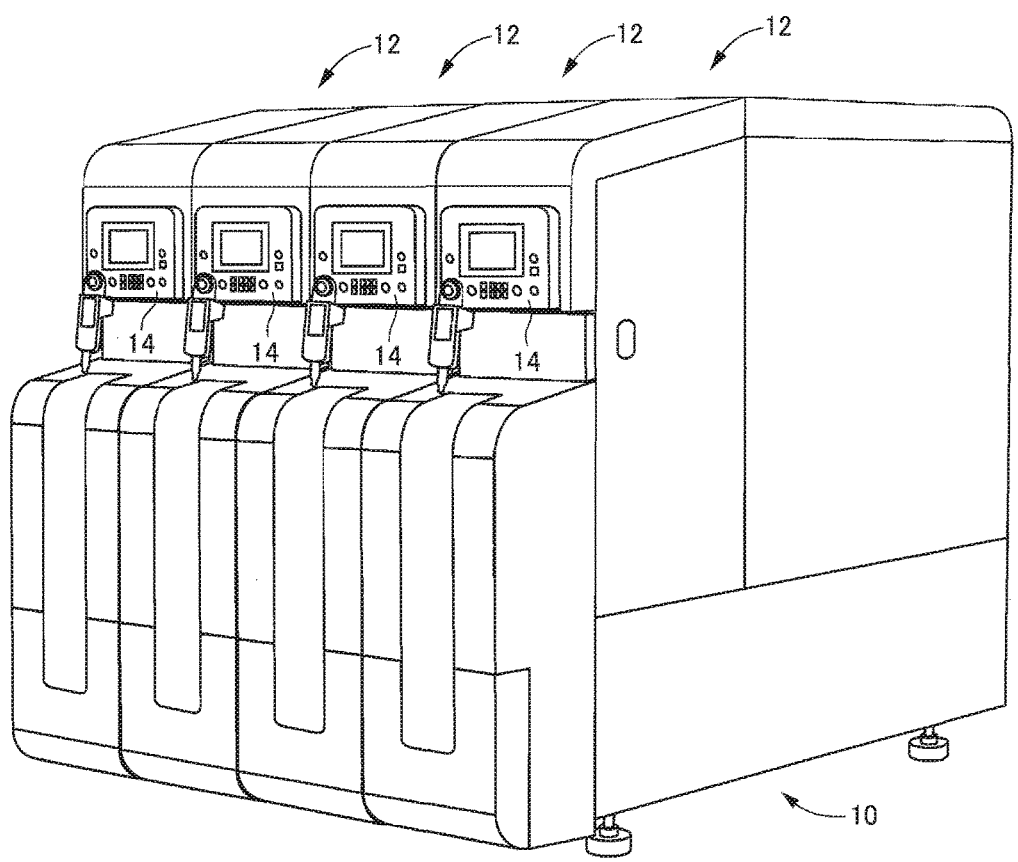
FIG. 1 is a perspective view showing a machining system of an embodiment viewed from the right front side, in which four working machine modules are arranged and mounted on one base.
Figure 2:
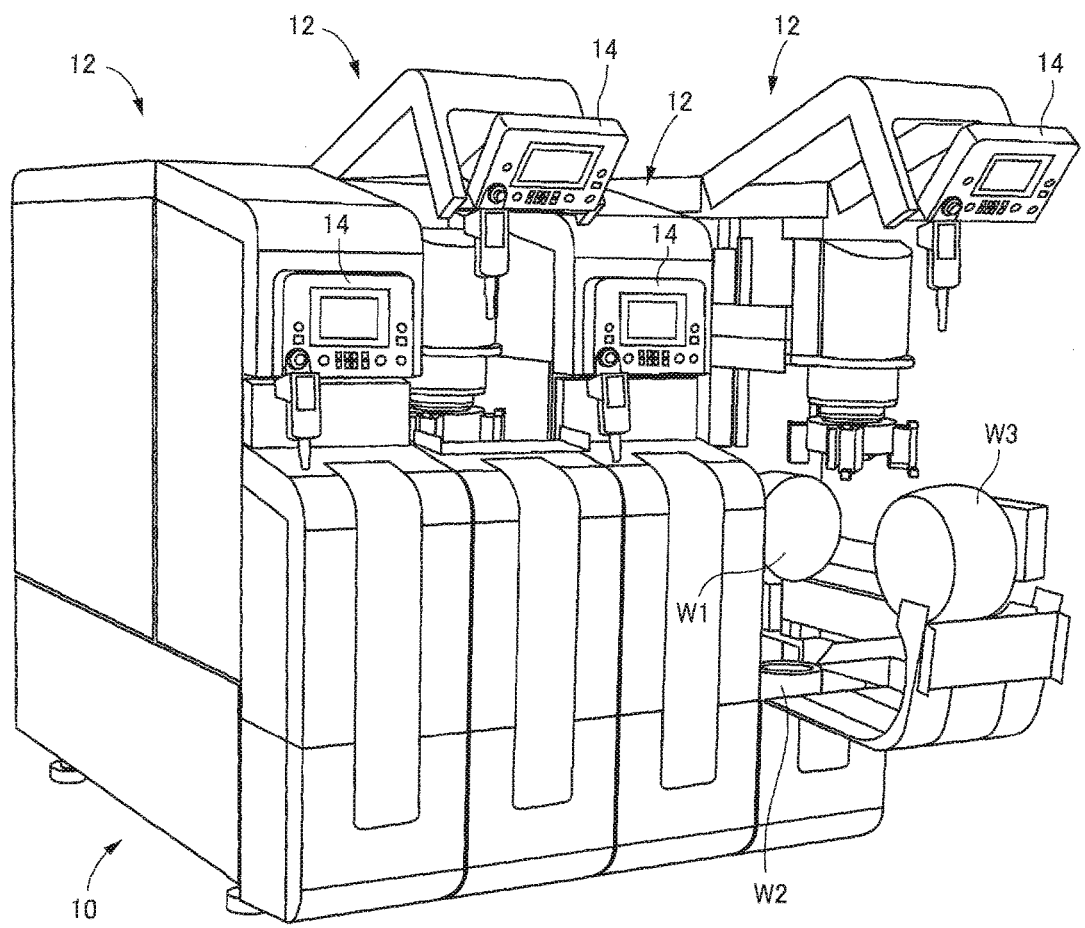
FIG. 2 is a perspective view showing the machining system of an embodiment viewed from the left front side, in a state in which some of the external panels are open.
Figure 3:
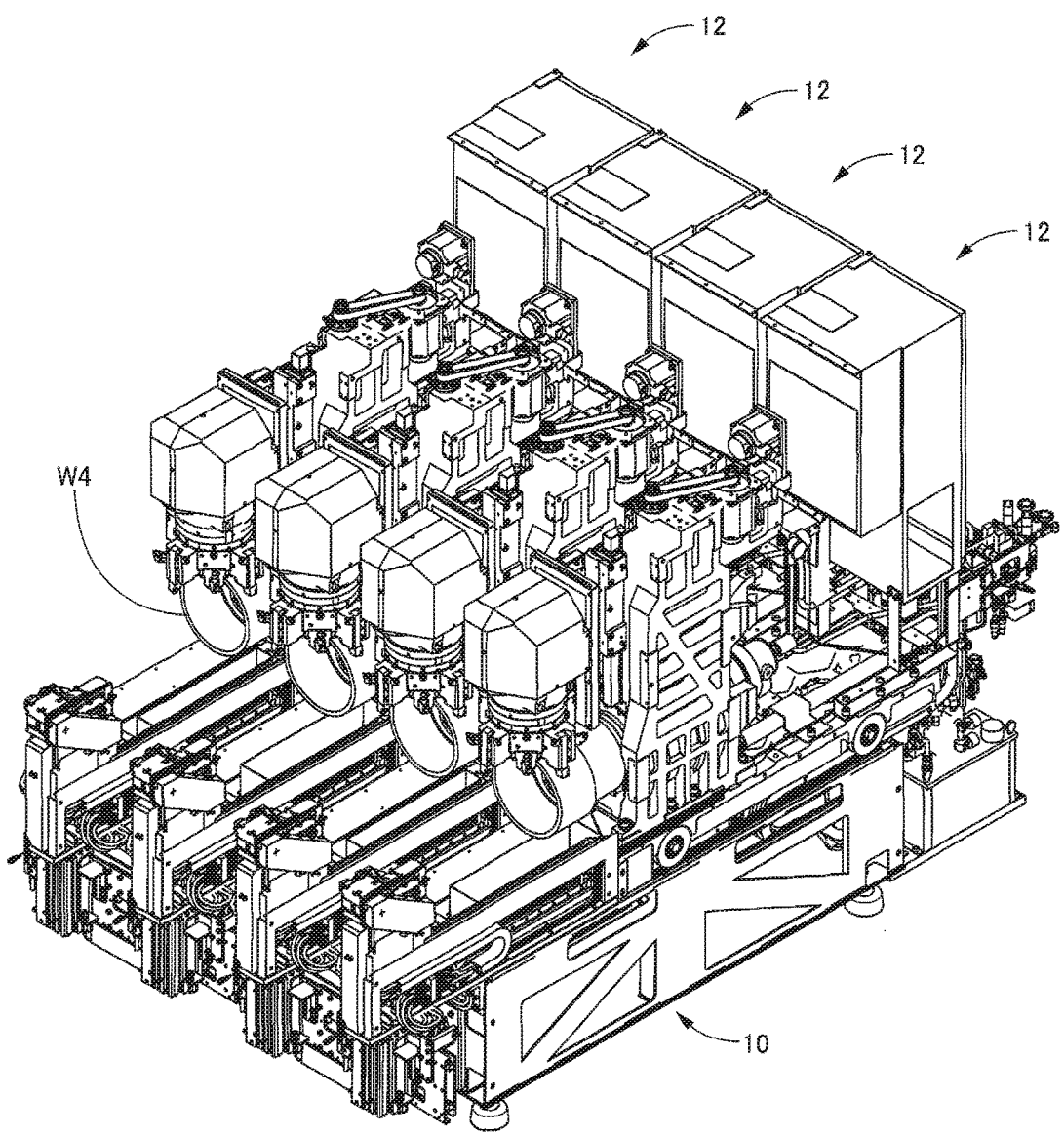
FIG. 3 is a perspective view showing the machining system of an embodiment viewed obliquely from above and from the right front side, in a state in which external panels have been removed.

As shown in FIG. 1 to FIG. 3, a machining system as an embodiment (hereinafter, simply referred to as a "system" in some cases) is configured to include a base 10 and four working machine modules (hereinafter, simply referred to as a "module" in some cases) 12 mounted on the base 10. FIG. 1 shows a state in which external panels are affixed and FIG. 2 shows a state in which some external panels have been opened. FIG. 3 shows a state in which external panels have been detached. Note that, the system is depicted such that the front side of the system, that is, a side on which the operation panel 14 is provided, faces the left side in FIG. 1, faces the right side in FIG. 2, and faces the left side in FIG. 3. In the following description, "front and rear", "right and left", and "upward and downward" related to the system mean front and rear, right and left, and upward and downward in a case where the system is viewed from the front side. In addition, since the four modules are arranged in the right-left direction, the right-left direction means an "arrangement direction" and the front-rear direction means a direction intersecting with (to be more particular, a direction orthogonal to) the arrangement direction, and thus is referred to as an "intersecting direction" in some cases.

Further, as first shown in FIG. 1 to FIG. 3, some of the following drawings are schematic, and thus a part of components or a work is omitted or is schematically depicted in the drawings. Note that, in FIG. 2, W1 represents a work positioned at a set operation position (position when fed to an operation), W2 represents a work transported by a work transporting device to be described below, and W3 represents a work existing space region when the work is transferred by the work transferring device to be described below, which are schematically shown; in FIG. 3, W4 represents a work positioned at an operation position, which is schematically shown.

As understood from FIGS. 1 to 3, four modules 12 have substantially the same shape, dimension, and structure and are closely arranged at a set arrangement pitch in the arrangement direction. The concept of the "arrangement pitch" will be described below, but is an interval between the modules 12 equal to or less than 50 mm; practically however, the four modules 12 are arranged substantially without a gap. In general, each of the modules 12 has a shape of a rectangular parallelepiped in a state in which the external panels are affixed and the dimension (hereinafter, referred to as "module width" in some cases) in the right-left direction is significantly smaller than the dimension (hereinafter, referred to as "module length" in some cases) in the front-rear direction. Also, the base 10 has substantially the same dimension (hereinafter, referred to as "base width dimension" in some cases) as the overall dimension of the four modules 12 in the right-left direction in a case where the four modules 12 are mounted in an arrangement state and has a dimension (hereinafter, referred to as "base depth dimension" in some cases) in the front-rear direction somewhat shorter than the dimension of the modules 12 in the front-rear direction. To put it simply, although the modules 12 protrude on the front side and the rear side of the base 10, the base 10 has a size just correct for mounting the four modules 12 in the right-left direction. In the configuration as described above, although four modules 12 are arranged, the length of the system (hereinafter, referred to as a "system length" in some cases) in the arrangement direction of the modules 12 is relatively short.

Figure 4:
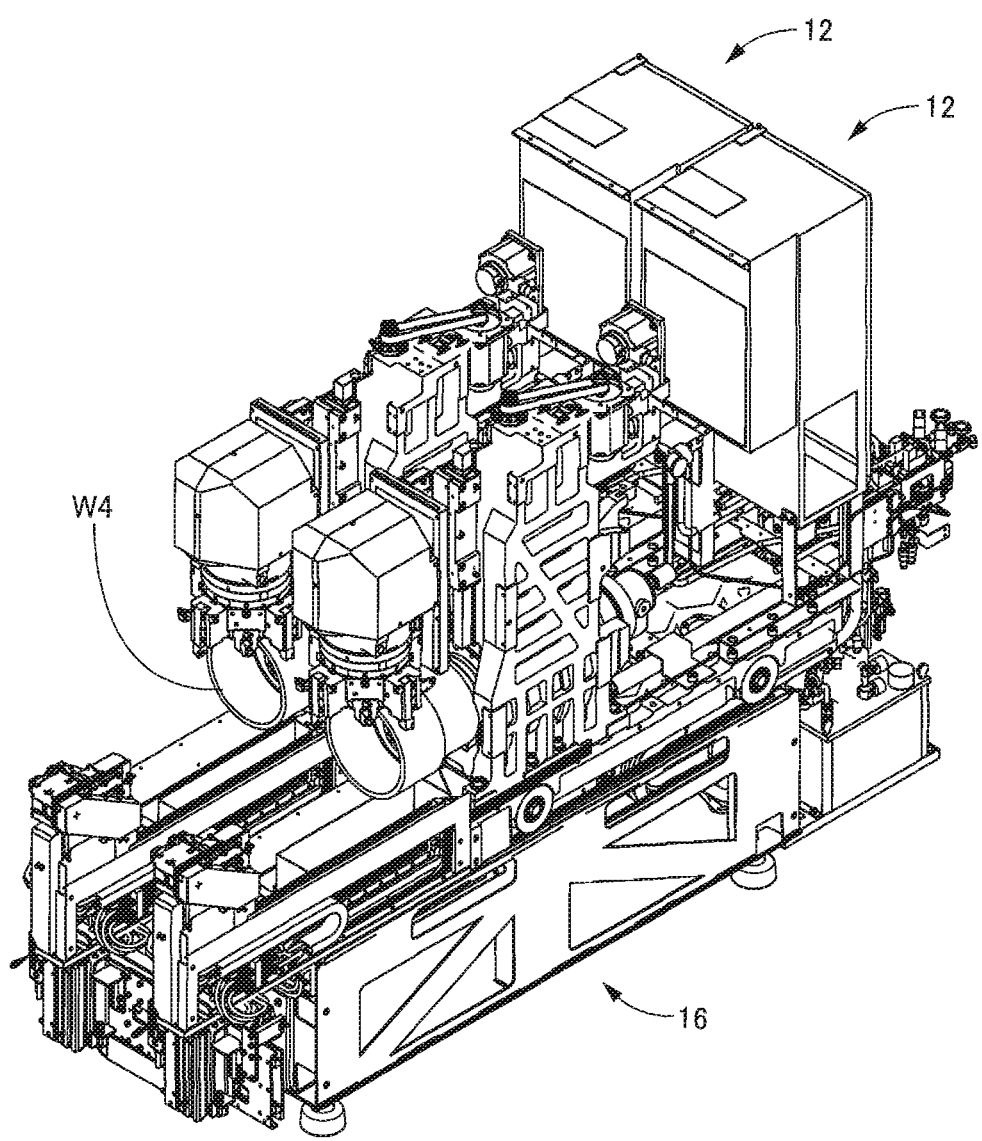
FIG. 4 is a perspective view showing one base unit constituting a base, and two working machine modules mounted on the base unit, in a state in which external panels have been removed.
Figure 5:
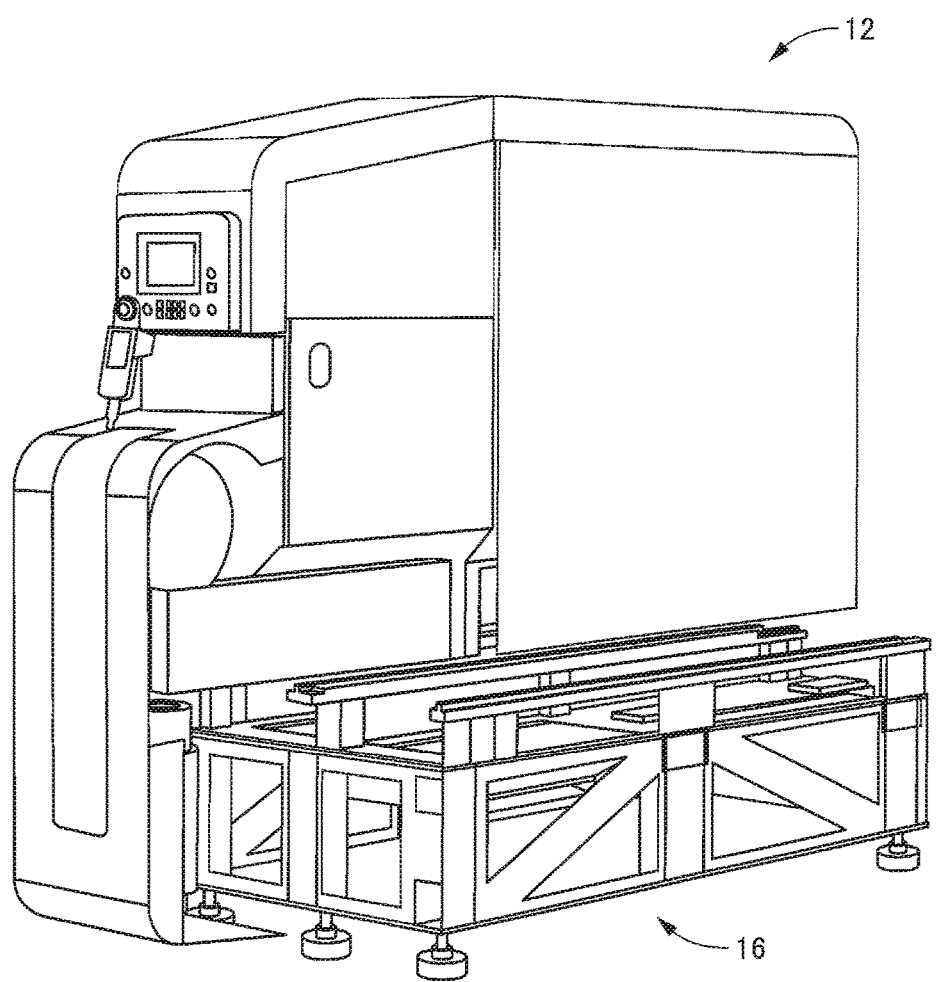
FIG. 5 is a perspective view showing the one base unit and one working machine module mounted on the base unit.
Figure 6:
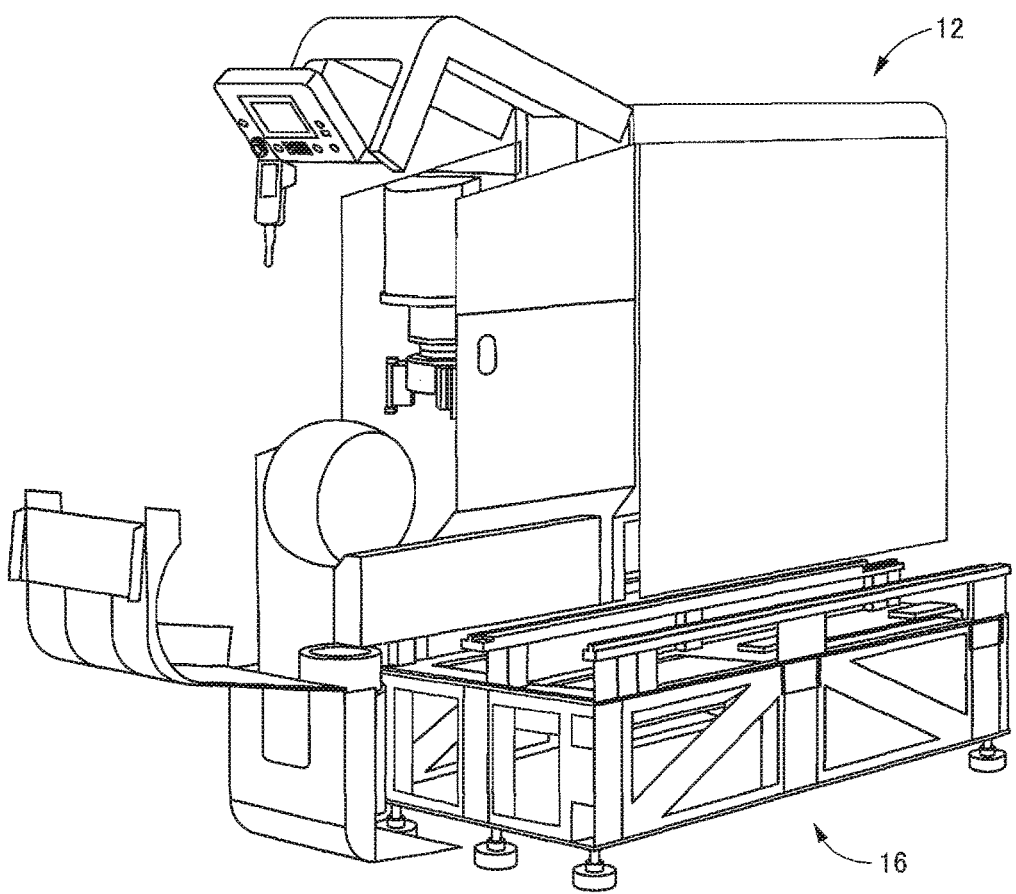
FIG. 6 is a perspective view showing one base unit constituting the base, and one working machine module mounted on the base unit, in a state in which some of the external panels are open.

The base 10 is configured to include two base units 16 arranged in parallel and fixed to each other and, as shown in FIG. 4, two modules 12 are mounted on each of the base units 16. FIG. 5 and FIG. 6 show a state in which one module 12 is mounted on one base unit 16, substantially from the same viewpoint as in FIG. 1. Note that, FIG. 6 shows a state in which some external panels are open. Each of the two base units 16 is standardized and both base units have the same shape, dimension, and structure.

As understood from FIG. 1 to FIG. 6, it is possible to consider that the respective present systems are configured of two system modules arranged in parallel, which are configured to include one base unit 16 and two modules 12 mounted on the base unit 16. In addition, from a different viewpoint, it is possible to consider the two system modules as one machining system in which multiple modules are mounted on one base as a single product. Further, the present system is configured to include two base units 16; however, a system, in which four modules are mounted on one base as a single product, can also be the system which is provided in the present disclosure.

The four modules 12 are also substantially the same in structure and, as will be described below in detail, each of the modules 12 is a lathe module in which a lathe is modularized and each of the modules is a type of machine tool module. As shown in FIG. 4, in a state in which the four modules 12 are arranged, operating spaces, which are spaces in which a cutting process (a type of operation for a work), that is, an operation on a work W4, is performed on the work W4 positioned at an operational position (position at which a work on which an operation is performed, is positioned), are arranged in parallel in the arrangement direction on the front side of the system.

A feature of the present system is that the modules 12 are individually drawn out from the base 10. In other words, when a position at which the module 12 should be positioned during an operation of the system, that is, a position at which the modules 12 are positioned in FIG. 1 and FIG. 3, is referred to as a normal position (standard position), the modules 12 can move from the normal position in the intersecting direction. A mechanism by which the module 12 can be drawn out will be described in detail later, but in the present system, the modules 12 can be drawn out from the base 10 along a track extending in the intersecting direction.

Figure 7:
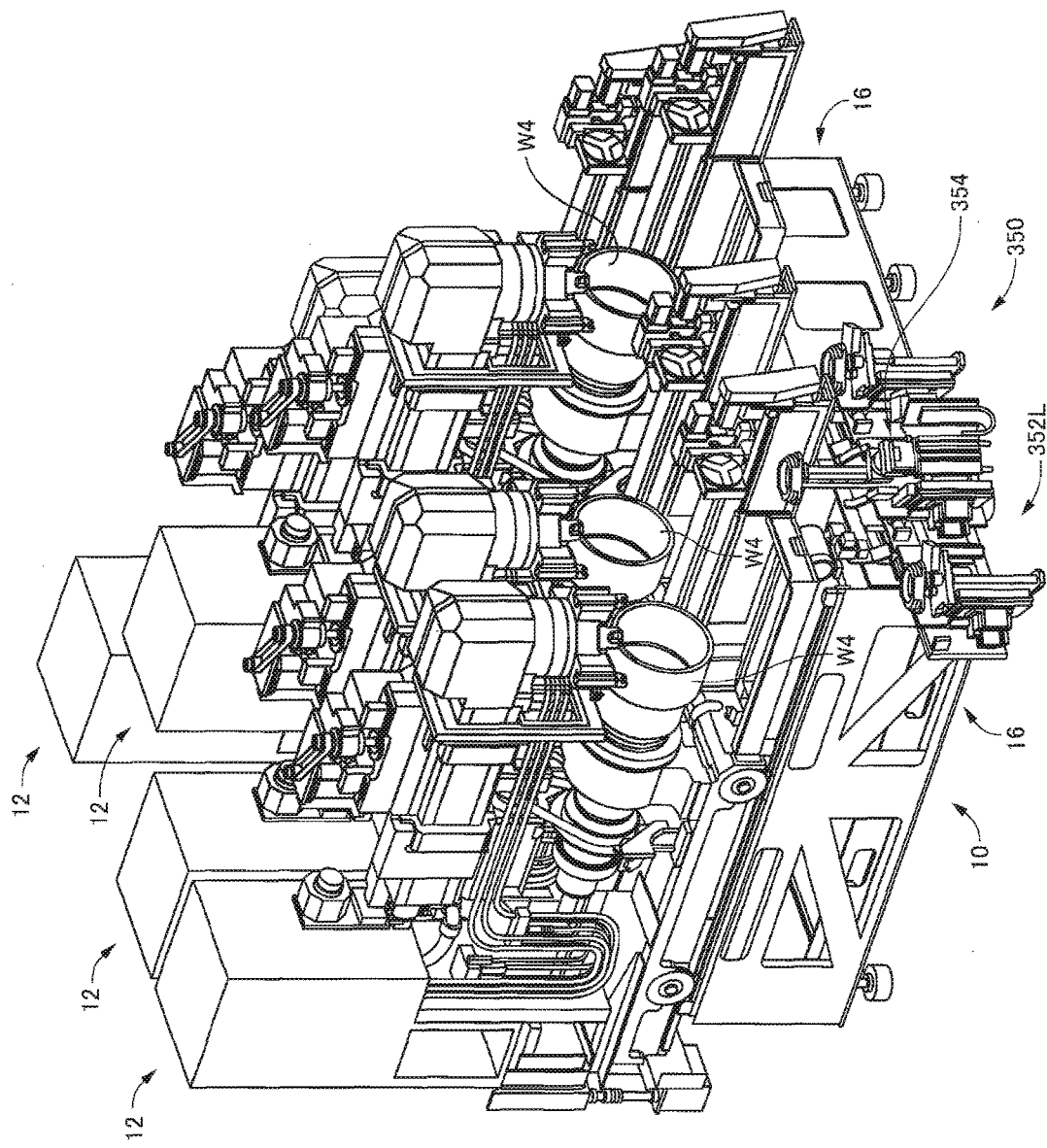
FIG. 7 is a perspective view showing the machining system of an embodiment viewed from the left front side, in a state in which the external panels have been removed.
Figure 8:
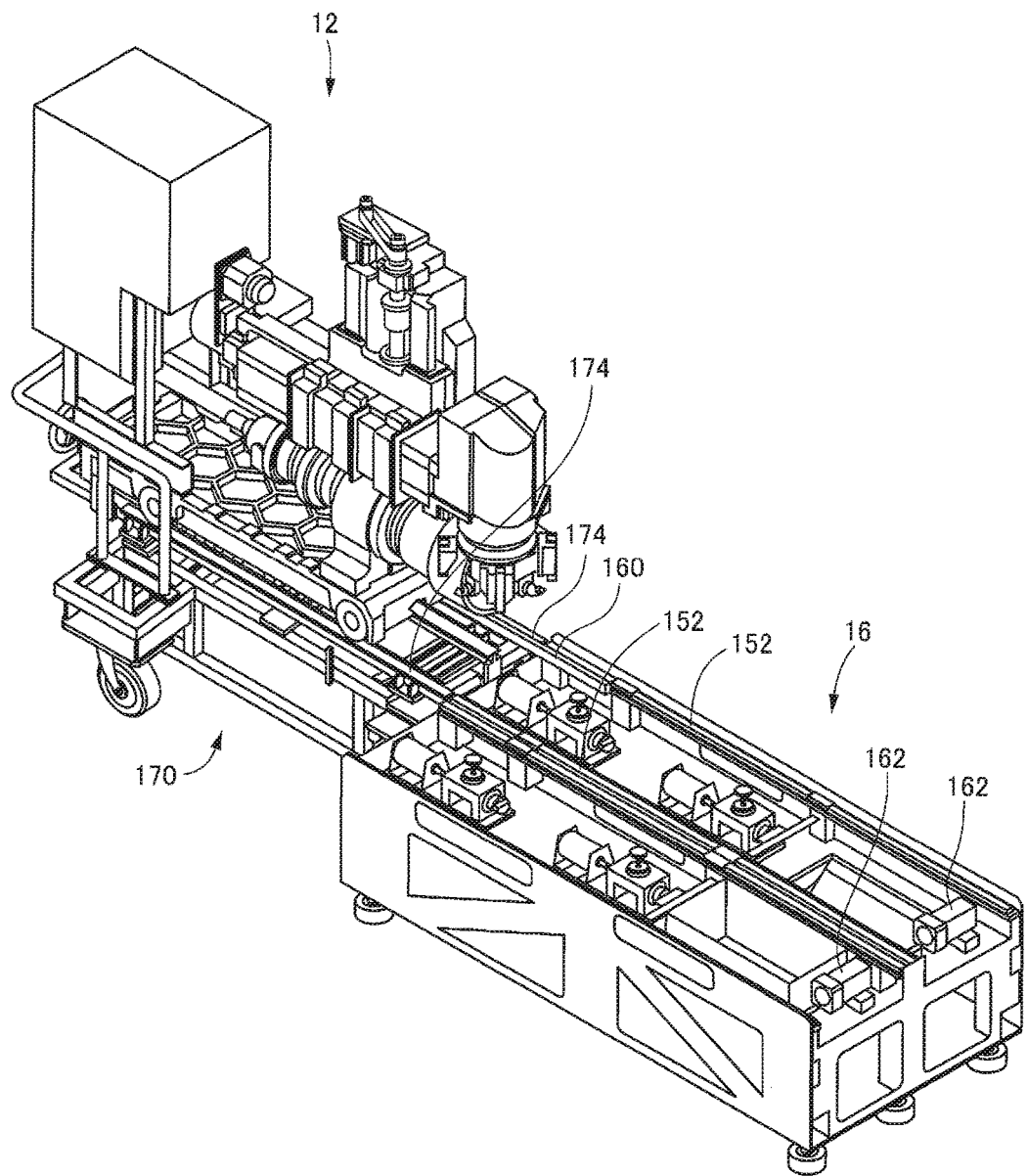
FIG. 8 is a perspective view showing a state in which the working machine module is drawn out rearward from the base.

To be more particular, the modules can be drawn out on both sides in the intersecting direction, that is, both frontward and rearward. In other words, both frontward and rearward directions are a drawing-out direction of the module 12. Further, the modules 12 can be drawn out to be detached from the base 10. Note that, FIG. 2 shows a state in which only one module 12 on the rightmost side is drawn out frontward. In addition, FIG. 7 is a perspective view showing a state with external panels removed, from a different viewpoint from that in FIG. 1, and a state in which only the second module 12 from the right is drawn out frontward. Further, FIG. 8 shows a state in which one module 12 is drawn out so as to be detached from the base 10, in particular, detached rearward from one base unit 16. Further, although FIG. 8 shows the module 12 from which external panels have been removed, the module 12 including the external panels is modularized, as will be described below; therefore, it is possible to draw out the module 12 in a state in which the external panels are attached, so as to be detached from the base 10. In addition, a portion of the external panel on the frontward side is supported on the base 10, and by lowering the upper portion of the front-side portion to the front, it is possible to draw out the module 12 frontward.

Although detailed description will be given below, the drawing-out of the module 12 frontward is performed during, mainly, replacement of the tool, a tooling change in response to a work change, or the like and the module 12 is mainly drawn out on the rearward side during the replacement of the module 12. In this manner, because each of the modules 12 is able to be drawn out, in the system, although the modules 12 are disposed to be closely adjacent, it is possible to simply perform an operation such as maintenance, a tooling change, and replacement of each of the modules 12.

Here, the systems shown in FIG. 3 and FIG. 4 and the system shown in FIG. 7 have a difference in detail, but the difference is slight, so the systems have the same function and it is possible to consider all the systems as the system of the embodiments. Also, for convenience, unless otherwise noted, the following description is provided with regard to the system shown in FIG. 7.

[B] Configuration of Working Machine Module

Figure 9:
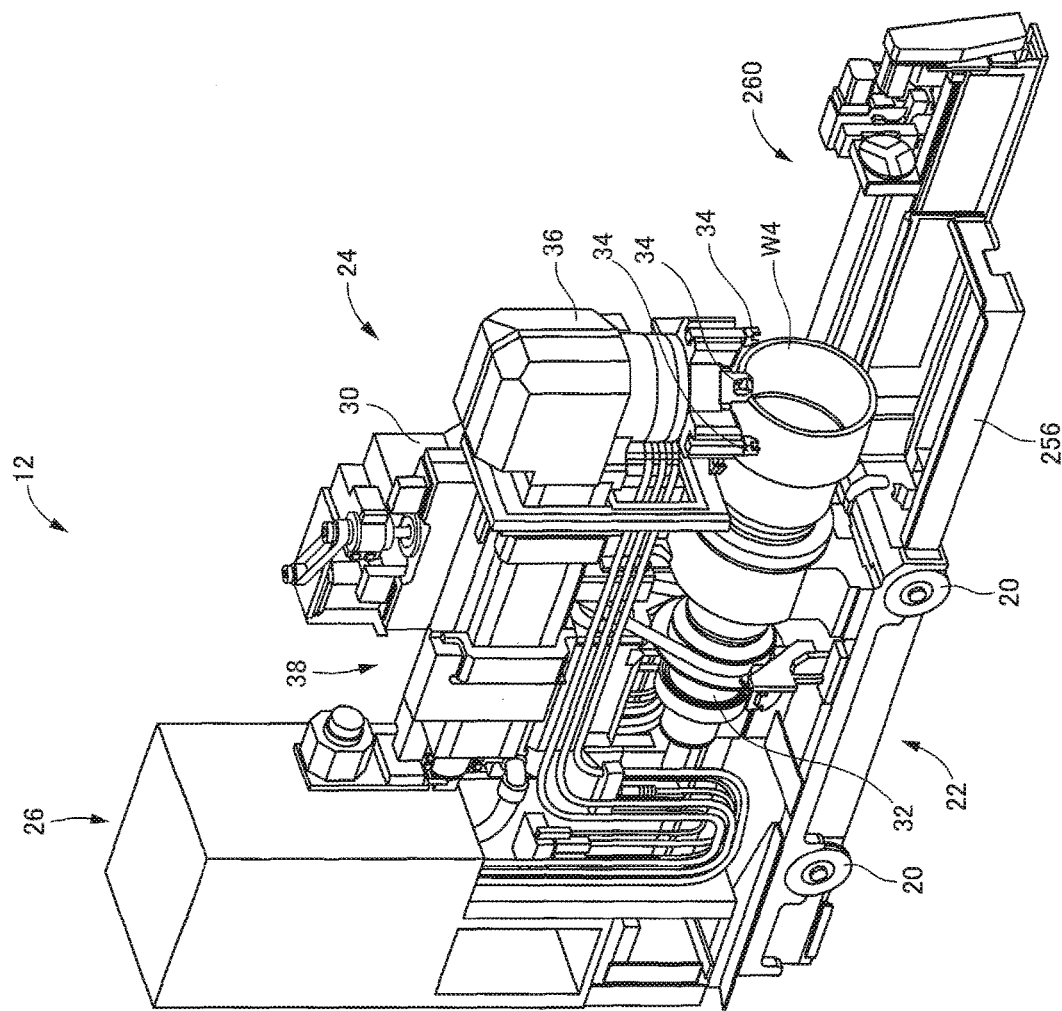
FIG. 9 is a perspective view showing the working machine module.

The working machine module 12 is a lathe module as described above, and, as shown in FIG. 9, includes a bed 22 as a movable bed which can hold multiple wheels 20 in a rotatable manner, a lathe body 24 as a working machine body fixed on the bed 22, and a control panel 26 as a control device that controls the lathe body 24. The lathe body 24 is configured to include a support 30 as a structure frame which is provided upright on the bed 22, a spindle 32 (so-called main shaft) which is supported by the support 30 at the lower section thereof and rotates the work W4 due to rotation of the spindle itself, a tool holding head (hereinafter, referred to simply as a "head" in some cases) 36 that holds multiple bites 34 which are tools, respectively, and a head moving device 38 which is supported by the support 30 at the upper section thereof and causes the head 36 to move vertically and frontward and rearward.

Figure 10:
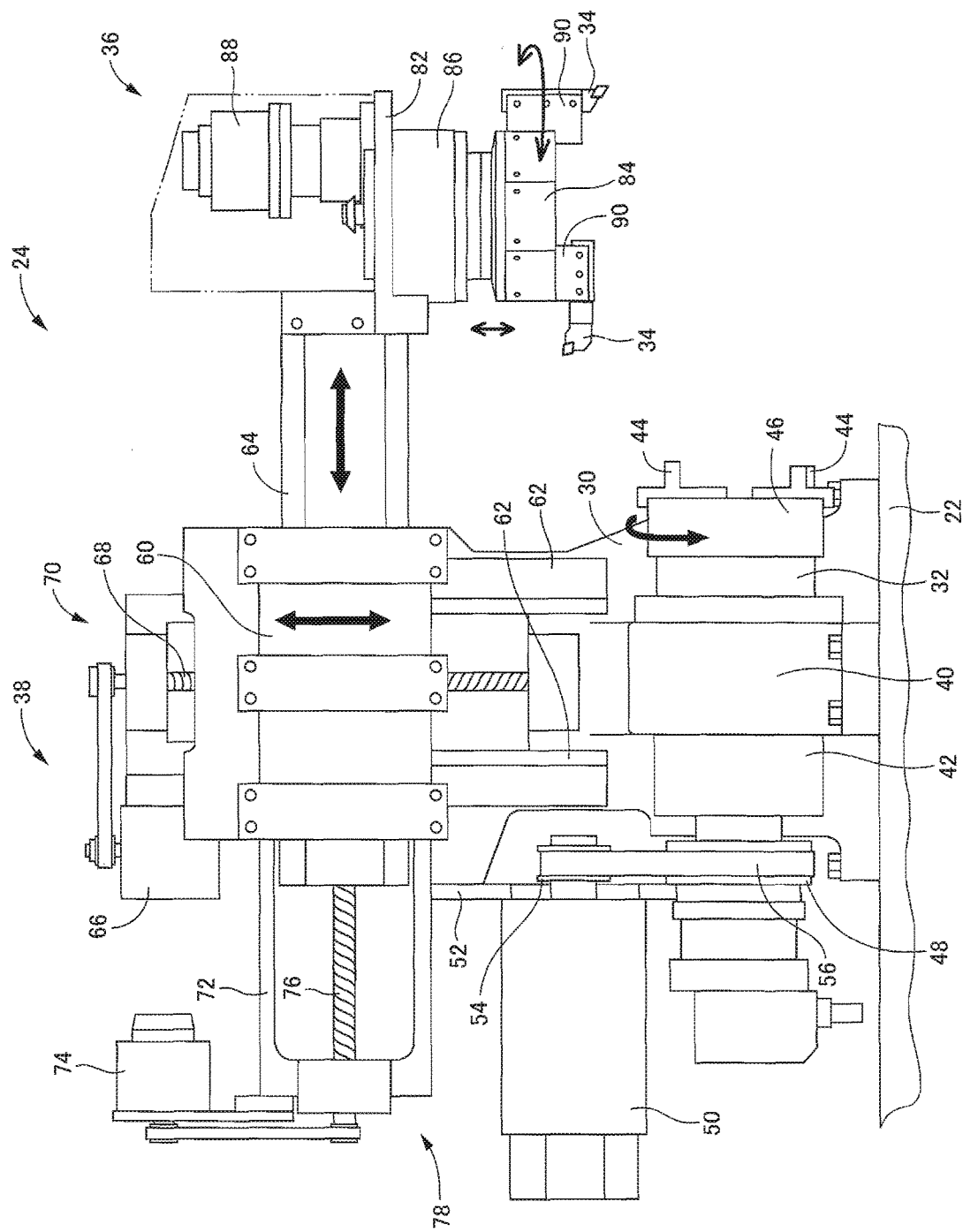
FIG. 10 is a side view showing a lathe body as a working machine body of the working machine module.

To describe the lathe body 24 in detail with reference to FIG. 10, the support 30, which is provided upright on and fixed to the bed 22, includes a spindle holding section 40 on the lower section and the spindle 32, which will be described below in detail, is supported by the spindle holding section 40 via a spindle casing 42. A chuck 46 having three claws 44 is attached to the front end of the spindle 32. The chuck 46 is provided to grip a work during a machining process and it is possible to consider the chuck as a type of work holding tool. Detailed description of the structure is omitted; however the claw 44 is formed to be automatically opened and closed. A pulley 48 is externally fitted to the rear end portion of the spindle 32. On the other hand, a spindle rotating motor 50 is supported via a base plate 52 on the rear side of the support 30 and a pulley 54 is also fitted to the shaft of the motor 50. A V belt 56 is wound around the two pulleys 48 and 54 and the spindle 32 is driven to rotate by the rotation of the motor 50.

A slider 60 is supported by the support 30 at the upper section to be vertically slidable along a pair of guides 62. The slider 60 is formed as a substantially square tube such that a beam 64 can be inserted therein so as to be slidable frontward and rearward. The slider 60 is lifted and lowered by a slider lifting and lowering mechanism 70 which is configured of a ball screw mechanism or the like, having a slider lifting and lowering motor 66 and a threaded rod 68 as main components. On the other hand, a support frame 72 is fixed to the support 30 on the rear side and the beam 64 is moved frontward and rearward by a beam frontward-rearward moving mechanism 78 which is configured of a ball screw mechanism or the like, having a beam frontward-rearward moving motor 74 supported by the support frame 72, and a threaded rod 76 as main components. The head 36 described above is fixed to the front end of the beam 64 and the head 36 moves vertically through the lifting and lowering of the slider 60 and moves frontward and rearward through the frontward and rearward movement of the beam 64. In other words, the head moving device 38 described above is configured to include the slider 60, the beam 64, the slider lifting and lowering mechanism 70, the beam frontward-rearward moving mechanism 78, and so on.

The head 36 is configured to include a base member 82, a turret 84 held to the base member 82, a turret intermittent-rotating mechanism 86 which is held to the base member 82 and intermittently rotates the turret 84, and a turret rotating motor 88 as a drive source of the rotation of the turret 84 by the turret intermittent-rotating mechanism 86. The turret 84 is formed to have substantially a relatively short octagonal column shape and, as shown in FIG. 10, a total of eight bites 34 can be attached to the outer circumferential surface or to the lower surface via a bite holding tool 90. For example, a cutting process is performed using the bite 34 positioned on the rearmost side through intermittent rotation. Note that, although detailed description is omitted, the turret intermittent-rotating mechanism 86 has a structure in which the turret 84 is intermittently rotated in a state in which the turret 84 is lowered, lifted at any given intermittently rotated position, and fixed at the lifted position. Further, instead of the head 36 described above, a head that includes a bite holder which is a comb-teeth type bite holder, that is, a holder holding multiple bites, and that moves such that any one of the multiple bites can perform cutting may be employed.

Figure 11:
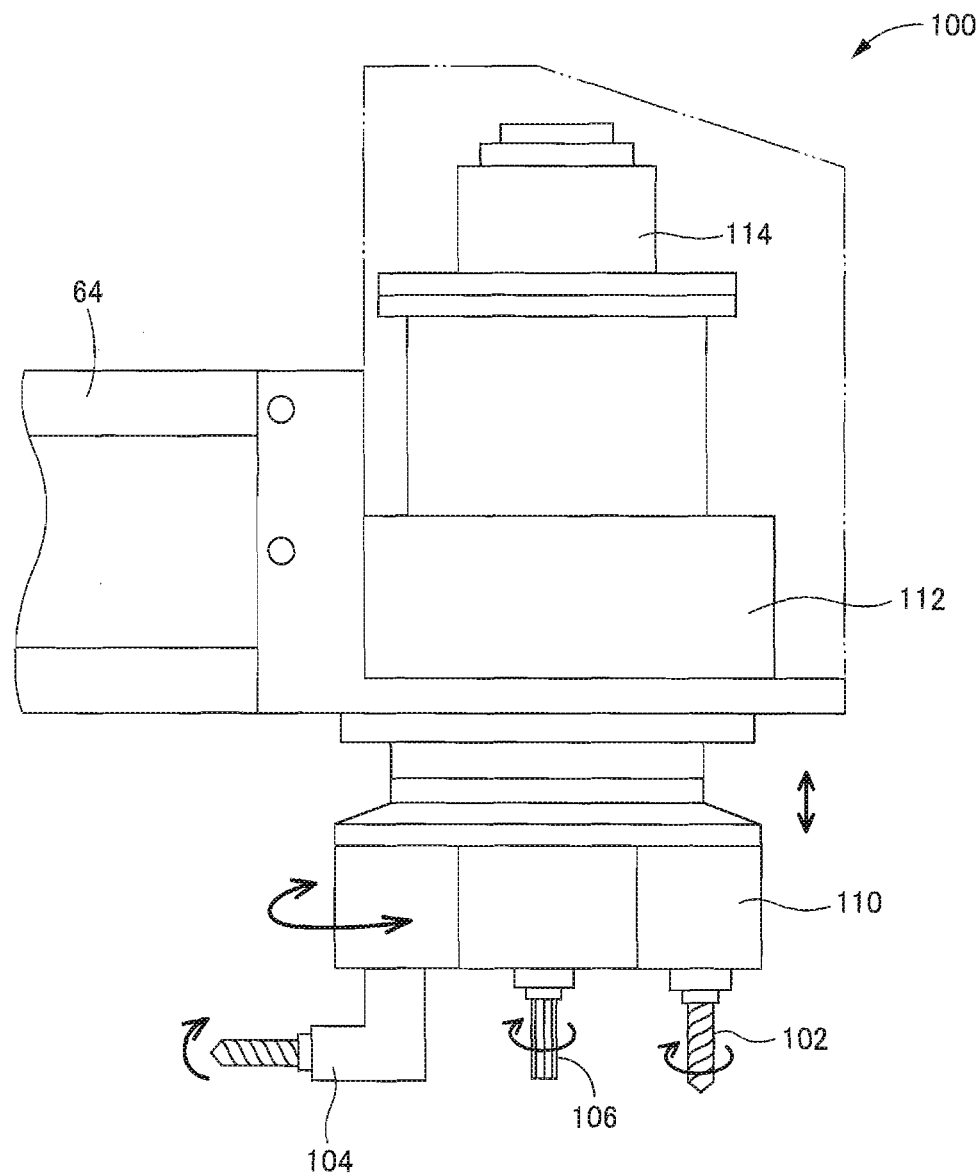
FIG. 11 is a side view showing a tool holding head which the working machine module can employ separately.

Further, instead of the tool holding head 36 described above, for example, a tool holding head 100 as shown in FIG. 11 may be employed. The head 100 is a head which can hold a rotating tool such as a drill, a mill, or the like as a tool and can rotate the tools. FIG. 11 shows a state in which a straight-type drill 102, an angular-type drill 104, and an end mill 106 are attached as the rotating tools. Similar to the head 36, the head 100 is configured to include a base member 108, a turret 110 held to the base member 108, a rotating mechanism 112 which is held to the base member 108 and functions as a turret intermittent-rotating mechanism that intermittently rotates the turret, and a rotating motor 114 as a drive source of the rotation of the turret 110 by the rotating mechanism 112. For example, drilling or milling is performed using the rotating tool which is positioned on the rearmost side through the intermittent rotation.

Although detailed description of the structure is omitted, the rotating motor 114 also functions as a motor which causes the rotating tool itself to rotate and the rotating mechanism 112 also functions as a rotation transmitting mechanism which causes the rotating tool to rotate due to the rotation of the motor 114. In other words, the present head 100 has a structure in which the rotation of the turret 110 and the rotation of the rotating tool are selected to be performed by one motor 114 and the rotating mechanism 112 and the rotating motor 114 configure a tool rotating device which causes a tool to rotate around the shaft thereof. Further, in a case of employing the head 100, in the midst of performing a process on a work by a rotating tool, the spindle 32 basically does not rotate except for special processing such as helical processing. In this case, the spindle 32 is to configure a so-called index table (a device that indexes works). In other words, the module 12 that employs the head 100 becomes a drilling machine/milling machine module which performs fixing of a work in a state in which the work is positioned at any given rotating position through the rotation of the spindle 32 and performs at least one of drilling and milling on the work by at least one of a drill and a mill as a tool.

In the structure as described above, the module 12 is disposed to have a posture in which the spindle 32 extends in the front-rear direction which is the intersecting direction; therefore, it is possible for the module to be referred to as a spindle horizontal-arranging type module and it is possible for the module to have a small width because the module is the spindle horizontal-arranging type module. In addition, the head moving device 38 is provided to have a posture in which the beam 64 extends parallel to a spindle shaft line above the spindle 32, to be more particular, immediately on a spindle shaft line which is an axial line of the spindle 32, which also contributes to a decrease of the module width. In addition, the heads 36 and 100 are configured to select and hold one of multiple tools in a usable manner and to perform a process on the work by one tool selected from the multiple tools. Therefore, the present system can perform relatively complicated machining with a relatively small module.

The control panel 26 as a control device of the lathe body 24 has a door on the rearward side, although not shown in the drawings, and it is easy to perform inspection, adjustment, maintenance, or the like, of the inside of the control panel 26 of any module 12 from the rearward side of the system even in a state in which the module 12 is disposed on the base 10. Further, in the present system, since the module 12 is modularized including the control panel 26, the module 12 can be considered to be a module which is significantly and highly modularized. Note that, in the present system, the module 12 is modularized including the external panels of the module 12.

Figure 12A:
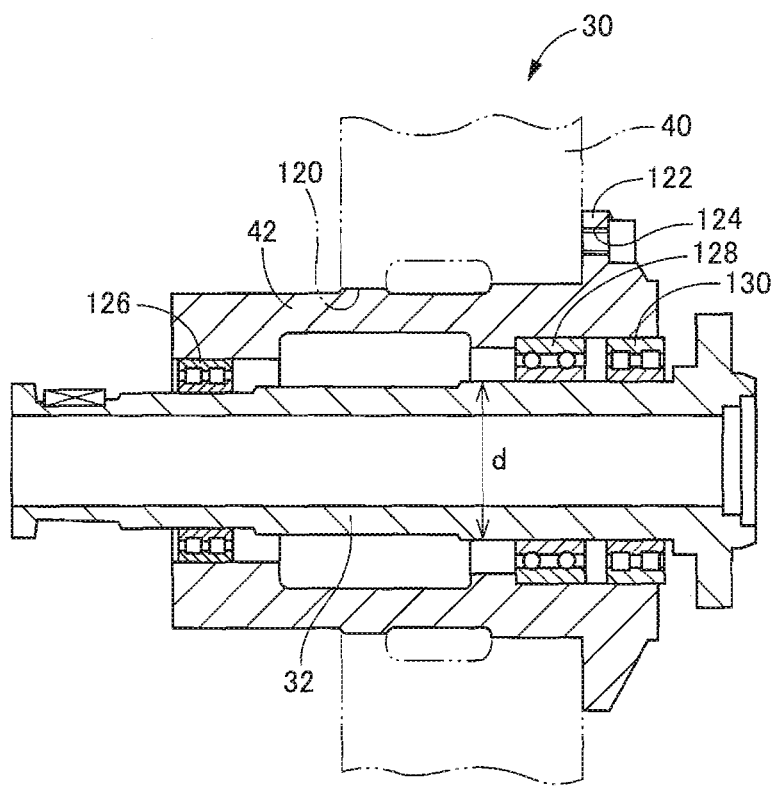
FIG. 12 is a sectional view depicting a structure related to attachment of a spindle provided in the working machine module.

Here, to describe the attachment of the spindle 32 to the support 30 in detail, as shown in FIG. 12A, the spindle 32 is attached via the spindle casing 42 so as to be inserted into a holding hole 120 provided in a spindle holding section 40 of the support 30. The spindle casing 42 has substantially a cylindrical shape having a flange 122 on the front end and can be referred to as a collar. The spindle casing 42 is fastened to the spindle holding section 40 with a bolt using an attachment hole 124 formed in the flange 122. The spindle 32 is supported by three bearings 126, 128, and 130 and can rotate with respect to the spindle casing 42, that is, to the support 30.

Figure 12B:
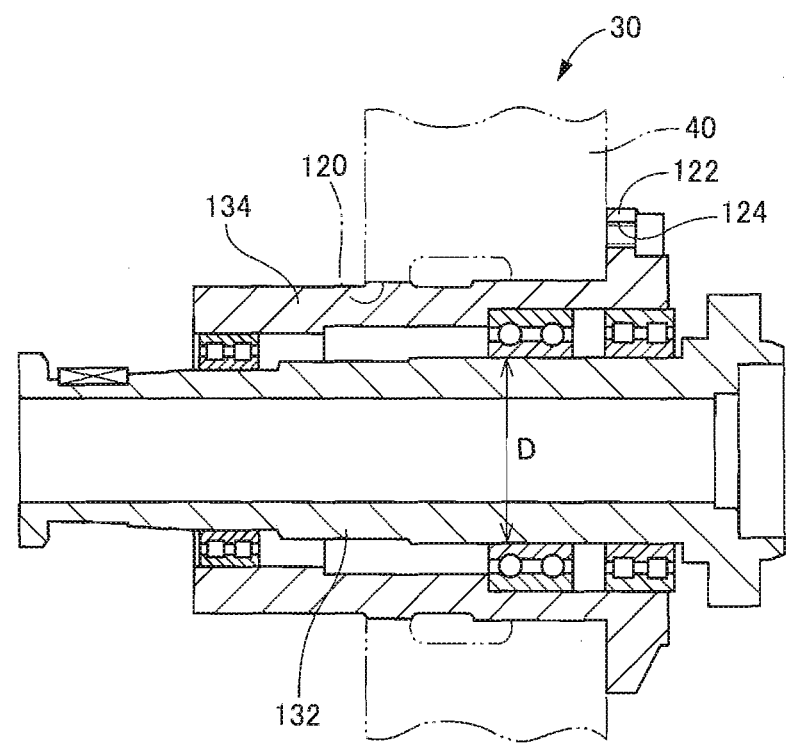

Depending on a size of the work, size of a machining load, or the like, not only the spindle 32 having a diameter d, but also a spindle having a diameter different from the diameter d is attached in some cases. For example, in a case where a spindle 132 having a diameter D (>d) is attached, as shown in FIG. 12B, a spindle casing 134 different from the spindle casing 42, to be more particular, a spindle casing 134 which has the same external dimension and shape but has a different inner diameter is employed, whereby the spindle 132 can be attached easily. Further, the attachment hole 124 provided on the flange 122 has the same diameter, number, and arrangement pitch, or the like of the spindle casing 42. From a different viewpoint, unification of the external dimensions, and shape of the spindle casing, that is, standardization of the spindle casing is achieved and thereby, in the system, it is easy to perform modification of the spindle or mixing of two types of machine tool modules having spindles with diameters different from each other.

[C] Drawing-Out of Working Machine Module from Base

Figure 13:
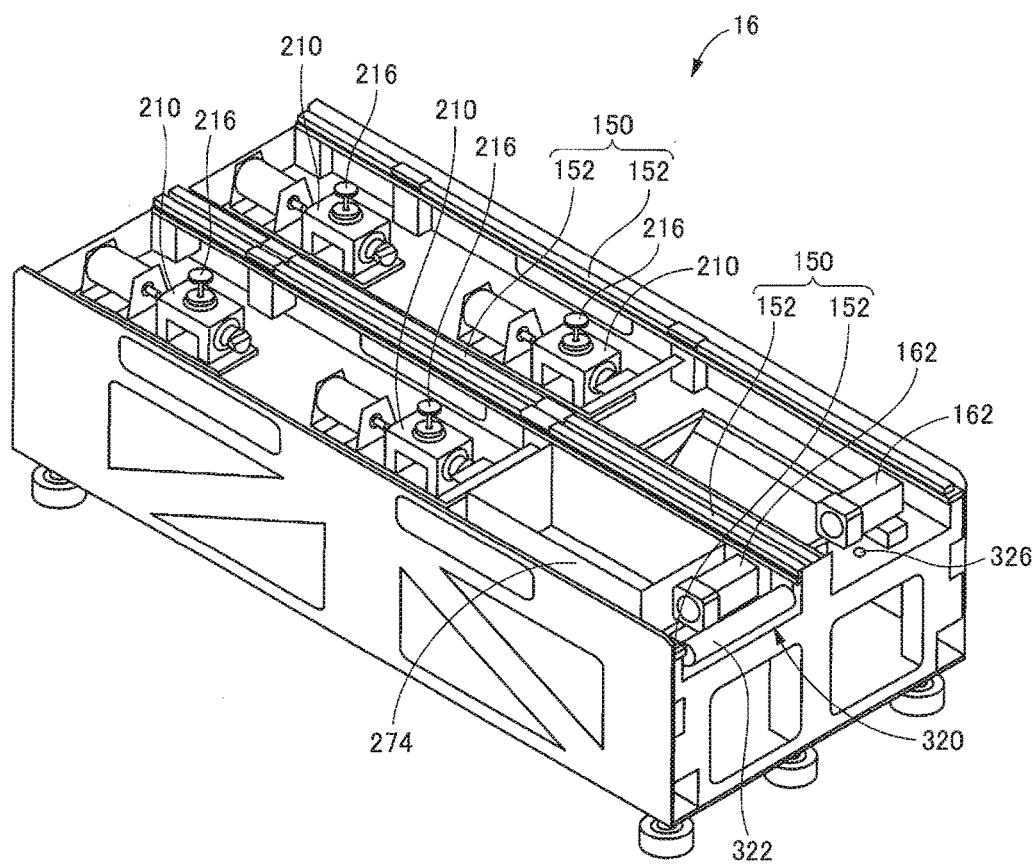
FIG. 13 is a perspective view showing one base unit constituting the base.
Figure 14A:
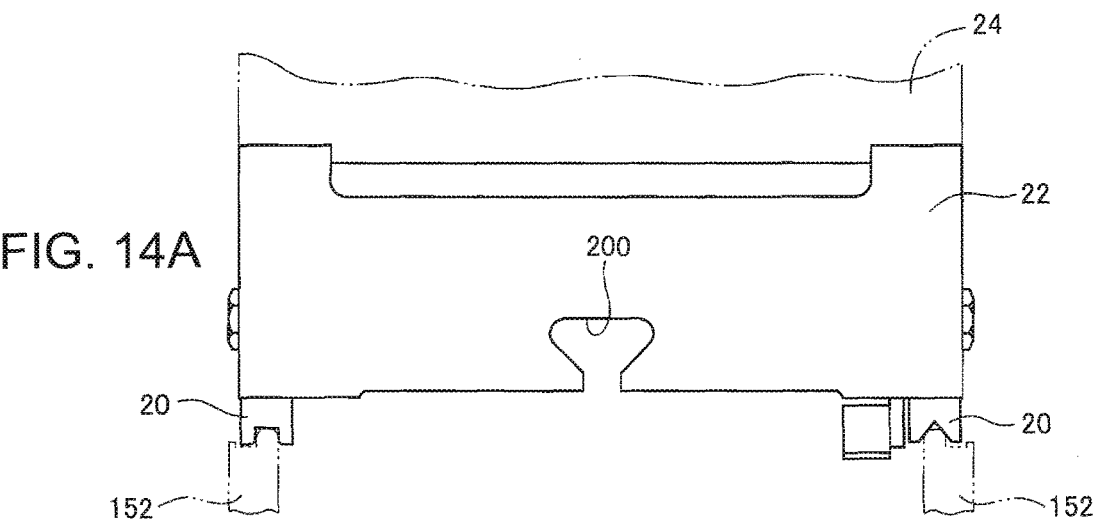
FIG. 14 is a front view showing a bed of the working machine module and front views showing a part of the bed.

As shown in FIG. 13, the number of rail pairs 150 corresponding to the number of modules 12 mounted on each base unit 16, that is, specifically, two rail pairs 150, are provided parallel to the arrangement direction (right-left direction). One rail pair 150 has a pair of rails 152 laid out at an interval extending in the intersecting direction (front-rear direction). The rails 152 function as an item defining a track on which the module 12 moves when the module 12 is drawn out, that is, function as a track defining member. In the respective modules 12, a pair of wheels 20 at each of the front and rear, that is, two pairs of wheels 20 are rotatably held in the bed 22. The interval between the pair of wheels 20 is equal to the interval between the pair of rails 152 constituting the rail pair 150 and one of the pairs of wheels 20 rolls on the one pair of rails 152 and the other pair of wheels rolls on the other pair of rails. Four rail pairs 150 corresponding to the four modules 12 are provided in the entire base 10. In such a structure, the module 12 can be easily drawn out from the base 10, to be more particular, from the base unit 16 on which the module is mounted, in the intersecting direction. Further, to describe engagement between one pair of rails 152 and one pair of wheels 20 with reference to FIG. 14A, one rail (on the right side) of the two rails 152 constituting the rail pair 150 is arch-shaped in a cross-sectional shape and the other rail (on the left side) has a shape having both side surfaces parallel to each other. Since one wheel (on the left side) of one pair of wheels 20 has a shape to pinch both the side surfaces substantially without a gap, a position of the module 12 mounted on the base 10 is accurately defined in the arrangement direction.

Figure 15:
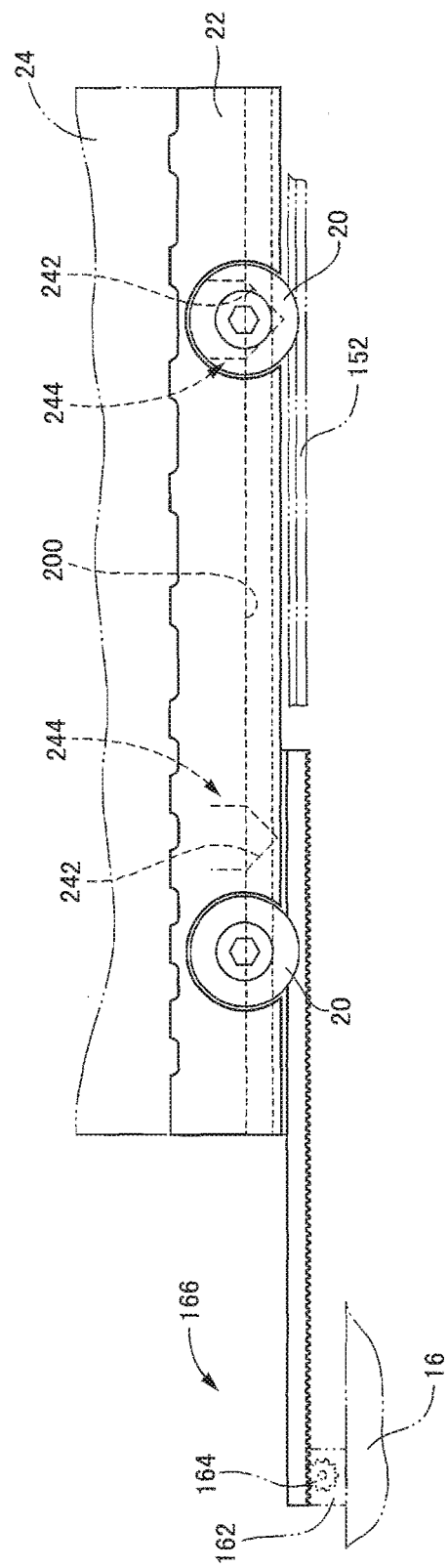
FIG. 15 is a side view showing the bed of the working machine module.

In the present system, the module 12 can be drawn out frontward using power of an electric motor, without depending on human power. As shown in FIG. 15, a rack bar (referred to simply as a "rack" in some cases) 160 is attached to the bed 22 of each module 12, in a state of extending out frontward from the bed on the right front side of the bed (refer to FIG. 8). The rack bar 160 has rack teeth formed on the lower surface thereof. A module drawing-out motor 162 as a drive source is provided (refer to FIG. 8 and FIG. 13) in the front end portion of the top surface of the base 10 and a pinion 164 is fixed to a motor shaft of the motor 162. The pinion 164 meshes with the front end portion of the rack bar 160 when the module 12 is positioned at the normal position. The module 12 is driven frontward by the motor 162 being rotated in a forward direction; the module 12 is driven rearward by the motor being rotated in a reverse direction.

In other words, a module driving mechanism 166 that drives the module 12 in the intersecting direction is configured including the rack bar 160, the motor 162, and the pinion 164.

Drawing-out of the module 12 from the normal position and returning of the module 12 to the normal position using the module driving mechanism 166 can be performed through an operational input to an operation panel 14 of the module 12 by an operator. Note that, with the drawing-out of the module 12 by the operational input, the module 12 moves from the normal position to a position frontward by a set distance, that is, to a set drawn-out position to be described below. Further, in the present system, the rack bar 160 constituting the module driving mechanism 166 is a module-side component disposed in the bed 22 as a movable bed and the motor 162 and the pinion 164 are base-side components disposed in the base 10.

Furthermore, the bed 22 as the movable bed is one modularized including the rack bar 160 as a module-side component. Note that, the module driving mechanism may also be configured such that the rack bar is disposed in the base 10 as a base-side component and the motor and the pinion are disposed in the module 12 as a module-side components. In addition, in the present system, four module driving mechanisms are provided corresponding to the four modules 12; however, one or more module driving mechanisms may be provided corresponding to only some of the four modules 12.

Figure 16:
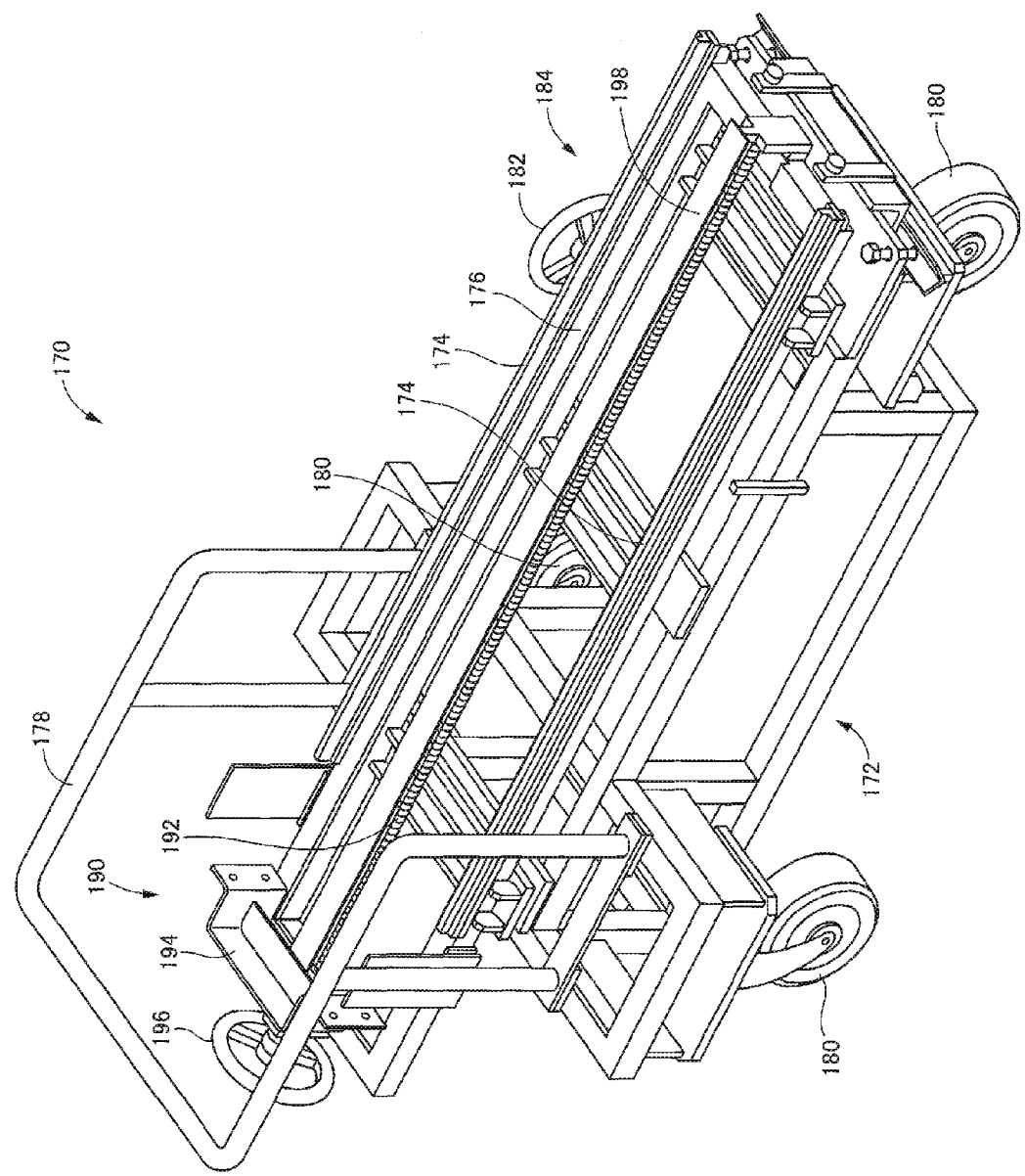
FIG. 16 is a perspective view showing a transfer cart by which the working machine module is transferred.

As shown in FIG. 8, the rearward drawing-out of the module 12 is performed using a transfer cart 170. As shown in FIG. 16, the transfer cart 170 is configured to include a base 172, a frame 176 which is supported on the base 172 and to which a pair of rails 174 are fixed, a grip 178 which is gripped by an operator when the transfer cart 170 is moved, and three casters 180 for making the transfer cart 170 movable. As shown in FIG. 8, beside the base 10 on the rear side, the transfer cart 170 is fixed to extend the track defined by one of the four rail pairs 150 provided on the base 10. The pair of rails 174 have substantially the same cross-sectional shape as the pair of rails 152 provided on the base 10 and the interval between the rails in the right-left direction is equal to the interval between the pair of rails 152; specifically, as shown in FIG. 8, the transfer cart 170 is set to the base 10 such that the pair of rails 174 extend the pair of rails 152. Note that, the frame 176 can move in the right-left direction with respect to the base 172 and rotation of an adjustment wheel 182 causes the frame 176 to move in the right-left direction by a ball screw mechanism (not shown). In other words, a rail position adjusting mechanism 184, which adjusts the position of the pair of rails 174 in the right-left direction, is configured to include the wheel 182, the ball screw mechanism, and a structure in which the frame 176 can move with respect to the base 172 and the rail position adjusting mechanism can perform alignment of the pair of rails 174 to the pair of rails 152 in the right-left direction in a state in which the transfer cart 170 is fixed using the adjusting mechanism 184.

The transfer cart 170 may be used when the module 12 is drawn out to the extent that only a part of the module 12 is mounted on the transfer cart 170, or may be used when the module 12 is drawn out so as to be detached from the base 10 and the entire module 12 is mounted on the transfer cart 170. In the latter case, the transfer cart 170 is moved, and thereby it is possible to easily transfer the mounted module 12. On the other hand, the transfer cart 170, on which the module 12 is mounted, can be fixed beside the base 10 and the module 12 can be drawn on the base 10, and thereby the module 12 can be disposed on the base 10. In other words, the transfer cart 170 can be effectively used during replacement of the module 12, or the like. Further, in the present system, the transfer cart 170 is used for rearward drawing-out of the module 12; however, the present system can employ a transfer cart suitable for frontward drawing-out.

A module moving device 190 is provided in the transfer cart 170 for easy drawing-out and drawing-in of the module 12. To describe with reference to FIG. 16, at the center of the frame 176 in the right-left direction, a threaded rod 192, on which male threads are formed, is rotatably supported so as to extend frontward and rearward and a movable member 194, which holds a nut that is screwed with the threaded rod 192 and moves frontward and rearward along with rotation of the threaded rod 192, is provided. The movable member 194 functions as a movable engagement body which detachably engages with a rear end surface of the bed 22 of the module 12 and the threaded rod 192 is rotated by a wheel 196 in a state in which the movable member 194 engages with the bed 22, and thereby the module 12 moves frontward and rearward. In other words, the module moving device 190 is configured to include the threaded rod 192, the movable member 194, the wheel 196, or the like, and an operator can easily perform the drawing-out and retracting of the module 12 with human power using the module moving device 190.

Figure 14B:
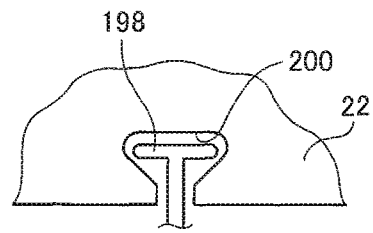

Further, a locking member 198 is provided on the top surface of the frame 176 of the transfer cart 170 at an intermediate position between the pair of rails 174 in the right-left direction so as to extend in the front-rear direction. The locking member 198 has substantially a T shape in the cross section. As shown in FIG. 14B, a slot 200 (to be described below in detail) having substantially an inverted triangular shape in the cross section is formed in the lower section of the bed 22 of the module 12 so as to penetrate the bed in the front-rear direction and the locking member 198 is inserted into the slot 200 when the module 12 is drawn out rearward. The module 12 is reliably stabilized due to the insertion of the locking member 198 when the module 12 is mounted on the transfer cart 170.

[D] Fixing of Working Machine Module to Base

The present system includes a module fixing mechanism by which the module 12 is fixed to the base. The module fixing mechanism is provided for each of the modules 12. In addition, the module fixing mechanism has a function of fixing the module 12 to the base 10 at multiple positions (hereinafter, referred to as a "fixing position" in some cases) set for the module 12 in the intersecting direction. Hereinafter, the structure and functions of the module fixing mechanism will be described.

As shown in FIG. 13, a number of locking rod operating devices 210 corresponding to the number of modules 12 to be mounted is provided on the base 10. To be more particular, four locking rod operating devices 210 are provided in the base unit 16 on which two modules 12 are mounted. In other words, two locking rod operating devices 210 are arranged lined up in the front-rear direction with respect to one module 12.

Figure 17:
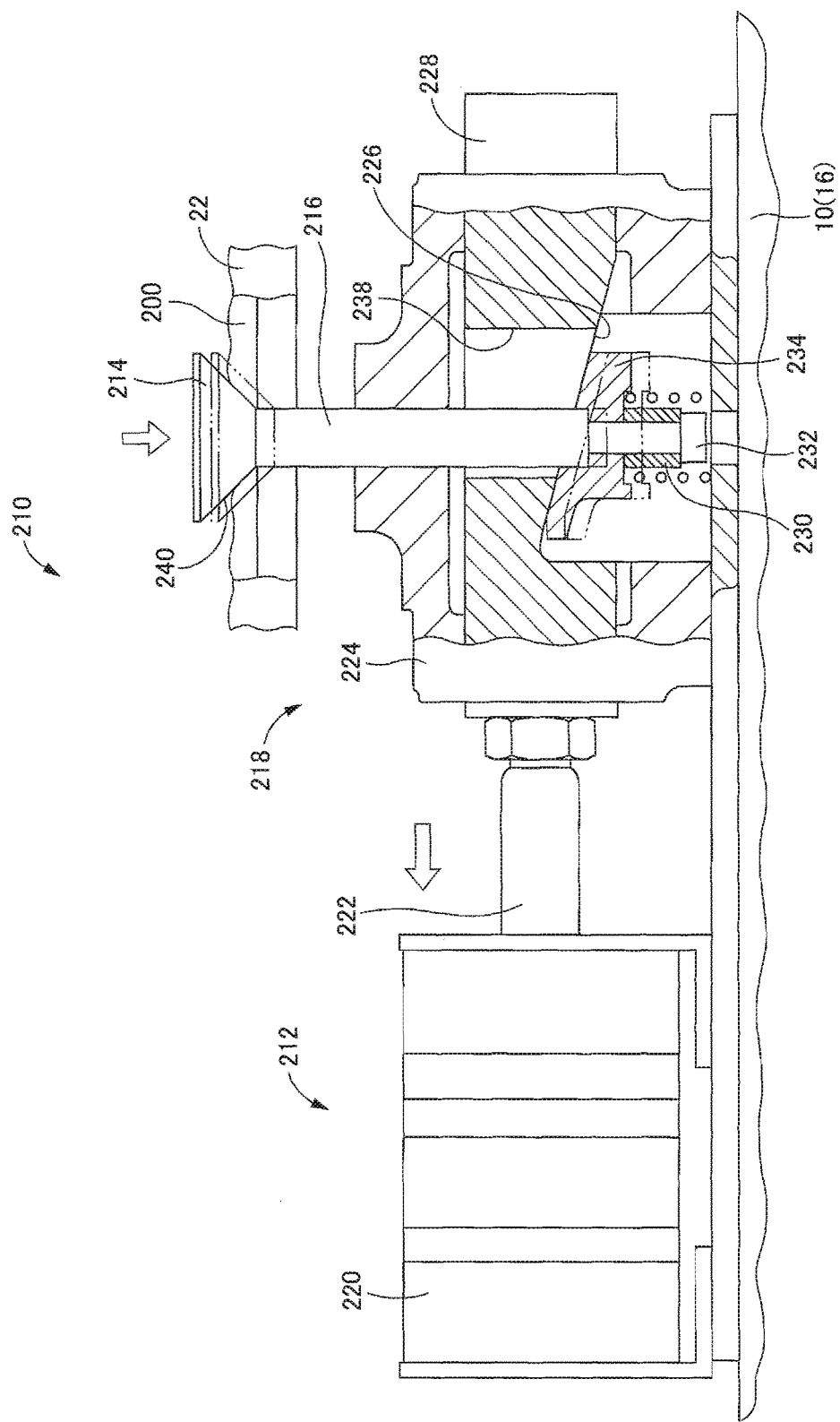
FIG. 17 is a side view including a part of a cross section showing a locking rod operating device disposed on the base.

As shown in FIG. 17, the locking rod operating device 210 is configured to include an actuator 212, a locking rod 216 having a rod head 214 with a shape of an inverted circular truncated cone at the top portion, and a rod lifting and lowering device 218 which lifts and lowers the locking rod 216. The actuator 212 is configured to include a cylindrical housing 220, a piston (not shown) which can slide frontward and rearward inside the housing 220, and a piston rod 222 which is connected to the piston and extends out from the housing 220, and the actuator has a structure in which compressed air force causes the piston rod 222 to extend and retract. The rod lifting and lowering device 218 is configured to include a wedge rod 228 which is held in the housing 220 to be movable frontward and rearward and has a wedge surface 226 in an intermediate portion, a lifting and lowering piece 234 which is fastened at the lower end portion in the locking rod 216 by a collar 230 and a bolt 232 and moves vertically so as to cause the locking rod 216 to move vertically, and a spring 236 which elastically supports the lifting and lowering piece 234 from below. An elongated hole 238, which penetrates the wedge surface 226 vertically and extends frontward and rearward, is formed in the wedge rod 228 and the locking rod 216 has a top portion including the rod head 214 which extends out from the housing 220 in a state in which the locking rod 216 penetrates through the elongated hole 238. The front end of the piston rod 222 of the actuator 212 is connected to the rear end of the wedge rod 228 such that the wedge rod 228 moves frontward and rearward in response to extension and retraction of the piston rod 222. The lifting and lowering piece 234 has a shape with a surface which is in contact with the wedge surface 226 of the wedge rod 228 so as to be lifted and lowered in response to the movement of the wedge rod 228 in the front-rear direction and the locking rod 216 which is fastened to the lifting and lowering piece 234 is also lifted and lowered. In other words, operation of the actuator 212 causes the locking rod 216 to be lifted and lowered. To put it specifically, the state shown in FIG. 17 is a state in which the piston rod 222 extends forward and in which the force of the spring 236 causes the locking rod 216 to be lifted. As shown in two-dot chain line in the drawing, the retraction of the piston rod 222 causes the locking rod 216 to be lowered against the force of the spring 236. Further, the two locking rod operating devices 210 are operated simultaneously such that the two locking rods 216 are lifted and lowered simultaneously.

Figure 14C:
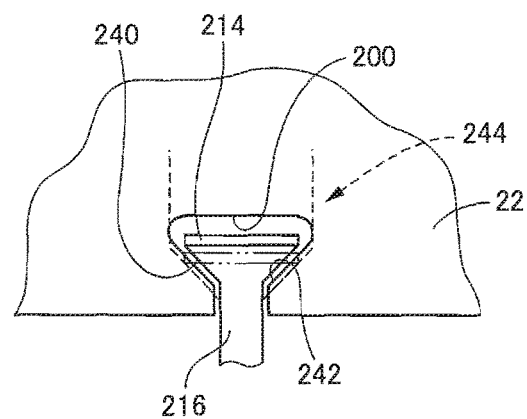

To describe with reference to FIG. 14C, the slot 200 which penetrates the bed in the front-rear direction is formed in the bed 22 of the module 12 as described above, and the rod head 214 of the locking rod 216 is positioned inside the slot 200 when the module 12 is mounted on the base 10. In the case where the locking rod 216 is lifted, the locking rod 216 is not engaged with the slot 200 and the module 12 enters into a state of being movable frontward and rearward along the track described above, on the base 10. The slot 200 has a recess 244, which is a recess having a tapered surface 242 with a shape matching with a tapered surface 240 of the rod head 214, formed at a predetermined position, and the tapered surface 240 of the rod head 214 exactly fits with the tapered surface 242 of the recess 244 when the locking rod 216 is lowered when the rod head 214 is positioned at the position. In this state, the locking rod 216 engages with the recess 244, that is, the module 12 such that the module 12 is fixed on the base 10. In other words, the module 12 is inhibited from moving along the track described above. Note that, the locking rod operating device 210 as a locking-portion operating device biases the locking rod 216 as a locking portion toward the recess 244 as a lock performing portion by a force of the actuator 212 and the module fixing mechanism fixes the module 12 to the base 10 in a state in which the module is pressed against the base.

Figure 18:
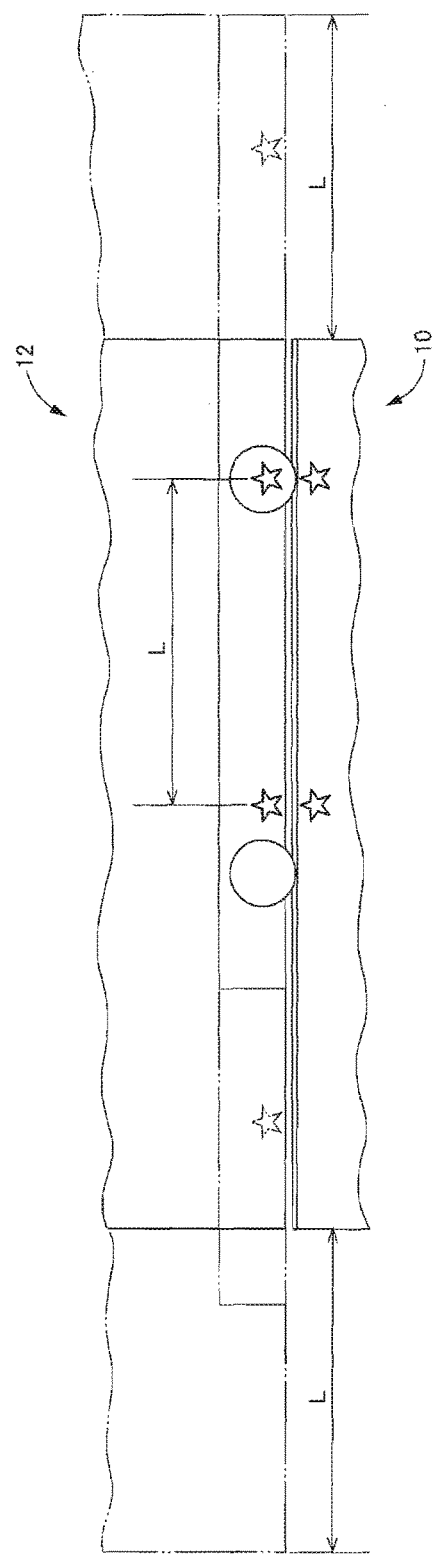
FIG. 18 is a diagram schematically depicting a relationship between drawing of the working machine module from the base and a module fixing mechanism.

As described above, the two locking rod operating devices 210 are provided on the base 10 for one module 12 and as shown in FIG. 15, two recesses 244 are provided corresponding to the respective locking rods 216 of the two locking rod operating devices 210 at intermediate positions of the slot 200 in the front-rear direction. An arrangement interval L between the two recesses 244 in the front-rear direction is equal to an arrangement interval L between the two locking rods 216 in the front-rear direction. In addition, to describe further with reference to the schematic view in FIG. 18, in the drawing, the "☆" represent the position of the two recesses 244 provided in the module 12 and the positions of the two locking rods 216 provided on the base 10, and the two recesses 244 are locked by the two locking rods 216, respectively, when the module 12 is positioned at the normal position. In contrast, as shown by the two-dot chain line, in a case where the module 12 is drawn out frontward by a predetermined distance L, that is, in a case where the module is drawn out frontward by a distance equal to the arrangement interval L, described above, of the two recesses 244, the recess 244 on the rear side can be locked by the locking rod 216 on the front side; and in a case where the module 12 is drawn out rearward by the predetermined distance L, the recess 244 on the front side can be locked by the locking rod 216 on the rear side. Accordingly, in the present system, the module 12 can be fixed to the base 10 not only at the normal position, but also at two drawn-out positions set according to the frontward drawing-out and the rearward drawing-out, respectively. In other words, the module 12 can be fixed to three fixing positions.

As understood from the above description, the recess 244 described above functions as the locked portion provided in the module 12 and the locking rod 216 described above functions as the locking portion provided in the base 10; in addition, the locking rod operating device 210 functions as a locking-portion operating device provided in the base 10, that is, a device that operates the locking rod in order to switch between the state in which the recess 244 is locked by the locking rod 216 and the state in which the recess 244 is not locked by the locking rod 216. In the present system, the module fixing mechanism described above is configured to include two recesses 244 which function as locked portions, respectively, the two locking rods 216 which function as locking portions, respectively, and the two locking rod operating devices 210 which function as the locking portion operating devices, respectively. That is, the module fixing mechanism in the present system is configured to include the two recesses 244 as module-side components, and the two locking rods 216 and the two locking rod operating devices 210 as base-side components; and the bed 22 as the movable bed is modularized including the two recesses 244 as module-side components. Further, as described above, since the module fixing mechanism fixes the module 12 to the base 10 in the state in which the module is pressed against the base, the module fixing mechanism is a pressing type fixing mechanism. Note that, the present system employs a module fixing mechanism in which the locked portion is provided as a module-side component in the module 12 and the locking portion and the locking-portion operating device are provided as base-side components in the base 10; however, the present system can employ a module fixing mechanism in which the locked portion is provided as a base-side component in the base 10 and the locking portion and the locking-portion operating device are provided as module-side components in the module 12. In addition, in the present system, four module fixing mechanisms are provided corresponding to the four modules 12; however, one or more module fixing mechanisms may be provided corresponding to only a portion of the four modules.

[E] Disposal of Coolant and Shavings

Since the module 12 is a lathe module, when the cutting process is performed on a work, the cutting process is performed while a coolant (referred to as a "cutting fluid" in some cases) is applied. In addition, in the cutting process, shavings (referred to as "cut chips" in some cases) are generated. Accordingly, it is necessary to perform disposal of the coolant and shavings. It is also necessary to perform the same disposal of the coolant and shavings in a case where the module 12 is a machining module such as the drilling machine/milling machine module described above. Hereinafter, a special configuration that takes account of the coolant and shavings will be described.

Figure 19:
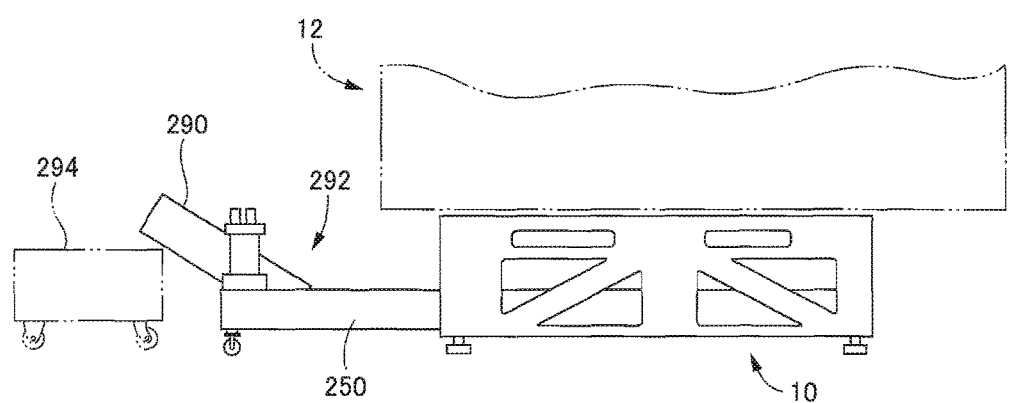
FIG. 19 is a side view showing a state in which a coolant tank is disposed inside the base.
Figure 20:
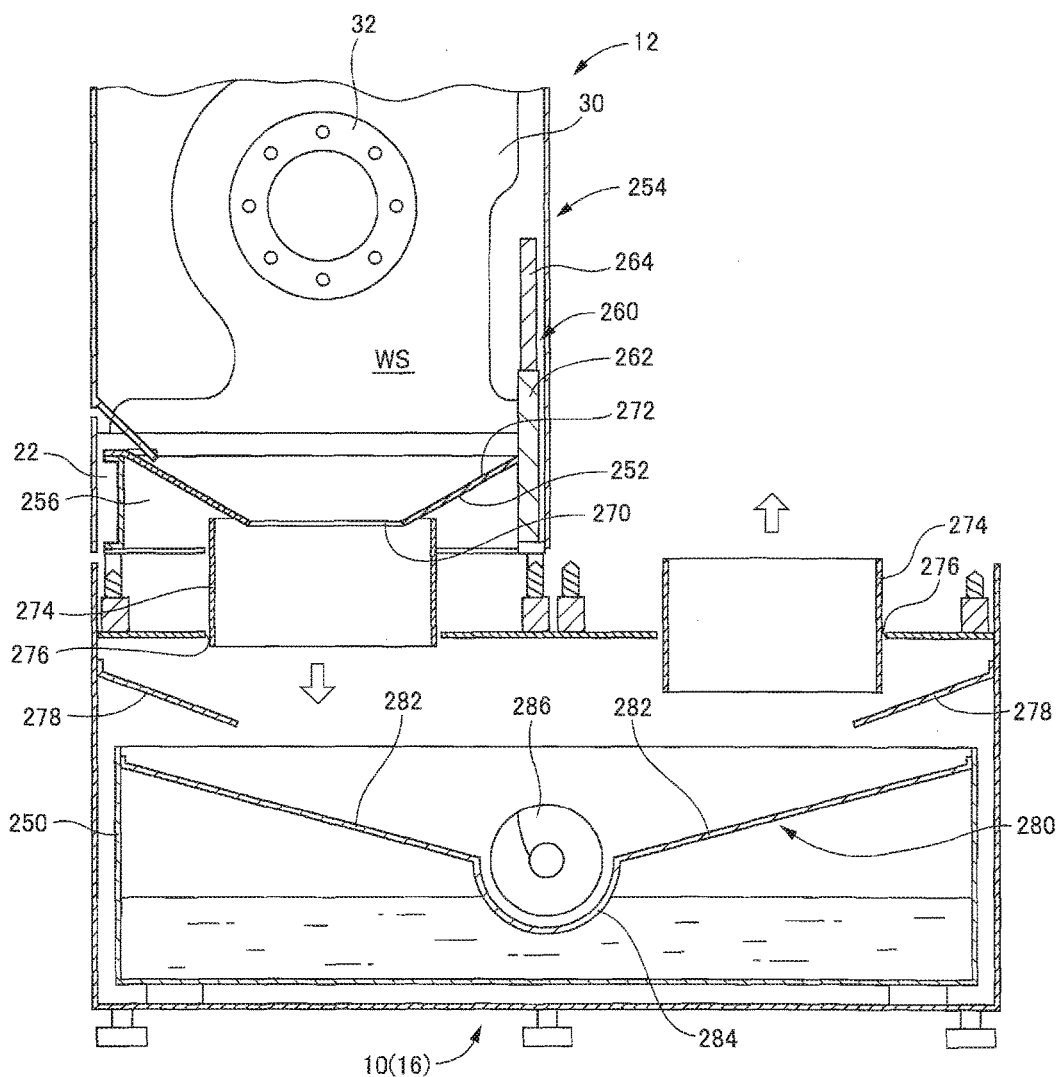
FIG. 20 is a sectional view showing an operating space of the working machine module and the inside of the base.

As shown in FIG. 19, a built-in coolant tank 250 that contains the coolant is provided inside the base 10. FIG. 20 is a sectional view showing the base 10 in which the built-in coolant tank 250 is provided and one module 12 mounted on the base 10. The cut plane in the sectional view is a plane which is positioned in front of the spindle 32 provided in the module 12 and which is orthogonal to the shaft line of the spindle 32, that is, orthogonal to the front-rear direction, and also a plane dividing the operating space (hereinafter, referred to as an "operating space WS" in some cases), described above, in which the cutting process is performed, into two front and rear sections. In the drawing, only one base unit 16 is described, one built-in coolant tank 250 is provided in one base unit, and two built-in coolant tanks 250 are provided in the entire base 10.

In the module 12, an operating space housing 254 surrounding the operating space WS described above is formed from a portion of external panels on the front side and a lower panel 252 provided in the bed 22 on the front side, and the module 12 is modularized including the operating space housing 254. Note that, the lower panel 252 is supported by a frame 256 attached to the bed 22 at the front end (refer to FIG. 9). Also, in FIG. 20, a base beam 262 and a guide 264 of a work loader 260 to be described below are shown in a simplified manner, on the right side of the lower panel 252. The coolant is released from a coolant nozzle (not shown) to the work rotating by the spindle 32 and the cutting process of the work is performed while the coolant is being released. Also, shavings are generated due to the cutting process. The operating space housing 254 effectively prevents the released coolant and generated shavings from flying to the outside, particularly from flying out to the right and left sides. The released coolant and shavings drop downward in the operating space WS through an opening 270 provided in the lower panel 252 and are contained in the coolant tank 250 provided inside the base 10. Further, in order to perform effective guiding of the coolant and the shavings to the coolant tank 250, the lower panel 252 has a shape that becomes narrower closer to the lower side. In other words, a tapered surface 272 is provided in the lower panel 252.

A reception tube 274 which has a tubular shape and functions as a reception port through which the coolant and shavings are received into the coolant tank 250 is provided on the top surface of the base 10 (refer to FIG. 13). To be more particular, an opening 276 is provided in the top surface of the base 10 and the reception tube 274 is provided such that the lower end of the reception tube is inserted into the opening 276. In addition, when the module 12 is positioned at the normal position, the reception tube 274 enters into a state in which the upper end thereof is positioned above the opening 270 of the lower panel 252. Such a reception tube 274 efficiently guides the coolant and shavings into the inside of the base 10, that is, without spilling over the top surface of the base 10. Further, a pair of guide plates 278 are provided inside the base 10 in order to prevent the coolant and shavings which have passed through the reception tube 274 from spilling to the outside of the coolant tank 250 on the right and left sides.

A reception plate 280 which receives the dropping coolant and shavings is provided in the coolant tank 250. Since the reception plate 280 has a pair of inclined surfaces 282, of which the top surface is declined from both right and left sides toward the center and the reception plate has a shape having a recessed portion 284 at the center portion, the dropping coolant and shavings are gathered in the recessed portion 284 at the center along the inclined surfaces 282. Although not shown, multiple small holes are provided are formed in a section in which the recessed portion 284 is formed in the reception plate 280, and thus only the coolant passes through the reception plate 280. A screw 286 is provided extending in the front-rear direction in the recessed portion 284, and thus rotation of the screw 286 causes the shavings remaining on the reception plate 280 to move rearward. To describe with reference to FIG. 19, the coolant tank 250 sticks out rearward from the base 10 and a discharge duct 290 is provided in the sticking-out rear end portion. The shavings which have been moved rearward by the screw 286 are discharged to the rear side of the system through the discharge duct 290. In other words, a screw conveyor 292 (a type of chip conveyor) which functions as a shaving discharge device is configured to include the screw 286, the discharge duct 290, or the like, and the screw conveyor 292 discharges the shavings from a side surface of the base 10, to be more particular, from the rearward side surface. Further, a shavings collecting box 294 with wheels attached is provided below the rear end of the discharge duct 290 for example, and thereby it is possible to easily transport the discharged shavings. The coolant contained in the coolant tank 250 is pumped up by a pump (not shown) and is again released from the coolant nozzle described above. In other words, in the system, the coolant is to be circulated.

In the present system, one coolant tank 250 is provided for one base unit 16, that is, one coolant tank 250 is provided for two modules 12; however, a configuration, in which one coolant tank is provided for each module 12, or one coolant tank is provided for the entire base 10, may be employed. Similarly, one shavings discharge device may be provided not only for one base unit 16, but also be provided for each module 12. Further, as the shavings discharge device, various types of discharge devices such as a chip conveyor having a structure in which a metal net circles around, instead of the screw conveyor 292, or the like, may be employed. Further, in the present system, the screw conveyor 292 as the shavings discharge device is configured to discharge the shavings in one of both directions opposite to each other in the intersecting direction, to be more particular, rearward as a direction on the side opposite to the operating space WS. Accordingly, there is no need to position the shavings collecting box described above beside the base 10 in the arrangement direction, thus it is possible to shorten the system length of the entire system including the box.

As described above, the module 12 can be drawn out from the base 10. Therefore, as understood from FIG. 20, the lower panel 252 of the module 12 interferes with the reception tube 274 when the module 12 is drawn out with the reception tube 274 in the state shown on the left side in the drawing. Therefore, in the present system, in order to avoid the interference when the module 12 is drawn out, a mechanism, which causes the reception tube 274 shown on the left side to enter into the state of the reception tube 274 shown on the right side in the drawing, is provided. In other words, a reception tube lifting and lowering mechanism as a reception port retracting mechanism which causes the reception tube 274 functioning as the reception port to retract is provided for each module 12. This mechanism causes the reception tube 274 to retract downward when the module 12 is drawn out from the normal position.

Figure 21:
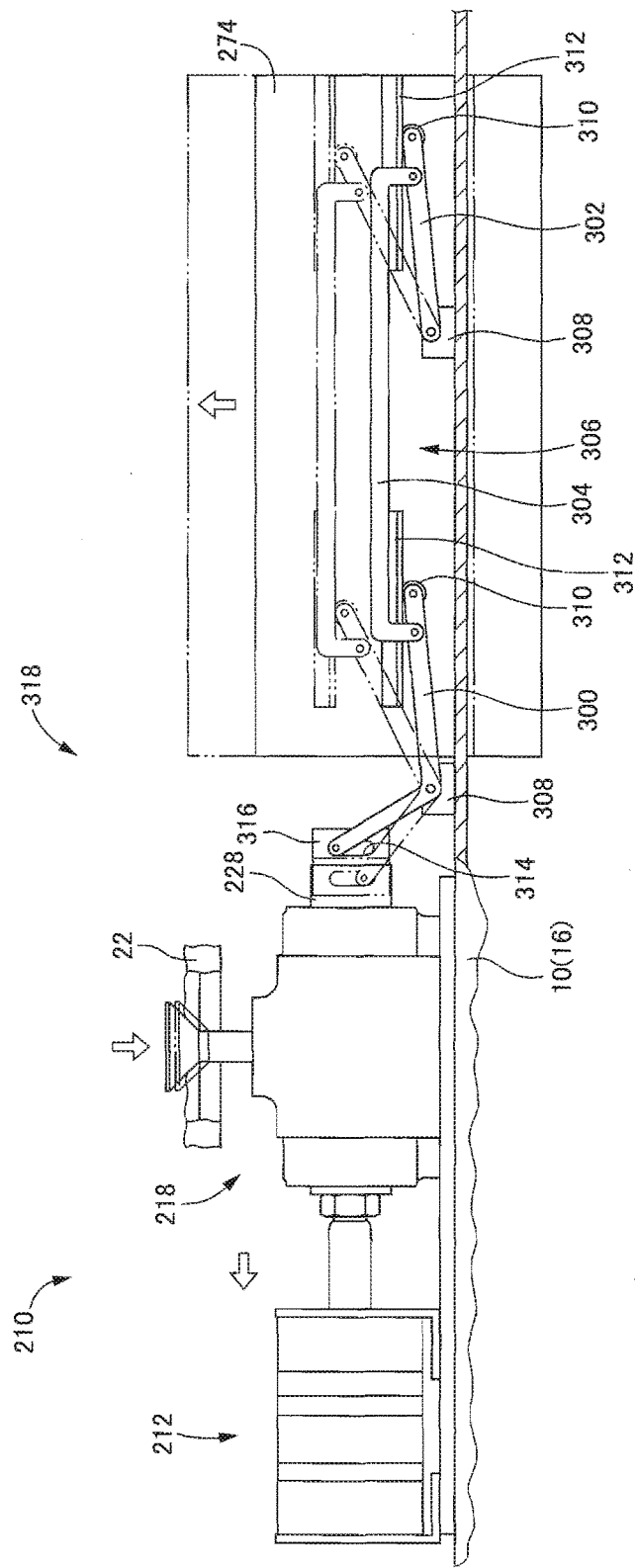
FIG. 21 is a side view showing a structure in which a coolant reception port provided in the base is retracted.

To describe in detail with reference to FIG. 21, the reception tube 274 is supported to be interposed, from the right and left sides, by a pair of parallel link mechanisms 306 which are each configured to include a drive arm 300, a driven arm 302, and a link bar 304 which connects the drive arm and the driven arm. Base end portions of the drive arm 300 and the driven arm 302 are rotatably supported on the bracket 308 attached to the top surface of the base 10 and distal end portions thereof support a rail member 312 attached on the side surface of the reception tube 274 via a roller 310. The drive arm 300 has substantially an L shape and the other distal end portion is attached to the connection block 316 having an elongated hole 314 so as to be movable along the elongated hole 314. As described above, two locking rod operating devices 210 constituting the module fixing mechanism are provided on the top surface of the base 10 (refer to FIG. 13) and the connection block 316 is fixed to the distal end of the wedge rod 228 which is has by, of the two locking rod operating devices 210, the one provided on the frontward side.

The state shown in FIG. 21 represents the state in which the fixing of the module 12 is released and the reception tube 274 is lifted as shown in the two-dot chain line in the drawing through an operation of the locking rod operating device 210 which fixes the module 12. The reception tube 274 on the left side in FIG. 20 shows a state in which the reception tube 274 is lifted in this manner. Conversely, in a state in which the reception tube 274 is lifted, the locking rod operating device 210 which releases the fixing of the module 12 is operated, and thereby the reception tube 274 such as a reception tube 274 on the right side in FIG. 20 is lowered to a position at which the lower panel 252 of the module 12 does not interfere the reception tube when the module 12 is drawn out. In other words, in the present system, a reception tube lifting and lowering mechanism 318 is configured to include the parallel link mechanism 306, the block 316, the locking rod operating device 210, or the like, to be linked to the release of the fixing of the module 12 by the module fixing mechanism, and to cause the reception tube 274 as a reception port to be retracted. In the present system, such a mechanism causes the reception tube 274 to automatically retract by an operation for releasing the fixing of the module 12. Note that, although detailed description is omitted, in a case where the module 12 is fixed at the drawn-out position on the frontward side described above, the reception tube 274 is lifted; however, in this case too, the reception tube 274 is configured not to interfere with the bed 22 of the module 12. Further, since the reception tube lifting and lowering mechanism 320 as the reception port retracting mechanism and the actuator 212 as a drive source in the module fixing mechanism are commonly used, the mechanisms are simplified in their structure.

Figure 22:
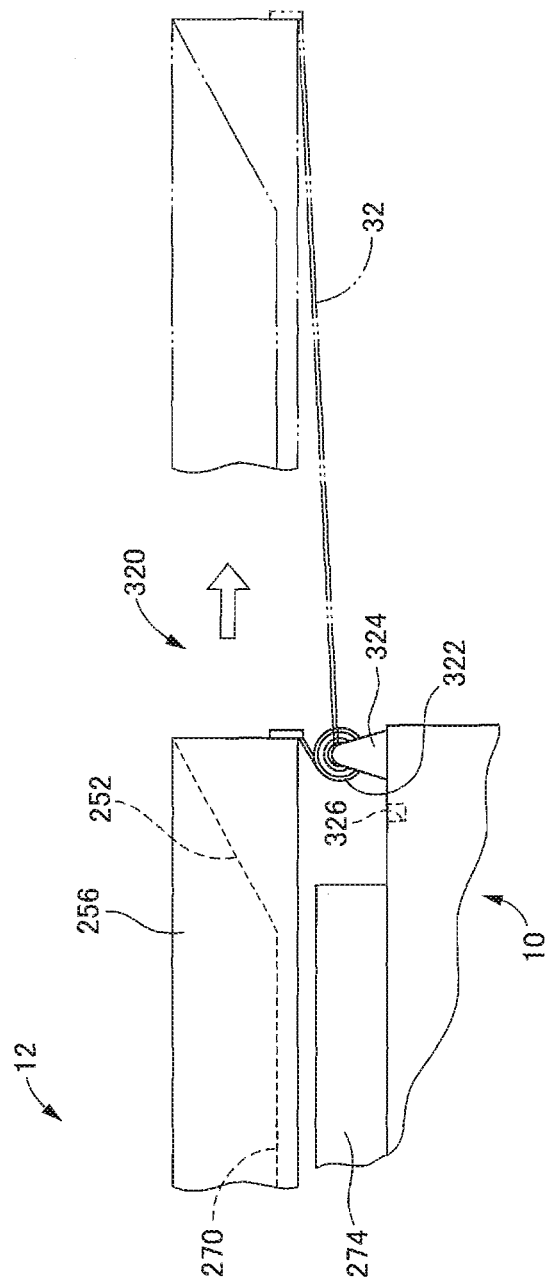
FIG. 22 is a side view showing an expandable coolant receiver provided in the base.

Further, in the present system, as shown in FIG. 22, an expandable coolant receiver 320 which receives the dropped coolant is provided in consideration of the fact that, when the module 12 is drawn out frontward, the coolant remaining in the operating space of the module 12 drops as droplets from the opening 270, described above, of the module 12. The coolant receiver 320 includes a sheet 322 as a main component. The sheet 322 is wound around a shaft (not shown) and the shaft is rotatably supported by a support member 324 provided upright at the front end of the base 10.

The end of the wound sheet 322 is caught at the front end of the frame 256 which supports the lower panel 252 in which the opening 270 is provided. Note that, FIG. 13 shows a mode in which the wound sheet 322 is provided at a portion of the base unit 16 on the left front side. The sheet 322 is biased by a force of a spring (not shown) so as to enter into a winding state. In other words, the shaft is biased in the counterclockwise direction in the drawing. In a case where the module 12 is drawn out frontward, the sheet 322 is stretched in response to the frontward movement of the frame 256 against the power of the spring and the sheet is expanded to cover the opening 270 below the frame 256. The expanded sheet 322 enters into a state of being lowered as close to the rearward side and the coolant dropped from the opening 270 drops to reach the top surface of the base 10 along the top surface of the sheet 322. The coolant dropped along the base 10 is guided to the coolant tank 250 from a hole 326 provided in the top surface of the base 10. Note that, FIG. 13 shows the hole 326 in a portion of the base unit 16 on the right front side on which the wound sheet 322 is omitted.

In a case where the module 12 returns to the normal position, the extended sheet 322 is wound due to the force of the spring described above, in response to the rearward movement of the module 12. Further, with the present coolant receiver 320, in a case where the module 12 is caused to move rearward from the normal position, the end of the wound sheet 322 is released from the frame 256. Note that, the present coolant receiver 320 has the structure, described above, in which the sheet 322 is the main component; however, as the expandable coolant receiver, it is possible to employ a structure in which a plate, a pan, or the like, approaches frontward along with the drawing out of the module 12.

[F] Transport of Work Between Modules and Transfer of Work to Operation Position in Module As shown in FIG. 7, in the present system, a work transporting device 350 that transports a work is provided on a side surface of the base 10, to be more particular, on a side surface on the frontward side on the side on which the operating space described above exists. The work transporting device 350 transports the work to the respective modules 12 and loads the work on the module 12 on the leftmost side (upstream side), transports the work between the respective modules 12, and unloads the work from the module 12 on the rightmost side (downstream side). In the drawings, only the portion of the work transporting device 350 disposed on the side surface on the frontward side of the base unit 16 on the left side is shown; however, the same portion (to be described below) also exists on the side surface on the frontward side of the base unit 16 on the right side. In other words, in the present system, the work transporting device 350 is configured to include two transport device units 352 corresponding to the two base units 16 and each of the two base units 16 is modularized (as a unit) incorporating one transport device unit 352 which is a part of the work transporting device 350. Hereinafter, the transport device units 352 provided in the base unit 16 on the left side and in the base unit 16 on the right side, respectively, are sometimes referred to as a left-side transport device unit 352L and a right-side transport device unit 352R. Also, a work inverting device 354 to be described below is provided in the work transporting device 350.

Figure 23:
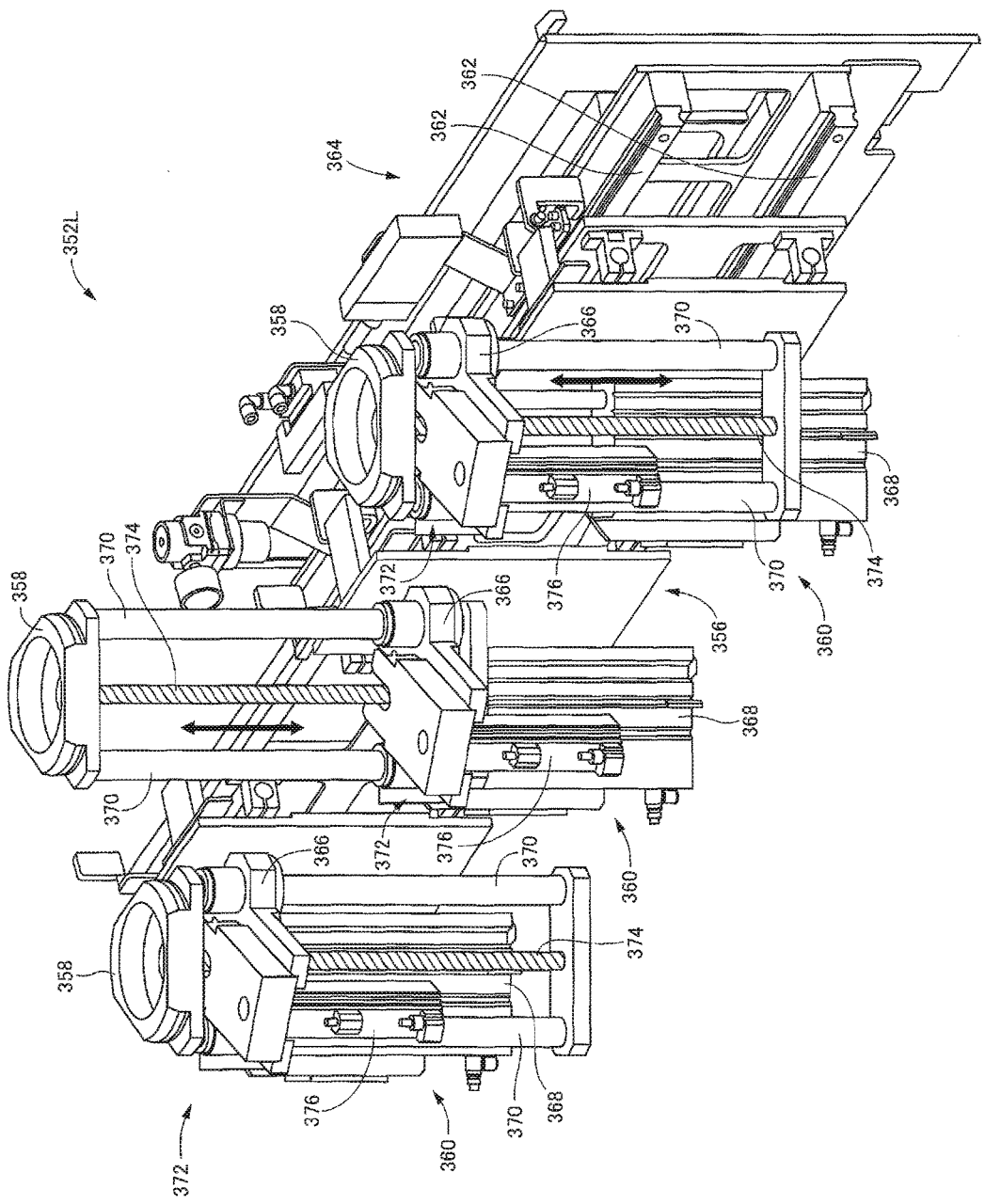
FIG. 23 is a perspective view showing a transport device unit constituting a work transporting device disposed on the side surface of the base on the front side.

As shown in FIG. 23, the left-side transport device unit 352L is configured to include a movable base 356, three work beds 358 on which works are mounted, respectively, and three work bed lifting and lowering devices 360 which are supported by the movable base 356 and each of which causes the corresponding bed of the three work beds 358 to be lifted and lowered. Note that, in FIG. 23, the work inverting device 354 described above is omitted. The movable base 356 can move in the arrangement direction (right-left direction), described above, along a pair of guide rails 362 which are fixed to the side surface on the frontward side of the base 10 and is caused to move in the arrangement direction by an actuator (in the drawing, hidden behind the movable base 356) provided on the rearward side of the movable base 356. The actuator is a cylinder type which operates using compressed air force, and a work bed moving device 364, which causes the work bed 358 to move in the arrangement direction, is configured to include the actuator, the guide rail 362, and so on.

The three work beds 358 and the three work bed lifting and lowering devices 360 are arranged at equal intervals in the arrangement direction at the same pitch as the arrangement pitch of the modules 12. The work beds (corresponding work beds) at the center and on the right side of the three work beds 358 correspond to the module 12 on the most right side and the second module 12 from the right, and the work bed on the left side is an added work bed (additional work bed) which is provided at an extended position on the left side from the base 10. Further, although not shown, the right-side transport device unit 352R does not have the additional work bed and has the movable base 356 with a shorter dimension in the right-left direction according to the state. Accordingly, five work beds 358 are provided in the entire system and the work transporting device 350 is configured to have the five work beds 358 which are arranged at equal intervals at the same pitch as the arrangement pitch described above in the arrangement direction.

The work bed lifting and lowering device 360 is configured to include a lifting and lowering base 366, a lifting and lowering actuator 368 which is fixed to the movable base 356 and causes the lifting and lowering base 366 to be lifted and lowered, a pair of guide rods 370 which is held to the lifting and lowering base 366 so as to be vertically movable and is fixed to the work bed 358 at the upper end, and a work bed vertical-moving mechanism 372 which is provided in the lifting and lowering base 366 and causes the work bed 358 to vertically move with respect to the lifting and lowering base 366. The work bed vertical-moving mechanism 372 is configured to include a threaded rod 374, a nut (not shown) which is screwed with the threaded rod 374, and a motor 376 which rotates the nut, and the work bed vertical-moving mechanism 372 is provided as a movement mechanism which uses a so-called ball screw mechanism.

The lifting and lowering actuator 368 lifts and lowers the base 366 by the force of the compressed air and the lifting so as to selectively move the base between two positions, the upper end position and the lower end position with respect to the movable base 356. On the other hand, the work bed vertical-moving mechanism 372 can position the work bed 358 at any position between the upper end portion and the lower end position with respect to the lifting and lowering base 366 by controlling the motor. Note that, in FIG. 23, the states respectively shown are: for the work bed lifting and lowering device 360 on the left side, the lifting and lowering base 366 is positioned at the lower end position described above and the work bed 358 is also positioned at the lower end position described above; for the work bed lifting and lowering device 360 at the center, the lifting and lowering base 366 is positioned at the lower end position described above and the work bed 358 is positioned at the upper end position described above; and for the work bed lifting and lowering device 360 on the right side, the lifting and lowering base 366 is positioned at the upper end position described above and the work bed 358 is positioned at the lower end position described above.

Figure 24:
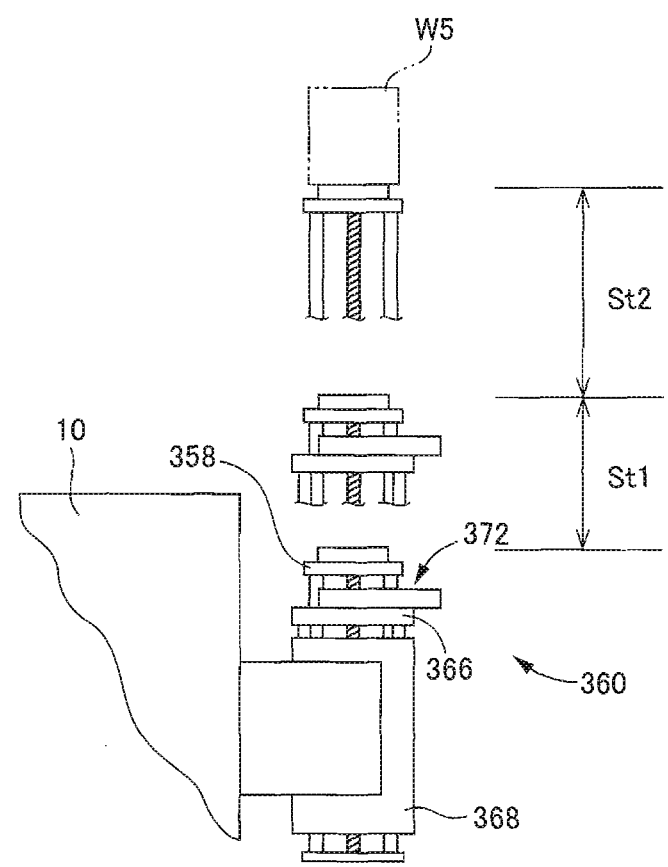
FIG. 24 is a side view depicting an operation of a work bed lifting and lowering device provided in the work transporting device.

In such a configuration described above, the lifting and lowering actuator 368 functions as a first lifting and lowering device and the work bed vertical-moving mechanism 372 functions as a second lifting and lowering device, and, as shown in FIG. 24, the work bed lifting and lowering device 360 is a two-stage type lifting and lowering device which causes the work bed 358 to be lifted and lowered at two stages, that is, a so-called telescopic type lifting and lowering device. In FIG. 24, St1 represents a lifting and lowering stroke of the lifting and lowering base 366 by the lifting and lowering actuator 368 and St2 represents a lifting and lowering stroke of the work bed 358 by the work bed vertical-moving mechanism 372. The difference between the height level (hereinafter, referred to as the "lowest position" in some cases) of the work bed 358 in a case where both the lifting and lowering base 366 and the work bed 358 are positioned at the lower end position described above and the height level (hereinafter, referred to as the "uppermost position" in some cases) of the work bed 358 in a state in which both beds are positioned at the upper end position described above becomes the total stroke (St1+St2) of the work bed 358 by the corresponding work bed lifting and lowering device 360 and the total stroke is relatively large. As described above, since the module 12 can be drawn out frontward from the base 10, the top surface of the work bed 358 is positioned below the top surface of the base 10 at the lowest position; however, the total stroke is large, and thereby, at the uppermost position, the work bed 358 can lift the work W5 to a height sufficient for the work W5 to be delivered with the work loader 260 to be described below.

Figure 25:
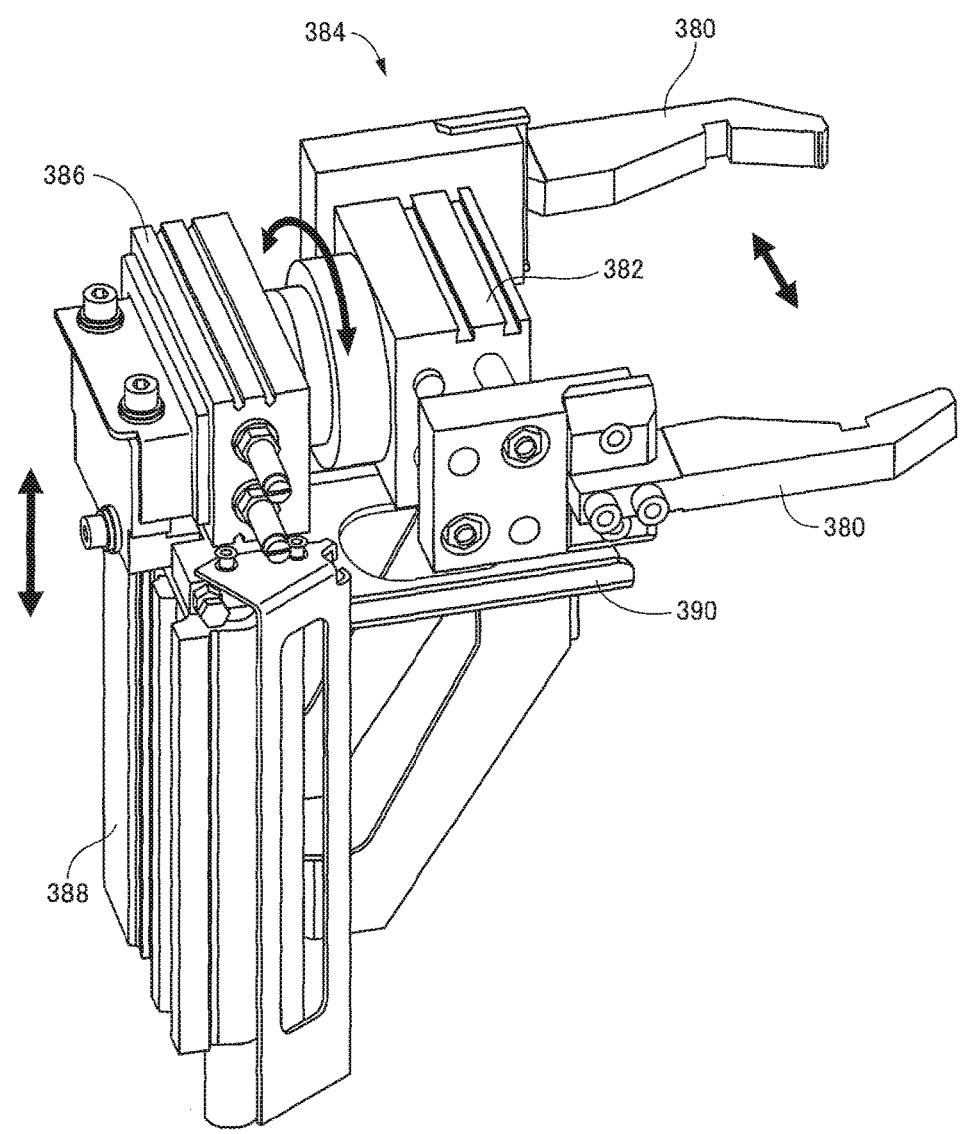
FIG. 25 is an enlarged perspective view showing a work inverting device attached to the work bed lifting and lowering device.
Figure 26A:
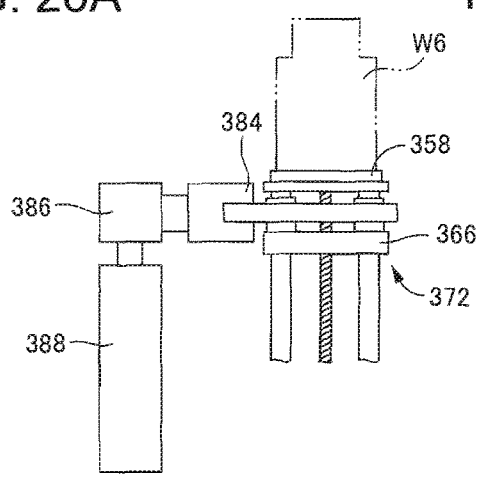
FIG. 26 is a view schematically depicting an operation of the work inverting device.
Figure 26B:
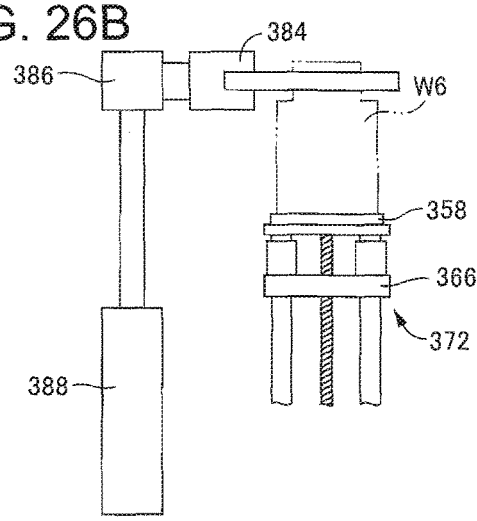
Figure 26C:
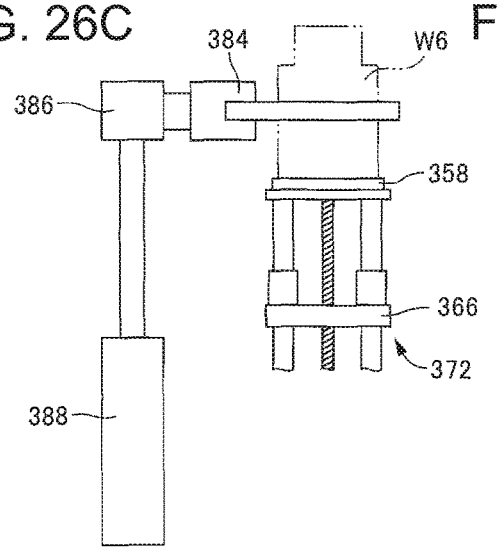
Figure 26D:
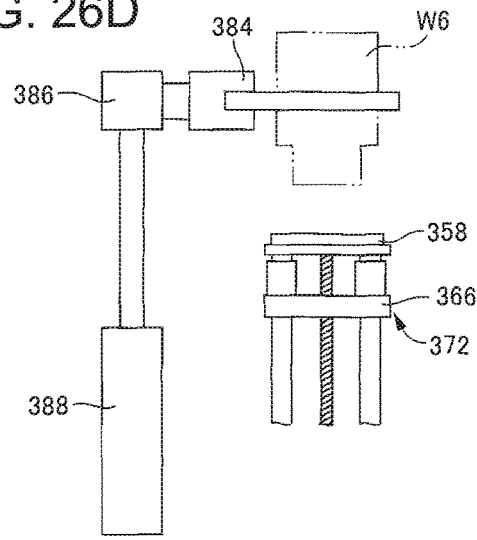
Figure 26E:
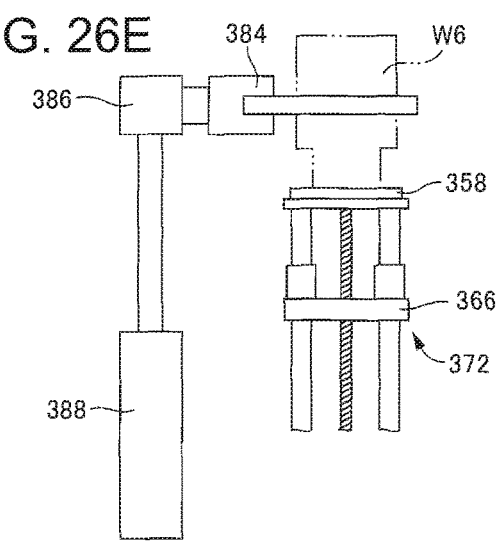
Figure 26F:
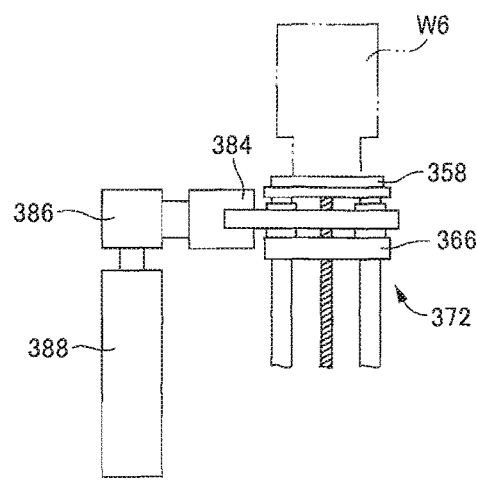

As shown in FIG. 7, in the left-side transport device unit 352L, a work inverting device 354 is attached to the work bed lifting and lowering device 360 at the center. As shown in an enlarged view in FIG. 25, the work inverting device 354 includes, as a main component, a clamp 384 which is configured to include a pair of gripping claws 380 and a claw operating actuator 382 which causes the pair of gripping claws 380 to approach and be separated from each other, and the work inverting device includes a clamp rotating actuator 386 which rotates the clamp 384 by 180° by the force of compressed air, and a clamp lifting and lowering actuator 388 which lifts and lowers the clamp 384 by a predetermined distance by the force of compressed air. The clamp lifting and lowering actuator 388 is fixed to the lifting and lowering base 366 of the work bed lifting and lowering device 360 via an attachment tool 390 and the work inverting device 354 is lifted and lowered along with the lifting and lowering base 366 by the clamp lifting and lowering actuator 388. Further, in a state in which the clamp 384 is opened, the work bed 358 can pass between the pair of gripping claws 380. In addition, the pair of gripping claws 380 can be replaced with appropriate claws according to the shape or dimension of the work to be inverted.

To describe the inverting of the work in detail with reference to FIG. 26, in a case where the work W6 is inverted, first, from a state (FIG. 26A) in which the work bed 358, on which the work W6 is mounted, is positioned at the lower end position described above with respect to the lifting and lowering base 366, the clamp lifting and lowering actuator 388 lifts the open clamp 384 (FIG. 26B) by the predetermined distance described above. Subsequently, the work bed vertical-moving mechanism 372 lifts the work bed 358 to an appropriate position, for example, to a position at which the clamp 384 can grip the center of the work W6 in the height direction (FIG. 26C). Next, after the clamp 384 grips the work W6, the work bed vertical-moving mechanism 372 lowers the work bed 358 to the lower end position described above and the clamp rotating actuator 386 rotates the work W6 by 180° (FIG. 26D). Then, the work bed vertical-moving mechanism 372 lifts the work bed 358 to an appropriate position, that is, a position at which the top surface of the work bed 358 comes into contact with the lower end surface of the work W6, and the gripping by the clamp 384 is released (FIG. 26E). Then, the clamp lifting and lowering actuator 388 lowers the open clamp 384 by the predetermined distance described above and the inverting of the work W6 is completed (FIG. 26F). Further, in FIG. 26F, the work bed 358 is lowered; however, after the inversion of the work W6, the work bed 358 may be lifted in a case where the work W6 is supplied to a cutting process by the module 12, or the like. That completes description of cooperation between the work inverting device 354 and the work bed lifting and lowering device 360 related to the inversion of the work.

The above described the left-side transport device unit 352L; to describe the right-side transport device unit 352R with reference to the above description and FIG. 27, it is possible to consider the right-side transport device unit 352R as an item from which the work bed 358 on the left side which is an additional work bed provided in the left-side transport device unit 352L and the work bed lifting and lowering device 360 which causes the work bed 358 to be lifted and lowered have been removed. In other words, the right-side transport device unit 352R is configured to include two work beds 358 which are corresponding work beds and two work bed lifting and lowering devices 364 which cause the two work beds 358 to be lifted and lowered, respectively, and the dimension of the movable base 356 in the right-left direction is shorter by an amount of the removed one work bed 358 and one work bed lifting and lowering device 360. Accordingly, in the entire system, five work beds 358 are provided and the five work beds 358 are configured to be arranged at equal intervals at the same pitch as the arrangement pitch described above. Note that, the work inverting device 354 described above is attached only to the work bed lifting and lowering device 360 on the right side in the right-side transport device unit 352R.

The work transporting device 350 has a configuration in which the movable base 356 of the left-side transport device unit 352L and the movable base 356 of the right-side transport device unit 352R are synchronized and move by the same distance to the right and left sides. In other words, the work bed moving device 364 causes the five work beds 358 to move together by a distance corresponding to the arrangement pitch described above. To be more particular, the work transporting device 350 has a configuration in which the two movable bases 356 and the five work beds 358 provided on the movable bases reciprocate between a position shown in FIG. 27A and a position shown in FIG. 27B. Note that, in a state shown in FIG. 27A, each of the four corresponding work beds 358 is positioned at a position (delivery position) which is set to perform delivery of the work W7 with respect to the corresponding module (hereinafter, sometimes referred to as a "corresponding module") 12. In other words, each work bed 358 is positioned at the home position. In contrast, in a state shown in FIG. 27B, each of the three corresponding work beds 358 on the upstream side (left side) is positioned at a delivery position with respect to the module (hereinafter, sometimes referred to as a "downstream-side module") 12 which performs the cutting process on one work W7 after the corresponding module 12, and the additional work bed 358 placed on the most upstream side is positioned at the delivery position with respect to the module 12 on the most upstream side. Accordingly, the five work beds 358 are caused to move in the right-left direction by a distance equal to the arrangement pitch described above. Further, in the following description, the module 12 which performs the cutting process on one work W7 before the corresponding module 12 is sometimes referred to as an "upstream-side module".

Figure 27A:
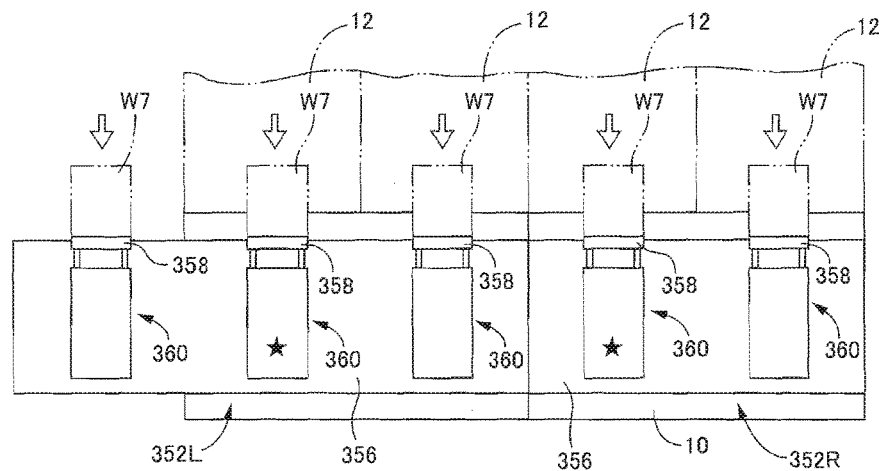
FIG. 27 is a view schematically depicting the operation of the work transporting device.
Figure 27B:
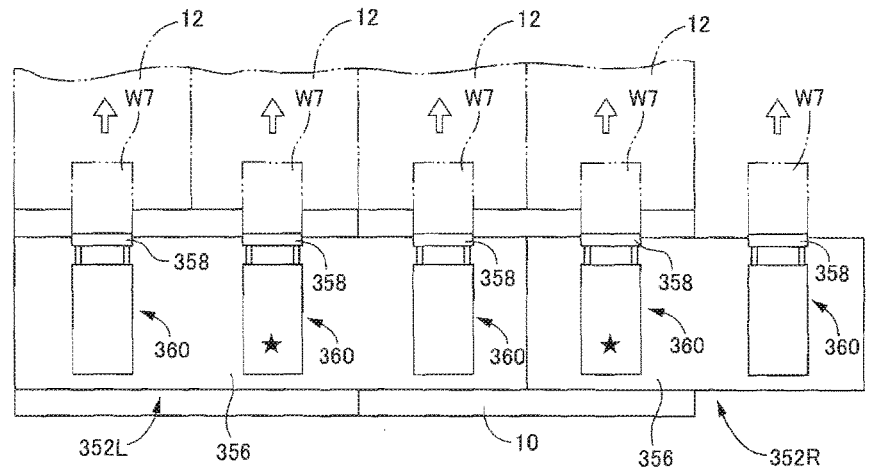

The transport of the work by the work transporting device 350 is performed through repeated realization of the state shown in FIG. 27A and the state shown in FIG. 27B. To be more particular, in the state shown in FIG. 27A, the work W7 is mounted on the additional work bed 358 placed on the most upstream side from a loader disposed on the outside, and the work W7 on which the cutting process has been performed by the corresponding module 12 is mounted on each of the four corresponding work beds 358 from the previous corresponding module. Subsequently, as in the state in FIG. 27(b), the five work beds 358 are caused to move and, in this state, the work W7 mounted on the additional work bed 358 is delivered to the module 12 positioned on the most upstream side, the works W7 mounted on the three corresponding work beds 358 on the upstream side are delivered to the modules 12 on the downstream side, respectively, and the work W7 mounted on the corresponding work bed 358 positioned on the most downstream side (right side) is delivered to an unloader disposed on the outside. Also, then, in a state in which the work W7 is not mounted on any of the work beds 358, the five work beds 358 are caused to be positioned at a position shown in FIG. 27A. In other words, returning to the home position is performed. Such operations are repeated, and thereby the multiple works are transported in the system through the multiple modules 12 in order.

In the present system, the work transporting device 350 includes the additional work bed 358 and the work bed lifting and lowering device 360 which causes the additional work bed to be lifted and lowered, in addition to the corresponding work bed 358 and the work bed lifting and lowering device 360 which causes the corresponding work bed to be lifted and lowered, on the upstream side; however, the additional work bed 358 and the work bed lifting and lowering device 360 which causes the additional work bed to be lifted and lowered may be provided on the downstream side. In this case, it is possible to transport the work by the same operation. In addition, the additional work bed 358 and the work bed lifting and lowering device 360 which causes the additional work bed to be lifted and lowered do not have to be provided. In this case, the work transporting device 350 has a configuration in which the five work beds move by a distance corresponding to the arrangement pitch described above on both the upstream side and downstream side with respect to the home position, and thereby the work transporting device 350 can load the work to the system, unload the work from the system, and transport the work between the modules 12.

In addition, in the present system, the work inverting device 354 is provided with respect to each of the work bed 358 at the center of the left-side transport device unit 352L and the work bed 358 on the left side of the right-side transport device unit 352R (position of ★ in FIG. 27). The work inverting device 354 provided in this manner can perform the inverting of the work between the cutting process by the module 12 on the most left side and the cutting process by the second module 12 from the left, and between the cutting process by the second module 12 from the right and the cutting process by the module 12 on the most right side. In other words, the work inverting device 354 may be provided with respect to the work bed 358 corresponding to the position at which the work is inverted. Further, the work inverting device 354 may be provided with respect to each of all the corresponding work beds 358, and thereby, even in a case where a position at which the work has to be inverted is changed according to the change in the type of work, it is possible to support the change rapidly without replacing the work inverting device 354.

Figure 28:
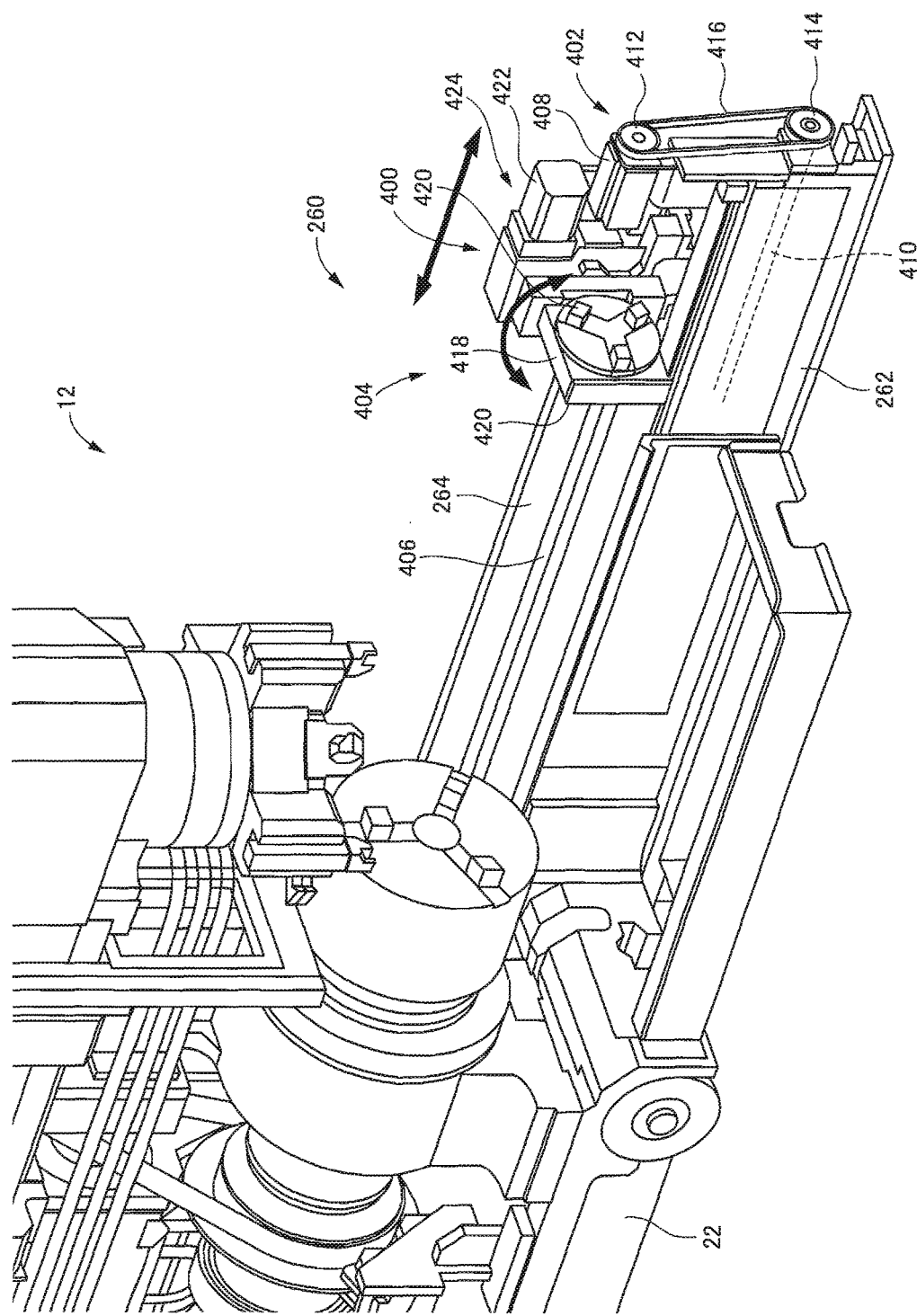
FIG. 28 is a perspective view showing a work loader.

The work transported by the work transporting device 350 is carried out from the work bed 358 and is mounted on a chuck 46 attached to the spindle 32 of the module 12, by the work loader 260, described above, shown in FIG. 9. In addition, the work on which the process has completed in the module 12 is carried out from the chuck 46 and is mounted on the work bed 358 by the work loader 260. As shown in FIG. 28, the work loader 260 is configured to include the base beam 262, described above, which extends out frontward from the bed 22 and is supported on the bed 22, the guide 264, described above, supported by the base beam 262, a slider 400 provided to be movable in the front-rear direction along the guide 264, a slider moving mechanism 402 which causes the slider 400 frontward and rearward, and a work holding device 404 which is supported by the slider 400 and holds the work. A rail 406 is laid out in the guide 264 and the slider 400 slides on the rail 406. The slider moving mechanism 402 is configured to include a motor 408 supported on the base beam 262, a threaded rod 410 which is rotatably provided extending frontward and rearward on the base beam 262, and a nut (not shown) which is held in the slider 400 and is screwed onto the threaded rod 410. The nut and the threaded rod 410 are components constituting a ball screw mechanism. Rotation of the motor 408 is transmitted by pulleys 412 and 414 and a belt 416, thereby the threaded rod 410 rotates, and the slider 400 moves in the front-rear direction due to the rotation. The work holding device 404 includes a chuck table 418 provided in the slider 400 to be rotatable around a shaft line extending in the right-left direction, and two chucks 420 which are respectively provided on two surfaces of the chuck table 418 which are opposite to each other and which hold the work. The chuck table 418 is caused to rotate by a table rotating mechanism 424 which has a motor 422 and is provided in the slider 400 and can have any rotating posture in a range of 360°.

Further, as understood from FIG. 29, the work holding device 404 is disposed such that, in a state in which one of the two chucks 420 faces the chuck 46, the shaft lines of the chucks match each other, and in a state in which one of the two chucks 420 faces a work bed 358 on the upper side of the work bed 358 positioned at the delivery position described above, the shaft lines thereof match. Hereinafter, attachment and detachment of the work to and from the chuck 46 and delivery of the work between the module 12 and the work transporting device 350 will be described, using an example, with reference to FIG. 29. Note that, the position of the work holding device 404 in the latter state is sometimes referred to as the delivery position according to the device 404.

In a case where a work (hereinafter, sometimes referred to as a "process completed work") W8 on which the process is completed is detached from the chuck 46, as shown in FIG. 29A, the work holding device 404 is caused to move to an attachment and detachment position in the vicinity of the chuck 46 and receives the work W8 from the chuck 46 using one of the two chucks 420 which are provided in the work holding device. At this time, the other one of the two chucks 420 already holds the work (hereinafter, referred to as a "process uncompleted work" in some cases) W8 on which the process is about to be performed and the work holding device 404 moves to a position slightly apart from the chuck 46 and causes the chuck table 418 to rotate by 180° at the position after receiving the process completed work W8. Then, the work holding device returns to the attachment and detachment position and delivers the process uncompleted work W8 to the chuck 46. In this manner, since the detachment of the process completed work W8 and the mounting of the process uncompleted work W8 are continually performed in a short time, the period of time for which the module 12 does not perform the process on the work becomes as short as possible.

In a case where the process completed work W8 is mounted on the work bed (corresponding work bed) 358 which is positioned at the delivery position, as shown in FIG. 29B, the work holding device 404 is caused to move to the delivery position according to the corresponding work holding device 404 and the chuck table 418 is caused to rotate such that the process completed work W8 is positioned immediately under the work holding device 404. In this state, the work bed 358 is lifted to the set position by the work bed lifting and lowering device 360 and the mounting of the process completed work W8 on the work bed 358 is performed. After the work bed 358 is lowered to the lower end position, the five work beds 358 provided in the system are caused to move all together to the downstream side by a distance corresponding to the arrangement pitch described above, by the work bed moving device 364. As a result, the work bed (additional work bed or corresponding work bed of the module on the upstream side) 358, on which the process completed work W8 is mounted, becomes positioned at the delivery position. In this state, the work bed 358 is lifted to the set position, and thereby the process uncompleted work W8 mounted on the work bed 358 is held by the work holding device 404. In this manner, the deliveries of the process completed work W8 and the process uncompleted work W8 are continually performed between the module 12 and the work transporting device 350. Further, the module 12 performs the process on the work W8 mounted in the chuck 46 between the deliveries.

Further, when the operation of the work loader 260 described above is considered, the work loader 260 functions as a work transferring device which performs transferring of the work mounted on the work bed 358 to the position at which the cutting process is performed, that is, transferring to the operation position, and performs transferring of the work to the work bed 358 from the operation position.

[G] Arrangement of Module and Variations of Module

Figure 30:
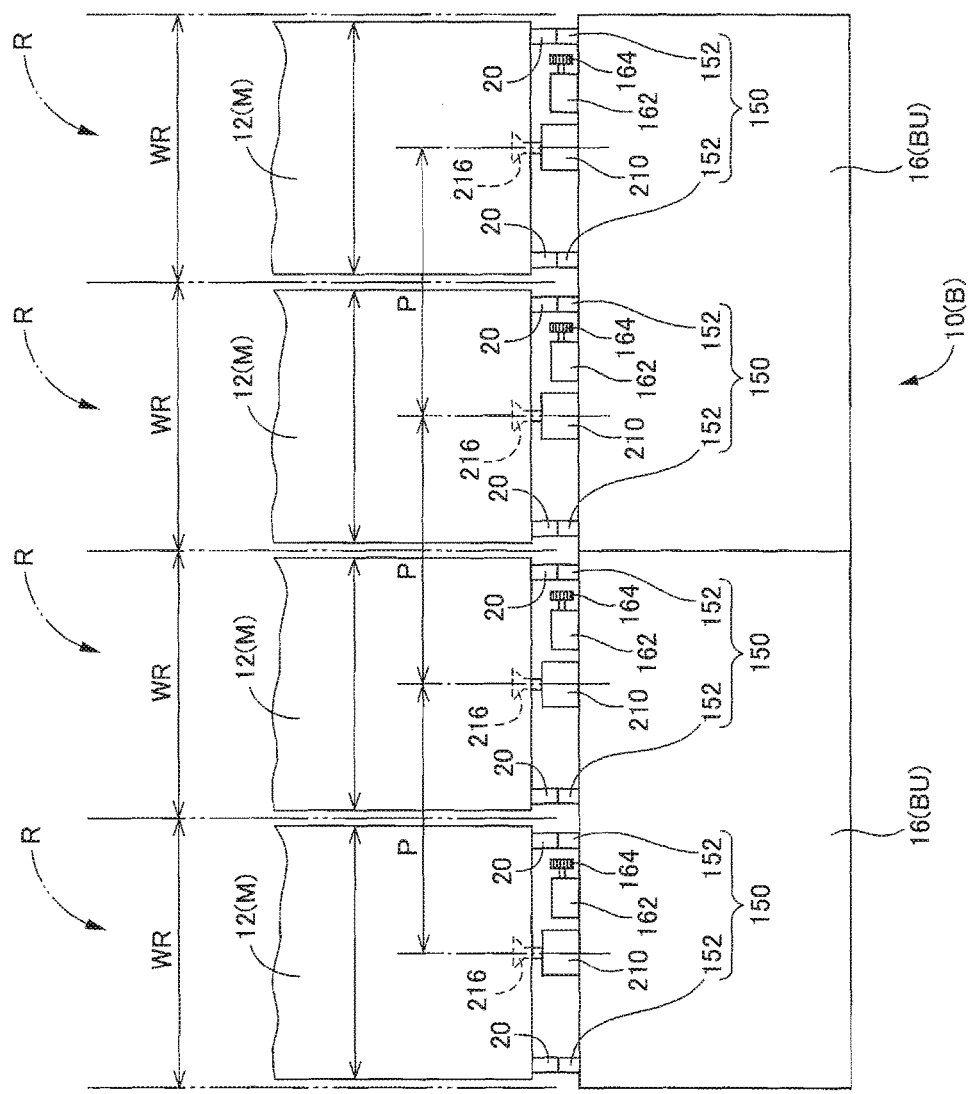
FIG. 30 is a diagram schematically depicting an arrangement region on the base, on which the working machine modules are arranged.

In the system according to the present disclosure, a concept of an "arrangement region" related to an arrangement of the modules on the base is employed. As shown in FIG. 30, an arrangement region R is a virtual space, set to be demarcated on the base B, which can be considered as a unit space which defines a space in which the module M is disposed. As understood from FIG. 30, the arrangement regions R are arranged in parallel in the arrangement direction without an interval such that the arrangement regions are adjoining each other. When a width of the arrangement region R is referred to as a region width WR, the region widths WR of the respective arrangement regions R are all to be equal.

FIG. 30 is a view showing the system described above in which the four modules 12 are arranged on the base 10, the four arrangement regions R are set on the base 10, and one module 12 is disposed on each of the arrangement regions R. Referring to FIG. 1, FIG. 3 and FIG. 7, in a case where the width of the module is a module width WM, in the system described above, the module width WM of each of the modules 12 is substantially equal to the region width WR of the arrangement region R (to be more exact, the module width WM is slightly smaller than the region width WR) and, as described above, the four modules 12 are arranged to be closely adjacent to each other. Each of the modules 12 occupies only one arrangement region R without protruding into an adjacent arrangement region R. Accordingly, it is possible to consider each of the modules 12 as a "single region occupying module". Further, it is possible to consider the "arrangement pitch" of the four modules 12 as an interval in the arrangement direction between the centers of the modules 12 in the width direction and the arrangement pitch P of the modules 12 in the system described above is equal to the interval in the arrangement direction between the centers of the arrangement region R in the width direction, that is, the region width WR.

Describing the system above with reference to FIG. 7, FIG. 8, and FIG. 13, four rail pairs 150, each of which is configured of one pair of rails 152 on which one pair of wheels 20 provided in each of the modules 12 circle around, are provided corresponding to the four modules 12, and the four rail pairs 150 are arranged on the four arrangement regions R respectively in the base 10. In other words, a track forming member, which forms a track along which the module 12 is drawn out, is provided for each arrangement region R. In addition, a module driving motor 162, a pinion 164, and so on, which are a base-side components which configure the module driving mechanism 166 described above, corresponding to the four arrangement regions R, are disposed on the base 10 in each of the four arrangement regions R. Similarly, the locking rod 216, the locking rod operating device 210, and so on, which are base-side components that configure the module fixing mechanism described above, corresponding to the four arrangement regions R, are disposed on the base 10 in each of the four arrangement regions R. Note that, in the system described above, the base 10 is configured of the plurality of, to be more particular, two base units 16 and the multiple, to be more particular, two arrangement regions R are set for each of the base units 16 without dividing any arrangement region R. Furthermore, the work bed 358 provided in the work transporting device 350 described above is also provided corresponding to each arrangement region R. In other words, the corresponding work bed 358 described above is provided for each arrangement region R.

The rail pair 150, base-side components of the module driving mechanism 166, and base-side components of the module fixing mechanism are provided on the base 10 for each arrangement region R, and with respect this, as described above, in the module 12, two pairs of wheels 20, module-side components of the module driving mechanism 166, and module-side components of the module fixing mechanism are provided in the bed 22 as the movable bed (refer to FIG. 15). The rail pair 150, the base-side components of the module driving mechanism 166, and the base-side components of the module fixing mechanism have the same configuration for each of the arrangement regions R and corresponding to that, the beds 22 of the four modules 12 have the same dimension, shape, and structure as each other. In other words, the bed 22 on which the two pairs of wheels 20, the module-side components of the module driving mechanism 166, and the module fixing mechanism are provided, has common specification sand configuration, that is, the bed 22 is modularized to have a common configuration. Thanks to this common configuration, in the present system, it is possible to easily prepare various types of modules which can be arranged on the base 10 by fixing another type of working machine body to the bed 22 instead of a lathe body 24.

In the system described above, four arrangement regions R are set on the base 10; however, an appropriate system can be achieved so long as two or more arrangement regions R are set. In addition, in the system described above, the base 10 is configured of multiple, specifically, two base units 16; however, one base may be configured of three or more base units BU. Further, in a case of employing multiple base units, as the system described above, it is desirable that multiple arrangement regions Rare set for each of the multiple base units.

Figure 31A:
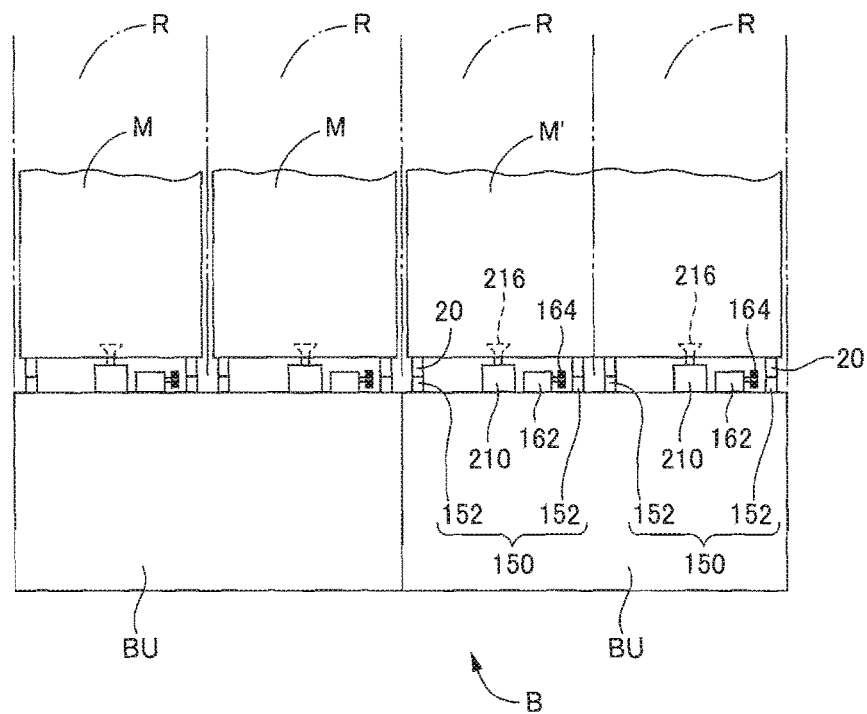
FIG. 31 is a diagram schematically depicting an alternative embodiment related to the arrangement of the working machine modules.

As a rule, the arrangement region R is set such that two or more modules M or apart thereof do not coexist in that region R. In accordance with this rule, in the system described above, as described above, only one module 12 exists in each arrangement region R and the four modules 12 provided in the system are all the single region occupying module contained in one arrangement region R. As an alternative embodiment of the system which differs from such a system, a system may be created in which, instead of the single region occupying module M, a module M' occupying multiple arrangement regions R, that is, a multi-region occupying module M' is arranged as shown in FIG. 31A. In the system shown in FIG. 31A, specifically, the module M' mounted on the base units BU on the right side which configure the base B is a module occupying two arrangement regions R. In the system, the three modules M and M' are disposed to be closely adjacent to each other and the module width WM' of the module M' is approximately a multiple of, specifically, twice, the module width WM of the module M.

In a case where the multi-region occupying module is disposed, for example, one of the pair of wheels 20 which is provided in the module may circle around on one of the pair of rails 152 constituting the rail pair 150 provided corresponding to one of the multiple arrangement regions R occupied by the module, and the other rail may circle around one of the pair of rails 152 constituting the rail pair 150 provided corresponding to another of the multiple arrangement regions R occupied by the module. Specifically, in the system shown in FIG. 31A, the one on the left side of the pair of wheels 20 provided in the module M' occupying two arrangement regions circles around the rail on the left side of the pair of rails 152 constituting the rail pair 150 provided corresponding to left side arrangement region of the two arrangement regions R occupied by the module M', and the one on the right side of the pair of wheels 20 circles around the rail on the right side of the pair of rails 152 constituting the rail pair 150 provided corresponding to the right side arrangement region of the two arrangement regions R. In short, the pair of wheels 20 circle around the two rails on the outer side in the arrangement direction of the four rails 152 which are provided in the two arrangement regions R.

Note that, in a case where the multi-region occupying module M' is disposed, with respect to the module M', the base-side components of the module driving mechanism 166 described above, such as the module driving motor 162, the pinion 164, and so on, and the base-side components of the module fixing mechanism, such as the locking rod 216, the locking rod operating device 210, and so on, are multiple items corresponding to the multiple arrangement regions R. In this case, with respect to the multi-region occupying module M', any one of the multiple base-side components may be used. In addition, with respect to the multi-region occupying module M', the work bed 358 provided in the work transporting device 350 described above is also the corresponding work bed of the multiple work beds corresponding to the multiple arrangement regions R. In this case, in terms of the operation of the work transporting device 350, in the multi-region occupying module M', it is desirable to employ a work loader which is configured to transfer the process uncompleted work mounted on the work bed on the most upstream side of the multiple corresponding work beds 358 to the operation position, and to transfer and mount the process completed work from the operation position to the work bed on the most downstream side of two corresponding work beds 358.

Figure 31B:
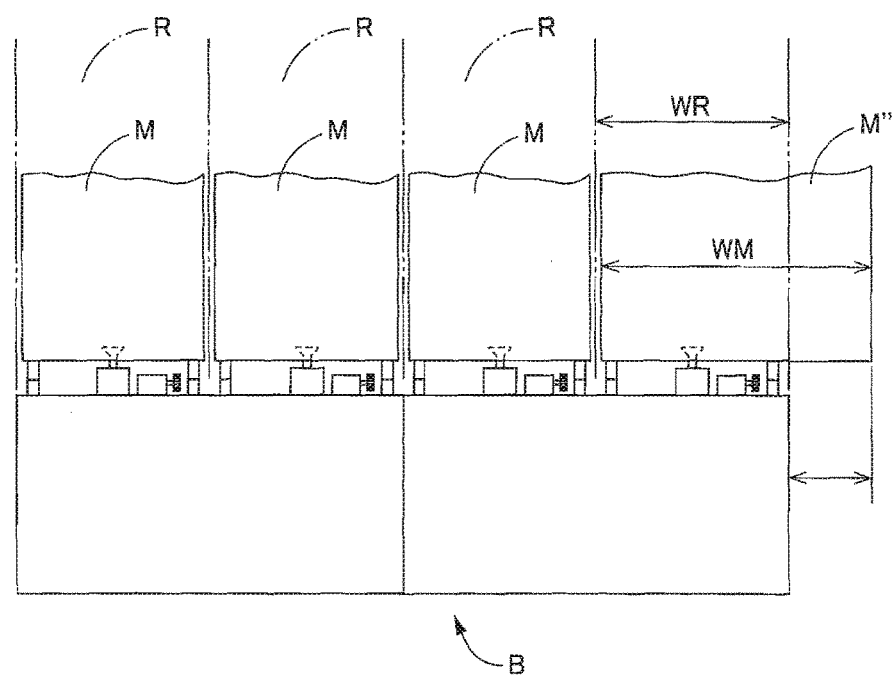

In addition, in the system described above, each of the four modules 12 has the module width WM which does not protrude from the arrangement region R; however, at least one of the two modules disposed at both ends in the arrangement direction may protrude to the outside in the arrangement direction. FIG. 31B shows an example of a system configured in this manner, and in the system shown in FIG. 31B, the module M" on the rightmost side protrudes from the arrangement region R. To be more particular, the module protrudes from the base B overhanging in the arrangement direction. In this system, although the module M" has the module width WM which is greater than the region width WR, it is still possible to arrange the modules on the base B having a relatively small base width.

In the system described above, the modules 12 are all lathe modules or drilling machine/milling machine modules; however, in the system related to the present disclosure, the modules arranged on the base are not limited to lathe modules or drilling machine/milling machine modules, it is possible to dispose on the base various types of machine tool modules on which another type of machine tool such as a machining center, a grinder, a polishing machine, or the like is modularized. Furthermore, in the system according to the present disclosure, in addition to the machine tool module, it is possible to arrange on the base a pre-processing machine module in which a pre-processing machine, which performs a pre-process on the work before the machining process, is modularized, or a post-processing machine module, in which a post-processing machine such as an inspection machine that inspects an operation result of the machining process, or the like, is modularized. Furthermore, it is possible to arrange on the base various working machine modules in which a module other than the machine tool module is modularized, such as a supply operation module on which a supply operating machine, which performs a supply operation of supplying the work to the working machine module, is modularized, or a storage machine module in which a completed work storage machine, which receives the work on which the process by the machine tool module is completed from the module and stocks the work to be unloaded from the system, is modularized.

REFERENCE SIGNS LIST

10: base, 12: working machine module (machine tool module) (lathe module) (drilling machine/milling machine), 16: base unit, 20: wheel, 22: bed (movable bed), 24: lathe body (working machine body), 26: control panel, 32: spindle, 34: bite (tool), 36: tool holding head, 38: head moving device, 42: spindle casing, 100: tool holding head, 102: straight-type drill (tool), 104: angular-type drill (tool), 106: end mill (tool), 132: spindle, 134: spindle casing, 150: rail pair, 152: rail, 160: rack bar (rack) (module-side component), 162: module driving motor (drive source) (base-side component), 164: pinion (base-side component), 166: module drive mechanism, 170: transfer cart, 190: module moving device, 210: locking rod operating device (locking portion operating device) (module fixing mechanism) (base-side component), 216: locking rod (locking portion) (module fixing mechanism) (base-side component), 244: recess (locked portion) (module fixing mechanism) (module-side component), 250: coolant tank, 254: operating space housing, 260: work loader (work transfer unit), 270: opening, 274: reception tube (reception port), 292: screw conveyor (shaving discharge unit), 318: reception tube lifting and lowering mechanism (receptacle retracting mechanism), 320: expandable coolant receiver, 350: work transport device, 352: transport device unit, 354: work inverting device, 358: work bed, 360: work bed lifting and lowering device, 364: work bed moving device, W1 to W8: work, WS: operating space, R: arrangement region, B: base, BU: base unit, M: module (single region occupying module), M': module (multi-region occupying module), M": module, WR: region width, WM: module width, WM': module width, P: arrangement pitch

The invention claimed is:

1. A machining system comprising:
   a base; and
   multiple working machine modules which are mounted on the base and arranged in an arrangement direction,
   wherein the multiple working machine modules include one or more machine tool modules, each of the multiple working machine modules configured to be drawn out from the base along a track extending in an intersecting direction that intersects with the arrangement direction, wherein
   a coolant tank that contains coolant is provided in the base,
   the base includes a reception port that receives coolant discharged from one of the multiple working machine modules, and
   the reception port retracts into the base when the one of the multiple work machine modules is drawn out from the base along the track.

2. The machining system according to claim 1,
   wherein the reception port is provided protruding on the base, and provides the coolant discharged from the one of the multiple working machine modules to the coolant tank, and
   wherein the base includes a reception port retracting mechanism that retracts the reception port so as to avoid interference with the reception port when the one of the multiple working machine modules is drawn out.

3. The machining system according to claim 2,
   wherein, a module fixing mechanism that fixes each working machine module at a fixing position set in the intersecting direction is provided for each of the multiple working machine modules, and the reception port retracting mechanism is configured to retract the reception port linked with the release of the fixing of the one of the multiple working machine modules by the module fixing mechanism.

4. The machining system according to claim 1,
   wherein the base is configured to receive shavings produced in an operating space in which an operation is performed on a work by the one of the multiple working machine modules, into the inside of the base itself, and the machining system includes a shavings discharge device which discharges the shavings received in the base from a side surface of the base.

\* \* \* \* \*